United States Patent
Snow

(10) Patent No.: US 11,348,097 B2
(45) Date of Patent: May 31, 2022

(54) DIGITAL CONTRACTS IN BLOCKCHAIN ENVIRONMENTS

(71) Applicant: Inveniam Capital Partners, Inc., New York, NY (US)

(72) Inventor: Paul Snow, Austin, TX (US)

(73) Assignee: Inveniam Capital Partners, Inc., New York, NY (US)

( * ) Notice: Subject to any disclaimer, the term of this patent is extended or adjusted under 35 U.S.C. 154(b) by 326 days.

(21) Appl. No.: 16/116,975

(22) Filed: Aug. 30, 2018

(65) Prior Publication Data

US 2020/0042986 A1 Feb. 6, 2020

Related U.S. Application Data

(60) Provisional application No. 62/714,909, filed on Aug. 6, 2018.

(51) Int. Cl.
*G06Q 20/36* (2012.01)
*G06Q 20/06* (2012.01)
(Continued)

(52) U.S. Cl.
CPC ........... *G06Q 20/367* (2013.01); *A41D 1/002* (2013.01); *A41D 11/00* (2013.01); *A41D 13/005* (2013.01);
(Continued)

(58) Field of Classification Search
CPC .... G06Q 20/367; G06Q 20/12; G06Q 20/401; G06Q 20/3674; G06Q 20/3829;
(Continued)

(56) References Cited

U.S. PATENT DOCUMENTS 4,309,569 A 6/1982 Merkel
5,499,294 A 3/1996 Friedman
(Continued)

FOREIGN PATENT DOCUMENTS

CN 110392052 10/2019
EP 3726438 10/2020
(Continued)

OTHER PUBLICATIONS

ZoKrates—Scalable Privacy-Preserving Off-Chain Computations, by Jacob Eberhardt, Stefan Tai , Nov. 3, 2011 (Year: 2011).*
(Continued)

*Primary Examiner* — Patrick McAtee
*Assistant Examiner* — Vincent I Idiake

(57) ABSTRACT

Digital or "smart" contracts execute in a blockchain environment. Any entity (whether public or private) may specify a digital contract via a contract identifier in a blockchain. Because there may be many digital contracts offered as virtual services, the contract identifier uniquely identifies a particular digital contract offered by a virtual machine, vendor or supplier. The blockchain is thus not burdened with the programming code that is required to execute the digital contract. The blockchain need only include or specify the contract identifier (and perhaps one or more contractual parameters), thus greatly simplifying the blockchain and reducing its size (in bytes) and processing requirements.

18 Claims, 47 Drawing Sheets

(51) Int. Cl.

| | | |
|---|---|---|
| *H04L 9/06* | (2006.01) | |
| *G06Q 20/12* | (2012.01) | |
| *G06Q 20/40* | (2012.01) | |
| *H04L 67/12* | (2022.01) | |
| *G06F 16/29* | (2019.01) | |
| *H04L 9/32* | (2006.01) | |
| *G06F 21/64* | (2013.01) | |
| *G06Q 20/38* | (2012.01) | |
| *A41D 31/06* | (2019.01) | |
| *D03D 15/47* | (2021.01) | |
| *D03D 15/56* | (2021.01) | |
| *D03D 15/567* | (2021.01) | |
| *A41D 1/00* | (2018.01) | |
| *A41D 11/00* | (2006.01) | |
| *A41D 13/005* | (2006.01) | |
| *A41D 15/00* | (2006.01) | |
| *A41D 31/00* | (2019.01) | |
| *D02G 3/36* | (2006.01) | |
| *D02G 3/44* | (2006.01) | |
| *D03D 1/00* | (2006.01) | |
| *G05B 15/02* | (2006.01) | |
| *G06F 21/53* | (2013.01) | |
| *A41D 3/00* | (2006.01) | |
| *G06F 1/16* | (2006.01) | |

(52) U.S. Cl.
CPC .............. *A41D 15/00* (2013.01); *A41D 31/00* (2013.01); *A41D 31/06* (2019.02); *D02G 3/36* (2013.01); *D02G 3/441* (2013.01); *D03D 1/0088* (2013.01); *D03D 15/47* (2021.01); *D03D 15/56* (2021.01); *D03D 15/567* (2021.01); *G05B 15/02* (2013.01); *G06Q 20/065* (2013.01); *G06Q 20/0658* (2013.01); *G06Q 20/12* (2013.01); *G06Q 20/3674* (2013.01); *G06Q 20/3829* (2013.01); *G06Q 20/401* (2013.01); *H04L 9/0637* (2013.01); *A41D 3/00* (2013.01); *A41D 2500/20* (2013.01); *D10B 2101/20* (2013.01); *D10B 2401/046* (2013.01); *D10B 2401/16* (2013.01); *D10B 2401/18* (2013.01); *D10B 2501/04* (2013.01); *D10B 2501/06* (2013.01); *G06F 1/163* (2013.01); *G06F 16/29* (2019.01); *G06F 21/53* (2013.01); *G06F 21/645* (2013.01); *H04L 9/0618* (2013.01); *H04L 9/0643* (2013.01); *H04L 9/3236* (2013.01); *H04L 9/3239* (2013.01); *H04L 67/12* (2013.01); *H04L 2209/38* (2013.01); *H04L 2209/56* (2013.01)

(58) Field of Classification Search
CPC .............. G06Q 20/0658; G06Q 20/065; G06Q 2220/00; H04L 9/0618; H04L 9/3236; H04L 9/0643; H04L 67/12; H04L 9/0637; H04L 2209/38; H04L 2209/56; H04L 9/3239; H04L 67/10; G06F 21/53; G06F 16/29; G06F 21/64
See application file for complete search history.

(56) References Cited

U.S. PATENT DOCUMENTS

| | | |
|---|---|---|
| 5,862,218 A | 1/1999 | Steinberg |
| 5,920,629 A | 7/1999 | Rosen |
| 5,966,446 A | 10/1999 | Davis |
| 6,363,481 B1 | 3/2002 | Hardjono |
| 7,028,263 B2 | 4/2006 | Maguire |
| 7,212,808 B2 | 5/2007 | Engstrom |
| 7,272,179 B2 | 9/2007 | Siemens et al. |
| 7,572,179 B2 | 8/2009 | Choi et al. |
| 7,729,950 B2 | 6/2010 | Mendizabal et al. |
| 8,245,038 B2 | 8/2012 | Golle et al. |
| 8,266,439 B2 | 9/2012 | Haber et al. |
| 8,442,903 B2 | 5/2013 | Zadoorian et al. |
| 8,560,722 B2 | 10/2013 | Gates et al. |
| 8,706,616 B1 | 4/2014 | Flynn |
| 8,712,887 B2 | 4/2014 | DeGroeve et al. |
| 8,867,741 B2 | 10/2014 | McCorkindale et al. |
| 8,943,332 B2 | 1/2015 | Horne et al. |
| 9,124,423 B2 | 9/2015 | Jennas, II et al. |
| 9,378,343 B1 | 6/2016 | David |
| 9,396,006 B2 | 7/2016 | Kundu et al. |
| 9,398,018 B2 | 7/2016 | MacGregor |
| 9,407,431 B2 | 8/2016 | Bellare et al. |
| 9,411,524 B2 | 8/2016 | O'Hare et al. |
| 9,411,976 B2 | 8/2016 | Irvine |
| 9,411,982 B1 | 8/2016 | Dippenaar et al. |
| 9,424,576 B2 | 8/2016 | Vandervort |
| 9,436,935 B2 | 9/2016 | Hudon |
| 9,472,069 B2 | 10/2016 | Roskowski |
| 9,489,827 B2 | 11/2016 | Quinn et al. |
| 9,584,493 B1 | 2/2017 | Leavy |
| 9,588,790 B1 | 3/2017 | Wagner |
| 9,722,790 B2 | 8/2017 | Ebrahimi |
| 9,818,109 B2 | 11/2017 | Loh |
| 9,830,580 B2 | 11/2017 | Macgregor |
| 9,875,510 B1 | 1/2018 | Kasper |
| 9,876,646 B2 | 1/2018 | Ebrahimi |
| 9,882,918 B1 | 1/2018 | Ford et al. |
| 10,102,265 B1 | 10/2018 | Madisetti |
| 10,102,526 B1 | 10/2018 | Madisetti |
| 10,108,954 B2 | 10/2018 | Dunlevy |
| 10,135,607 B1 | 11/2018 | Roets |
| 10,163,080 B2 | 12/2018 | Chow |
| 10,346,815 B2 | 7/2019 | Glover |
| 10,373,129 B1 | 8/2019 | James |
| 10,628,268 B1 | 4/2020 | Baruch |
| 10,826,685 B1 | 11/2020 | Campagna |
| 10,929,842 B1 | 2/2021 | Arvanaghi |
| 10,958,418 B2 | 3/2021 | Ajoy |
| 10,997,159 B2 | 5/2021 | Iwama |
| 2003/0018563 A1 | 1/2003 | Kilgour et al. |
| 2004/0085445 A1 | 5/2004 | Park |
| 2005/0206741 A1 | 9/2005 | Raber |
| 2006/0075228 A1 | 4/2006 | Black et al. |
| 2006/0184443 A1 | 8/2006 | Erez et al. |
| 2007/0027787 A1 | 2/2007 | Tripp |
| 2007/0094272 A1 | 4/2007 | Yeh |
| 2007/0174630 A1 | 7/2007 | Shannon |
| 2007/0296817 A1 | 12/2007 | Ebrahimi et al. |
| 2008/0010466 A1 | 1/2008 | Hopper |
| 2008/0028439 A1 | 1/2008 | Shevade |
| 2008/0059726 A1 | 3/2008 | Rozas |
| 2009/0025063 A1 | 1/2009 | Thomas |
| 2009/0287597 A1 | 11/2009 | Bahar |
| 2010/0049966 A1 | 2/2010 | Kato |
| 2010/0058476 A1 | 3/2010 | Isoda |
| 2010/0161459 A1 | 6/2010 | Kass et al. |
| 2010/0228798 A1 | 9/2010 | Kodama |
| 2010/0241537 A1 | 9/2010 | Kass et al. |
| 2011/0061092 A1 | 3/2011 | Bailloeul |
| 2011/0161674 A1 | 6/2011 | Ming |
| 2012/0203670 A1 | 8/2012 | Piersol |
| 2012/0264520 A1 | 10/2012 | Marsland |
| 2013/0142323 A1 | 6/2013 | Chiarella |
| 2013/0222587 A1 | 8/2013 | Roskowski |
| 2013/0276058 A1 | 10/2013 | Buldas |
| 2014/0201541 A1 | 7/2014 | Paul |
| 2014/0229738 A1 | 8/2014 | Sato |
| 2014/0282852 A1 | 9/2014 | Vestevich |
| 2014/0289802 A1 | 9/2014 | Lee |
| 2014/0344015 A1 | 11/2014 | Puertolas-Montasnes et al. |
| 2015/0193633 A1 | 7/2015 | Chida |
| 2015/0206106 A1 | 7/2015 | Yago |
| 2015/0242835 A1 | 8/2015 | Vaughan |
| 2015/0244729 A1 | 8/2015 | Mao |
| 2015/0309831 A1 | 10/2015 | Powers |

(56) References Cited

U.S. PATENT DOCUMENTS

| | | |
|---|---|---|
| 2015/0332256 A1 | 11/2015 | Minor |
| 2015/0378627 A1 | 12/2015 | Kitazawa |
| 2015/0379484 A1 | 12/2015 | McCarthy |
| 2016/0071096 A1 | 3/2016 | Rosea |
| 2016/0098578 A1 | 4/2016 | Hincker |
| 2016/0119134 A1 | 4/2016 | Hakoda et al. |
| 2016/0148198 A1 | 5/2016 | Kelley |
| 2016/0162897 A1 | 6/2016 | Feeney |
| 2016/0217436 A1 | 7/2016 | Brama |
| 2016/0239653 A1 | 8/2016 | Loughlin-Mchugh |
| 2016/0253663 A1 | 9/2016 | Clark et al. |
| 2016/0260091 A1 | 9/2016 | Tobias |
| 2016/0267472 A1 | 9/2016 | Lingham et al. |
| 2016/0267558 A1 | 9/2016 | Bonnell et al. |
| 2016/0275294 A1 | 9/2016 | Irvine |
| 2016/0283920 A1 | 9/2016 | Fisher et al. |
| 2016/0292396 A1 | 10/2016 | Akerwall |
| 2016/0292672 A1 | 10/2016 | Fay et al. |
| 2016/0292680 A1 | 10/2016 | Wilson, Jr. et al. |
| 2016/0294783 A1 | 10/2016 | Piqueras Jover |
| 2016/0300200 A1 | 10/2016 | Brown et al. |
| 2016/0300234 A1 | 10/2016 | Moss-Pultz et al. |
| 2016/0321675 A1 | 11/2016 | McCoy et al. |
| 2016/0321751 A1 | 11/2016 | Creighton, IV et al. |
| 2016/0321769 A1 | 11/2016 | McCoy |
| 2016/0328791 A1 | 11/2016 | Parsells et al. |
| 2016/0330031 A1 | 11/2016 | Drego et al. |
| 2016/0330244 A1 | 11/2016 | Denton |
| 2016/0337119 A1 | 11/2016 | Hosaka et al. |
| 2016/0342977 A1 | 11/2016 | Lam |
| 2016/0342989 A1 | 11/2016 | Davis |
| 2016/0344737 A1 | 11/2016 | Anton et al. |
| 2016/0371771 A1 | 12/2016 | Serrano |
| 2017/0005797 A1 | 1/2017 | Lanc et al. |
| 2017/0005804 A1 | 1/2017 | Zinder |
| 2017/0033933 A1 | 2/2017 | Haber |
| 2017/0053249 A1 | 2/2017 | Tunnell et al. |
| 2017/0061396 A1 | 3/2017 | Melika et al. |
| 2017/0075938 A1 | 3/2017 | Black |
| 2017/0103167 A1 | 4/2017 | Shah |
| 2017/0124534 A1 | 5/2017 | Savolainen |
| 2017/0124535 A1 | 5/2017 | Juels et al. |
| 2017/0161439 A1 | 6/2017 | Raduchel |
| 2017/0177898 A1 | 6/2017 | Dillenberger |
| 2017/0178237 A1 | 6/2017 | Wong |
| 2017/0213287 A1 | 7/2017 | Bruno |
| 2017/0221052 A1 | 8/2017 | Sheng |
| 2017/0228731 A1 | 8/2017 | Sheng |
| 2017/0236123 A1 | 8/2017 | Ali |
| 2017/0243208 A1 | 8/2017 | Kurian et al. |
| 2017/0243289 A1 | 8/2017 | Rufo |
| 2017/0244757 A1 | 8/2017 | Castinado et al. |
| 2017/0330279 A1 | 11/2017 | Ponzone |
| 2017/0344983 A1 | 11/2017 | Muftic |
| 2017/0352031 A1 | 12/2017 | Collin |
| 2017/0353309 A1 | 12/2017 | Gray |
| 2017/0373859 A1 | 12/2017 | Shors et al. |
| 2018/0005186 A1 | 1/2018 | Hunn |
| 2018/0075239 A1 | 3/2018 | Boutnaru |
| 2018/0075527 A1 | 3/2018 | Nagla et al. |
| 2018/0091524 A1 | 3/2018 | Setty |
| 2018/0097779 A1 | 4/2018 | Karame et al. |
| 2018/0101701 A1 | 4/2018 | Barinov |
| 2018/0101842 A1 | 4/2018 | Ventura |
| 2018/0108024 A1* | 4/2018 | Greco ................... H04L 9/0637 |
| 2018/0117446 A1 | 5/2018 | Tran |
| 2018/0123779 A1* | 5/2018 | Zhang ................... H04L 9/3297 |
| 2018/0139042 A1 | 5/2018 | Binning |
| 2018/0157700 A1 | 6/2018 | Roberts |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1* | 6/2018 | Leporini ................. G06F 21/31 |
| 2018/0182042 A1 | 6/2018 | Vinay |
| 2018/0189333 A1 | 7/2018 | Childress |
| 2018/0189781 A1 | 7/2018 | McCann |
| 2018/0204213 A1 | 7/2018 | Zappier |
| 2018/0219683 A1 | 8/2018 | Deery |
| 2018/0219685 A1 | 8/2018 | Deery |
| 2018/0225640 A1 | 8/2018 | Chapman |
| 2018/0241565 A1 | 8/2018 | Paolini-Subramanya |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1 | 11/2018 | Hurley |
| 2018/0316502 A1 | 11/2018 | Nadeau |
| 2018/0365201 A1 | 12/2018 | Hunn |
| 2018/0365764 A1 | 12/2018 | Nelson |
| 2019/0012637 A1* | 1/2019 | Gillen ................... H04L 9/0637 |
| 2019/0013948 A1 | 1/2019 | Mercuri |
| 2019/0018947 A1 | 1/2019 | Li |
| 2019/0036887 A1 | 1/2019 | Miller |
| 2019/0043048 A1 | 2/2019 | Wright |
| 2019/0044727 A1 | 2/2019 | Scott |
| 2019/0050855 A1 | 2/2019 | Martino |
| 2019/0057382 A1 | 2/2019 | Wright |
| 2019/0073666 A1 | 3/2019 | Ortiz |
| 2019/0080284 A1* | 3/2019 | Kim ....................... G06Q 50/28 |
| 2019/0081793 A1 | 3/2019 | Martino |
| 2019/0087446 A1 | 3/2019 | Sharma |
| 2019/0123889 A1 | 4/2019 | Schmidt-Karaca |
| 2019/0132350 A1 | 5/2019 | Smith |
| 2019/0188699 A1 | 6/2019 | Thibodeau |
| 2019/0197532 A1 | 6/2019 | Jay |
| 2019/0205563 A1* | 7/2019 | Gonzales, Jr. ........ H04L 9/0637 |
| 2019/0236286 A1 | 8/2019 | Scriber |
| 2019/0251557 A1 | 8/2019 | Jin |
| 2019/0253258 A1 | 8/2019 | Thekadath |
| 2019/0268141 A1 | 8/2019 | Pandurangan |
| 2019/0268163 A1 | 8/2019 | Nadeau |
| 2019/0281259 A1 | 9/2019 | Palazzolo |
| 2019/0287107 A1 | 9/2019 | Gaur |
| 2019/0288832 A1 | 9/2019 | Dang |
| 2019/0296915 A1 | 9/2019 | Lancashire |
| 2019/0303623 A1 | 10/2019 | Reddy |
| 2019/0303887 A1* | 10/2019 | Wright ............... G06Q 20/0658 |
| 2019/0324867 A1 | 10/2019 | Tang |
| 2019/0334715 A1 | 10/2019 | Gray |
| 2019/0342422 A1 | 11/2019 | Li |
| 2019/0347444 A1 | 11/2019 | Lowagie |
| 2019/0347628 A1 | 11/2019 | Al-Naji |
| 2019/0349190 A1 | 11/2019 | Smith |
| 2019/0349426 A1 | 11/2019 | Smith |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0372770 A1 | 12/2019 | Xu |
| 2019/0378128 A1 | 12/2019 | Moore |
| 2019/0391540 A1 | 12/2019 | Westervelt |
| 2019/0391858 A1 | 12/2019 | Studnicka |
| 2019/0394044 A1 | 12/2019 | Snow |
| 2019/0394048 A1 | 12/2019 | Deery |
| 2020/0004946 A1 | 1/2020 | Gilpin |
| 2020/0005290 A1 | 1/2020 | Madisetti |
| 2020/0034813 A1 | 1/2020 | Calinog |
| 2020/0042635 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |

(56) References Cited

U.S. PATENT DOCUMENTS

| | | |
|---|---|---|
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow et al. |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0089690 A1 | 3/2020 | Qiu |
| 2020/0099534 A1 | 3/2020 | Lowagie |
| 2020/0104712 A1 | 4/2020 | Katz |
| 2020/0118068 A1* | 4/2020 | Turetsky ............ G06Q 30/018 |
| 2020/0145219 A1 | 5/2020 | Sebastian |
| 2020/0167870 A1 | 5/2020 | Isaacson |
| 2020/0175506 A1 | 6/2020 | Snow |
| 2020/0195441 A1 | 6/2020 | Suen |
| 2020/0211011 A1 | 7/2020 | Anderson |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |
| 2020/0302433 A1 | 9/2020 | Green |
| 2020/0389294 A1 | 12/2020 | Soundararajan |
| 2021/0174353 A1 | 6/2021 | Snow |
| 2021/0200653 A1 | 7/2021 | Jetzfellner |
| 2021/0266174 A1 | 8/2021 | Snow |
| 2021/0272103 A1 | 9/2021 | Snow |
| 2021/0273810 A1 | 9/2021 | Lynde |
| 2021/0273816 A1 | 9/2021 | Deery et al. |
| 2021/0326815 A1* | 10/2021 | Brody ............... G06F 16/2379 |
| 2021/0328804 A1 | 10/2021 | Snow |

FOREIGN PATENT DOCUMENTS

| | | |
|---|---|---|
| FI | DE 10128728 | 1/2003 |
| JP | 5383297 | 1/2014 |
| KR | 100653512 | 12/2006 |
| KR | 101747221 | 6/2017 |
| WO | WO 0049797 | 8/2000 |
| WO | WO 2007069176 | 6/2007 |
| WO | WO 2015077378 | 5/2015 |
| WO | WO 2018013898 | 1/2018 |
| WO | WO 2018109010 I | 6/2018 |
| WO | WO 2018127923 | 7/2018 |
| WO | WO 2019180702 | 9/2019 |
| WO | WO 2019/207504 | 10/2019 |

OTHER PUBLICATIONS

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Crosby, Micha Ft et al., "BlockChain Technology, Beyond Bitcoin", Sutardj a Center for Entrepreneurship & Technology, Berkeley Engineering, Oct. 16, 2015, 35 pages.

Al-Naji, Nader et al., "Basis: A Price-Stable Cryptocurrency with an Algorithmic Central Bank" www.basis.io Jun. 20, 2017, 27 pages.

Watanabe, Hiroki, et al. "Blockchain contract: Securing a blockchain applied to smart contracts." *2016 IEEE International Conference on Consumer Electronics (ICCE)*. IEEE, 2016.

"BlockChain Technology", Berkeley Engineering.

Alsolami, Fahad, and Terrance E. Boult. "CloudStash: using secret-sharing scheme to secure data, not keys, in multi-clouds." *Information Technology: New Generations (ITNG), 2014 11th International Conference on. IEEE*, 2014.

"Midex", https://promo.midex.com/Midex_EN.pdf.

Xtrade White Paper, https://xtradel-9649.kxcdn.com/wp-content/uploads/2017/09/xtrade-whitepaper.pdf.

Chakravorty, Antorweep, and Chunming Rong. "Ushare: user controlled social media based on blockchain." *Proceedings of the 11th International Conference on Ubiquitous Information Management and Communication*. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

Menezes, Alfred. J., et al. "Handbook of Applied Cryptography," 1997, CRC Press, p. 527-28.

White, Ron, "How Computers Work," Oct. 2003, QUE, Seventh Edition (Year: 2003), 23 pages.

Luu et al., Making Smart Contracts Smarter, 2016.

Feng and Luo, "Evaluating Memory-Hard Proof-of-Work Algorithms on Three Processors," PVLDB, 13(6): 898-911, 2020.

Luther, "Do We Need A "Fedcoin" Cryptocurrency?," ValueWalk, Newstex Global Business Blogs, Dec. 30, 2015 (Year: 2015).

Iddo Bentov, Bitcoin and Secure Computation with Money, May 2016 (Year: 2016).

United States: New Generation cryptocurrency, USDX Protocol, Offers Crypto Advantages and Fiat Pegging, Apr. 2, 2018 (Year: 2018).

Ana Reyna et al.; "On blockchain and its integration with IoT. Challenges and opportunities." Future Generation Computer Systems. vol. 88, Nov. 2018, pp. 173-190. https://www.sciencedirect.com/science/article/pii/S0167739X17329205 (Year: 2018).

Krol, Michal et al., "SPOC: Secure Payments for Outsourced Computations" https://arxiv.org/pdf/1807.06462.pdf. (Year: 2018).

Dai et al., "TrialChain: A Blockchain-Based Platform to Validate Data Integrity in Large, Biomedical Research Studies," arXiv: 1807.03662, Jul. 10, 2018 (Year: 2018).

Eberhardt et al., "ZoKrates—Scalable Privacy-Preserving Off-Chain Computations," https://ieeexplore.ieee.org/stamp/stamp.jsp?tp=&arnumber=8726497. (Year:2018).

\* cited by examiner

DIGITAL CONTRACTS IN BLOCKCHAIN ENVIRONMENTS

CROSS-REFERENCE TO RELATED APPLICATIONS

This patent application claims domestic benefit of U.S. Provisional Application No. 62/714,909 filed Aug. 6, 2018 and incorporated herein by reference in its entirety. This patent application relates to U.S. application Ser. No. 15/983,572 filed May 18, 2018 and incorporated herein by reference in its entirety. This patent application also relates to U.S. application Ser. No. 15/983,595 filed May 18, 2018, since issued as U.S. Pat. No. 11,134,120, and incorporated herein by reference in its entirety. This patent application also relates to U.S. application Ser. No. 15/983,612 filed May 18, 2018, since issued as U.S. Pat. No. 10,783,164, and incorporated herein by reference in its entirety. This patent application also relates to U.S. application Ser. No. 15/983,632 filed May 18, 2018 and incorporated herein by reference in its entirety. This patent application also relates to U.S. application Ser. No. 15/983,655 filed May 18, 2018, since issued as U.S. Pat. No. 11,170,366, and incorporated herein by reference in its entirety. This patent application also relates to U.S. application Ser. No. 16/116,966, filed Aug. 30,2018 and incorporated herein by reference in its entirety. This patent application also relates to U.S. application Ser. No. 16/116,967, filed Aug. 30, 2018 and incorporated herein by reference in its entirety. This patent application also relates to U.S. application Ser. No. 16/116,969, filed Aug. 30,2018 and incorporated herein by reference in its entirety. This patent application also relates to U.S. application Ser. No. 16,116,970, filed Aug. 30, 2018 and incorporated herein by reference in its entirety. This patent application also relates to U.S. application Ser. No. 16/116,972, filed Aug. 30. 2018 and incorporated herein by reference in its entirety.

BACKGROUND

Blockchain usage is growing. As cryptographic blockchain gains acceptance, improved techniques are needed for executing digital contracts.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

Figure 1:
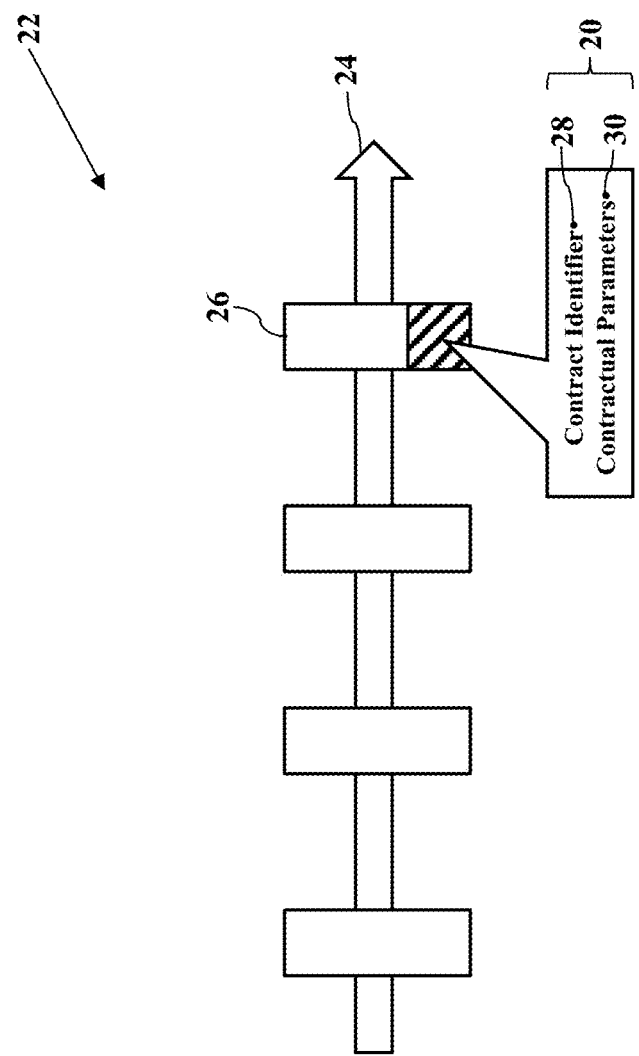
FIGS. 1-13 are simplified illustrations of a digital contract in a blockchain environment, according to exemplary embodiments.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIGS. 1-13 are simplified illustrations of a digital contract 20 in a blockchain environment 22, according to exemplary embodiments. The digital contract 20 is sometimes referred to as a self-executing or "smart" contract between parties to a transaction. The digital contract 20 may be executable code that runs on a blockchain 24. The blockchain 24 has one or more blocks 26 of data. A conventional smart contract facilitates, executes, and/or enforces the terms of an agreement. Whatever the terms, the digital contract 20 may automatically execute the terms once predetermined logical rules, conditions, or code is satisfied. The digital contract 20 may thus be expressed in a programming language. Smart contracts are generally known, so this disclosure will not dwell on the known aspects.

Here, though, the blockchain 24 need only reference the digital contract 20. That is, the actual programming language defining the digital contract 20 need not be included within or attached to the blockchain 24. Instead, the blockchain 24 need only include or specify a contract identifier 28 and perhaps one or more contractual parameters 30. The contract identifier 28 is any digital identifying information that uniquely identifies or references the digital contract 20. Similarly, the contractual parameters 30 may digitally identify the parties to the digital contract 20, their respective performance obligations and terms, and even consideration. So, instead of the blockchain 24 carrying or conveying the actual code representing the digital contract 20, exemplary embodiments need only specify the contract identifier 28 and perhaps the contractual parameters 30. The blocks 26 of data within the blockchain 24 are thus not burdened with the programming code that is required to execute the digital contract 20. The blockchain 24 need only include or specify the contract identifier 28 and/or the contractual parameters 30 (or their respective hash values), thus greatly simplifying the blockchain 24 and reducing its size (in bytes) and processing requirements.

Figure 2:
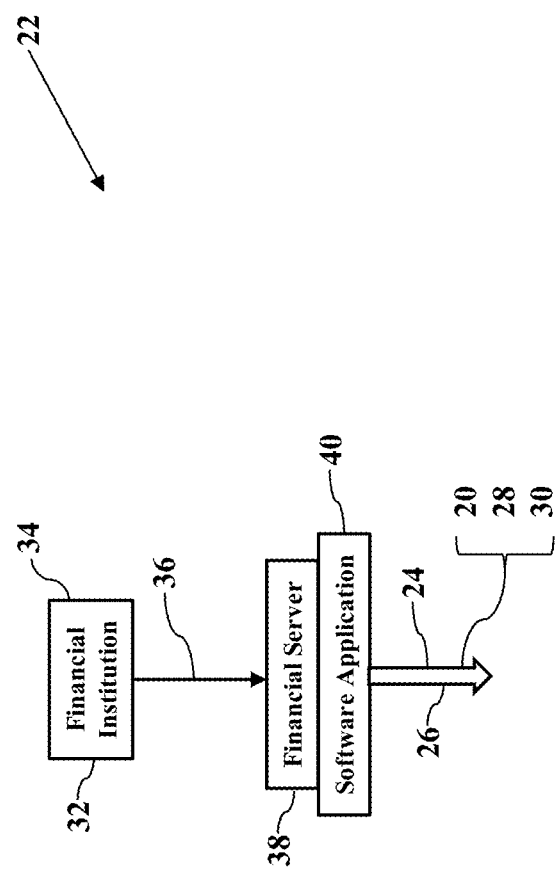

FIG. 2 further illustrates the blockchain 24. Here any entity 32 may generate the blockchain 24. While exemplary embodiments may be applied to any entity 32, most readers are thought familiar with financial services. That is, suppose the entity 32 is a bank, lender, or other financial institution 34 (such as PIMCO®, CITI®, or BANK OF AMERICA®). As the reader likely understands, the financial institution 34 creates a massive amount of banking records, transaction records, mortgage instruments, and other private data 36. The financial institution 34 thus has a financial server 38 executing a software application 40 that encrypts its private data 36. While the software application 40 may use any encryption scheme, FIG. 2 illustrates the private blockchain 24. That is, the software application 40 causes the financial server 38 to cryptographically hash the private data 36 and to integrate the resulting hash value(s) into the block 26 of data within the private blockchain 24. Moreover, because the private data 36 may represent contractual obligations between parties, the software application 40 may further cause the blockchain 24 to include the contract identifier 28 and the contractual parameters 30. The contract identifier 28 and the contractual parameters 30 may be encoded as data or information contained within the block 26 of data, or the contract identifier 28 and the contractual parameters 30 may be data or information that is separate from the block 26 of data (such as informational content in metadata or in a packet header/body). Regardless, the blockchain 24 need not include the programming code representing the digital contract 20. The blockchain 24 need only specify the contract identifier 28 and/or the contractual parameters 30.

Figure 3:
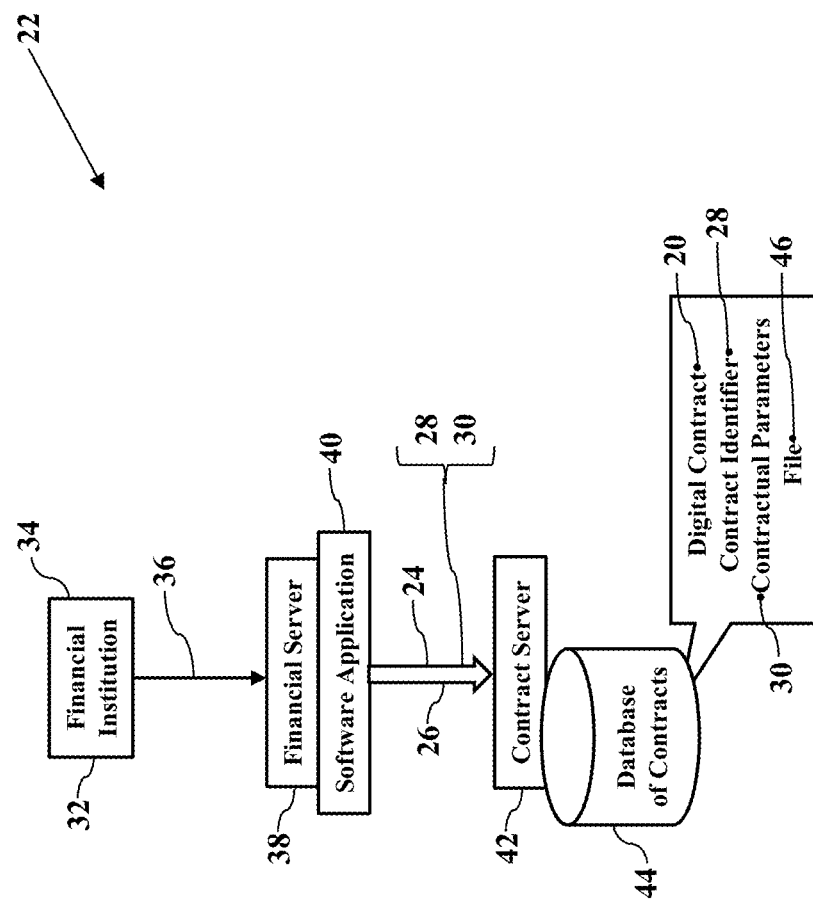

FIG. 3 illustrates a contract server 42. The contract server 42 may be responsible for executing the digital contract 20 referenced by the contract identifier 28 and/or the contractual parameters 30. For example, after the financial server 38 (executing the software application 40) generates the block 26 of data within the blockchain 24, the financial server 38 may send the blockchain 24 to the network address (e.g., Internet protocol address) associated with the contract server 42. When the contract server 42 receives the blockchain 24, the contract server 42 inspects the blockchain 24 to identify the contract identifier 28 and/or the contractual parameters 30. Once the contract identifier 28 is determined, the contract server 42 may then consult an electronic database 44 of contracts. The database 44 of contracts has entries that map or relate the contract identifier 28 to its corresponding digital contract 20. The database 44 of contracts, in other words, may identify a computer file 46 that contains the programming language representing the digital contract 20 identified by the contract identifier 28. So, once the digital contract 20 is determined, the contract server 42 may retrieve and locally execute the computer file 46, perhaps based on parameters defined or described by the contractual parameters 30 (such as party names, parameters associated with their respective performance obligations and terms, and consideration). Again, then, the blockchain 24 need only reference the digital contract 20 (using the contract identifier 28 and/or the contractual parameters 30). The actual execution of the digital contract 20 may be offloaded or outsourced to the contract server 42.

Figure 4:
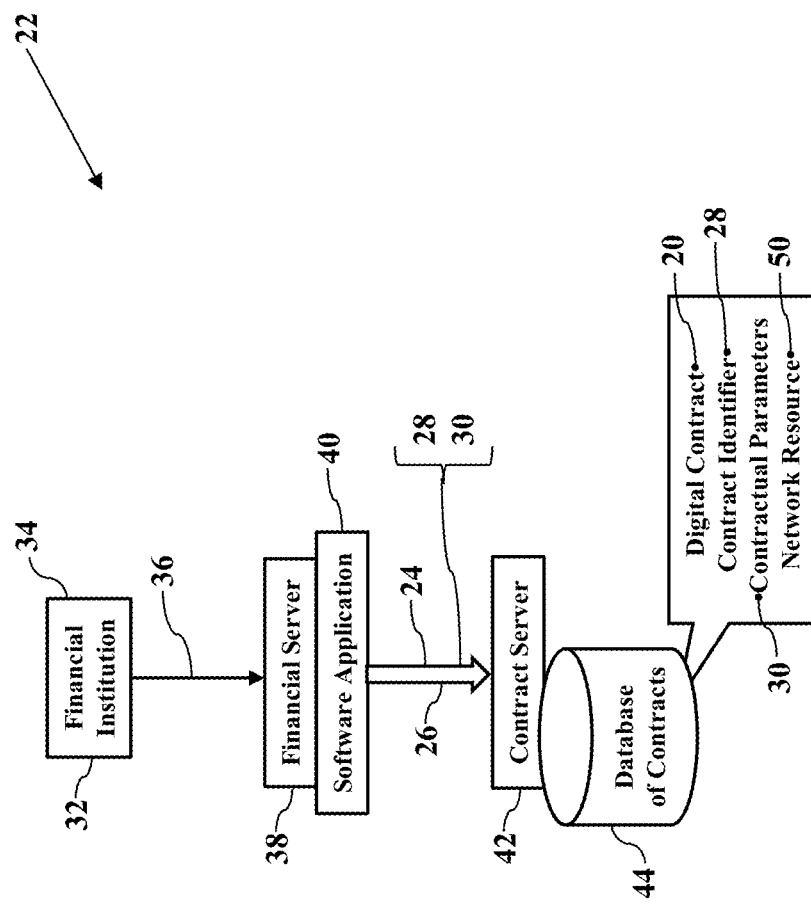

FIG. 4 also illustrates the contract server 42. Here, though, the contract server 42 may only manage the execution of the digital contract 20 referenced by the contract identifier 28 and/or the contractual parameters 30. That is, the contract server 42 may outsource the execution of the digital contract 20 to a vendor, a supplier, or a subcontractor process. Again, when the contract server 42 receives the blockchain 24, the contract server 42 inspects the blockchain 24 to identify the contract identifier 28 and/or the contractual parameters 30. The contract server 42 may then consult the database 44 of contracts. Here, though, the database 44 of contracts has entries that map or relate the contract identifier 28 to a network resource 50 that processes and/or executes the digital contract 20 as a service (perhaps as a software-as-a-service or "SAAS"). The network resource 50 may thus be a remote server, a virtual machine, a web page or web server, a client device/machine, or other resource that executes the digital contract 20. Once the network resource 50 is determined, the contract server 42 may retrieve and send the contractual parameters 30 to the network resource 50 for execution. The network resource 50 (perhaps operated on behalf of a third party) applies the parameters defined or described by the contractual parameters 30 to the programming code representing the digital contract 20.

Exemplary embodiments thus only need to identify the digital contract 20. The contract identifier 28 and the contractual parameters 30 need only be informational content in the private blockchain 24. The contract identifier 28 is any digital identifying information that uniquely identifies or references the digital contract 20. The contract identifier 28 may be an alphanumeric combination that uniquely identifies a vendor and/or version of the digital contract 20 and/or a processor or executioner of the digital contract 20. The contract identifier 28 may be expressed as a unique hash value that is included within, or specified by, the private blockchain 24. Similarly, the contractual parameters 30 may identify the parties to the digital contract 20, their respective performance obligations and terms, and consideration.

Figure 5:
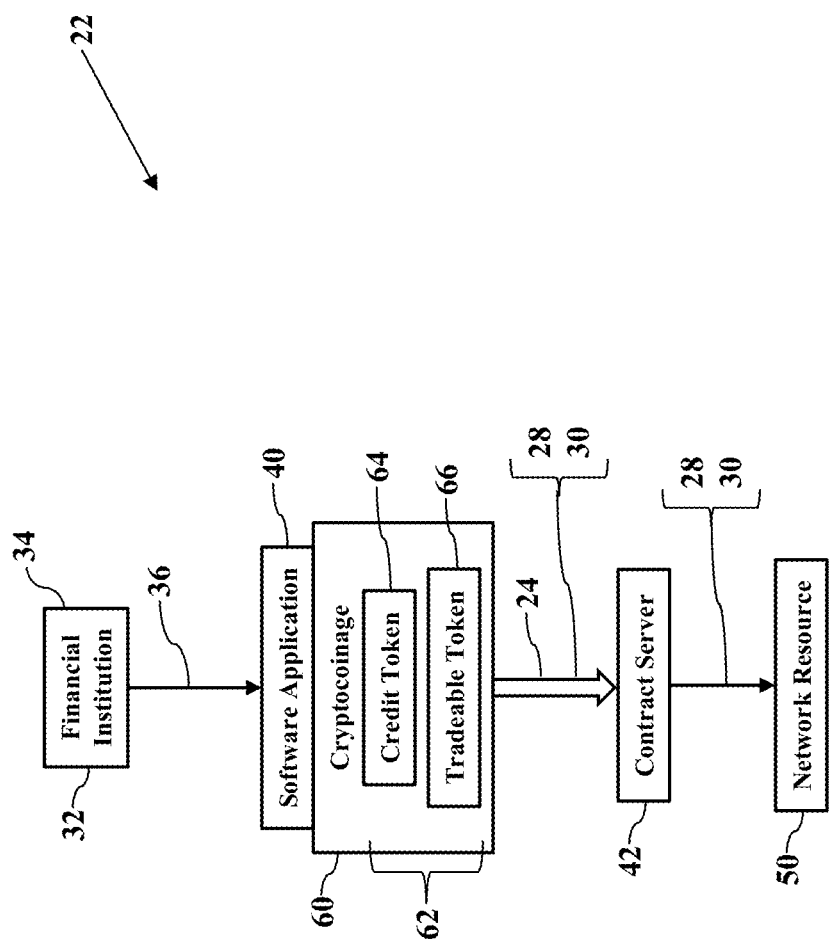

FIG. 5 illustrates consideration. When the digital contract 20 is executed, the parties to the digital contract 20 may be compensated (perhaps according to the contractual parameters 30 describing consideration). Moreover, the contract server 42 and/or the network resource 50 may also be compensated. While there are many compensation schemes, this disclosure mostly explains crypto-compensation. That is, when the digital contract 20 successfully executes, perhaps the parties exchange, trade, or transfer cryptographic currencies. Suppose, for example, that the financial institution 34 creates its own cryptographic coinage 60 in the blockchain environment 22. The entity 32, in other words, may establish entity-specific electronic tokens 62 to access and/or to use the blockchain environment 22. Because the private blockchain 24 represents hashes of the financial institution's private data 36, the private blockchain 24 may be considered a private resource or property of the financial institution 34. That is, the private blockchain 24 is controlled by, or affiliated with, the financial institution 34, so the financial institution 34 may control who adds and/or writes to the private blockchain 24 and who reads, accesses, or receives the private blockchain 24.

The entity-specific tokens 62 may thus be control mechanisms. While the entity-specific tokens 62 may have any functional scheme, FIG. 5 illustrates a private credit token 64 and a private tradeable token 66. The entity's credit token 64, for example, may be acquired and then spent or burned when accessing the financial institution's private blockchain 24. The entity's credit token 64, in other words, represents any credit-based entry system associated with the financial institution's private blockchain 24. The tradeable token 66, on the other hand, may be generated for transfer among others. The entity 32 generates the tradeable token 66 to be traded and/or spent. The tradeable token 66, in other words, may be considered as the entity's specific, private currency to be used as the entity 32 governs.

Exemplary embodiments may thus trade or exchange crypto-compensation. That is, when the digital contract 20 successfully executes, perhaps the parties exchange, trade, or transfer the credit token 64 and/or the tradeable token 66. When any party, or all the parties, perform their assigned role in the transaction, value is given via the credit token 64 and/or the tradeable token 66. Similarly, the contract server 42 and/or the network resource 50 may also be compensated via the credit token 64 and/or the tradeable token 66, perhaps as a "mining" fee for executing the digital contract 20.

The digital contract 20 is thus a computer program or code that verifies and/or enforces negotiation and/or performance of a contract between parties. One fundamental purpose of so-called smart contracts is to integrate the practice of contract law and related business practices with electronic commerce protocols between parties or devices via the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contract infrastructure can be implemented by replicated asset registries and contract execution using cryptographic hash chains and *Byzantine* fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

Figure 6:
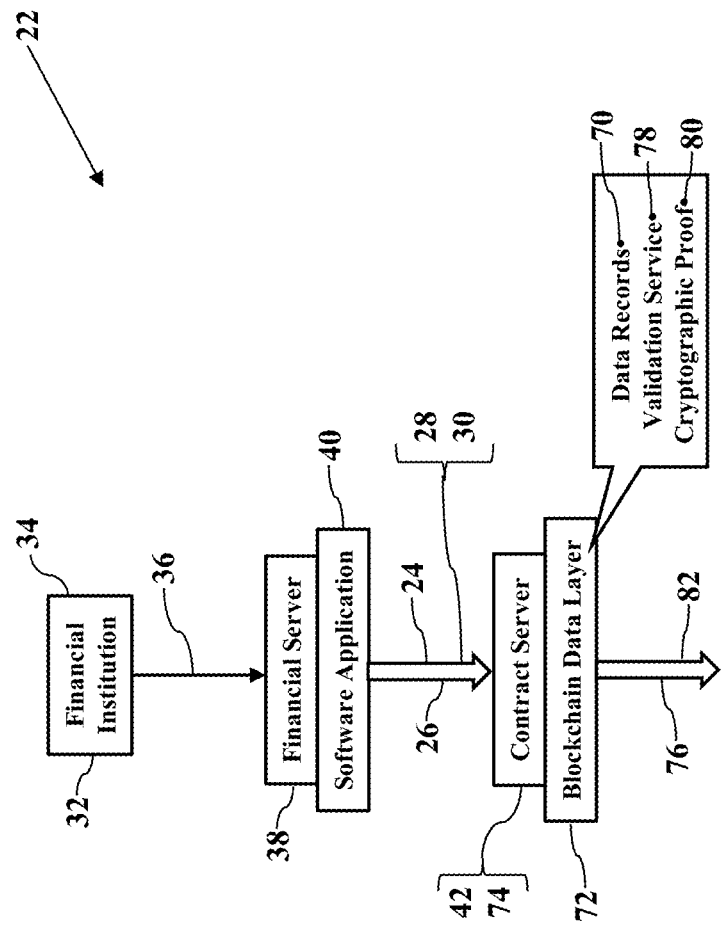

FIG. 6 further illustrates the contract server 42. When the contract server 42 receives the blockchain 24, here the contract server 42 may generate data records 70 in a blockchain data layer 72, as later paragraphs will explain. The contract server 42 may thus be termed or called a data layer server 74. Moreover, the blockchain data layer 72 may also add another layer of cryptographic hashing to generate a public blockchain 76. The blockchain data layer 72 acts as a validation service 78 that validates the digital contract 20 was executed. Moreover, the blockchain data layer 72 may generate a cryptographic proof 80. The public blockchain 76 thus publishes the cryptographic proof 80 as a public ledger 82 that establishes chains of blocks of immutable evidence.

Figure 7:
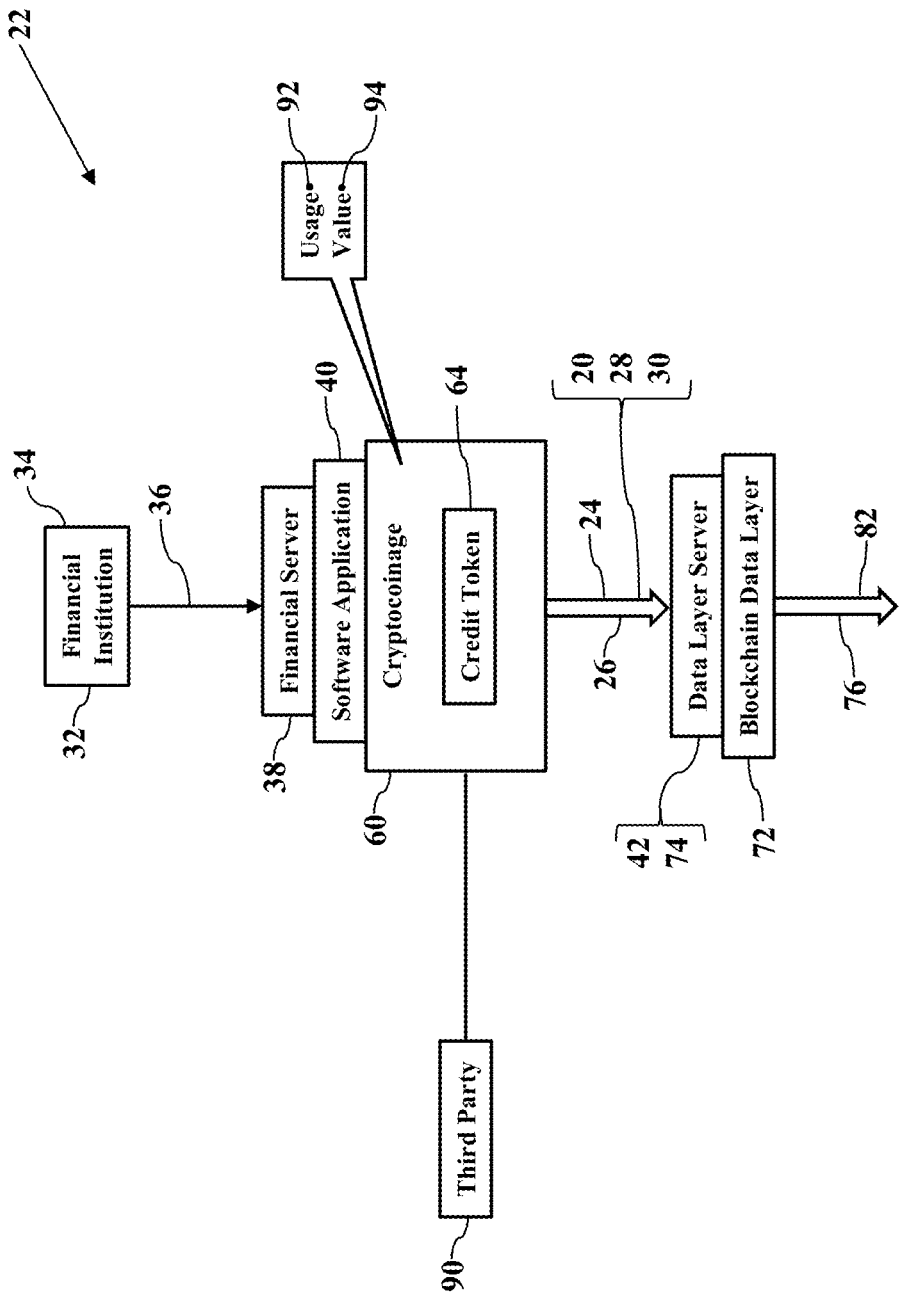
Figure 8:
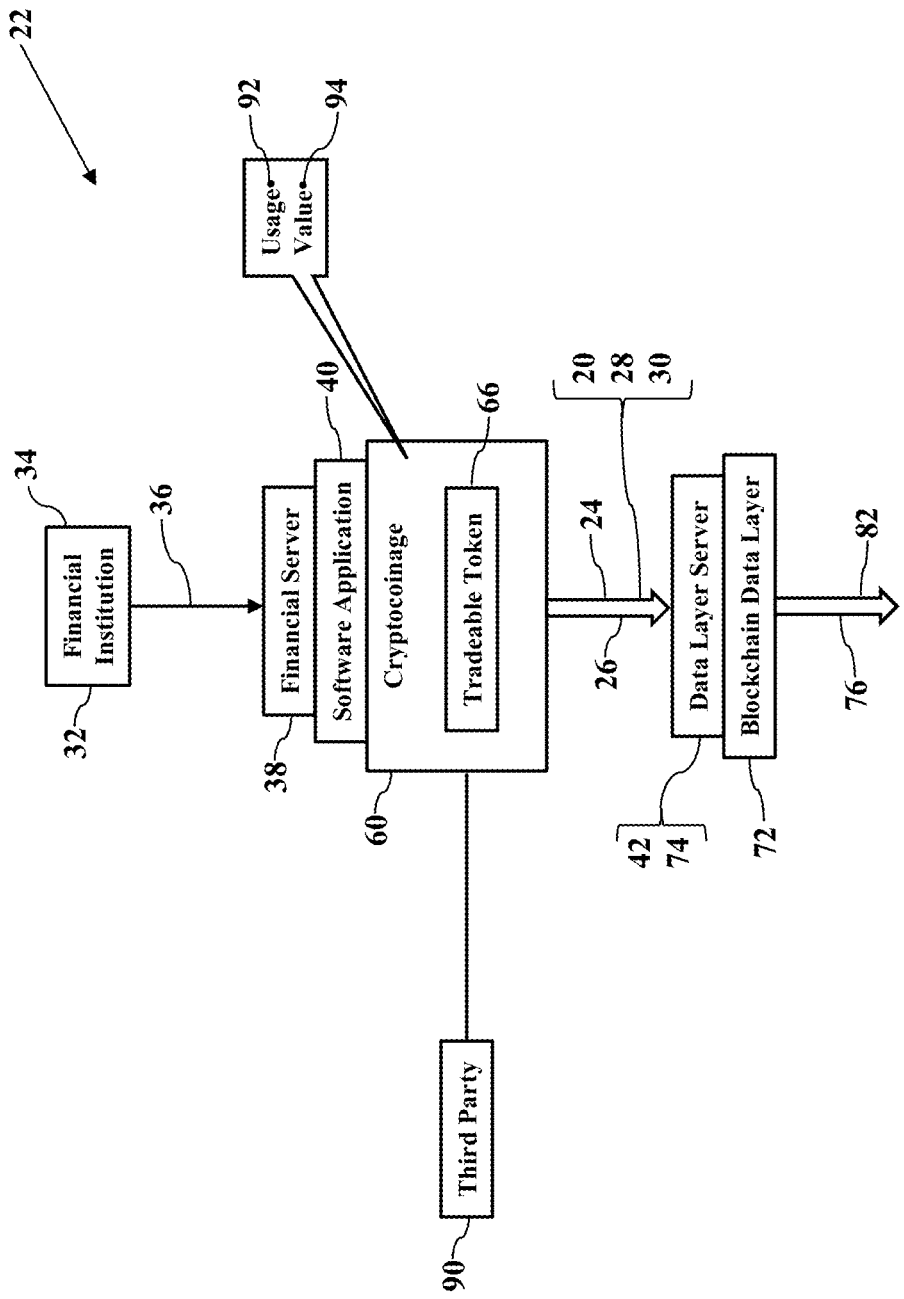

FIGS. 7-8 illustrate examples of the entity-specific tokens 62. Suppose that a third-party 90 wishes to receive, read, write to, or otherwise access the financial institution's private blockchain 24 and/or the digital contract 20. As FIG. 7 illustrates, exemplary embodiments may require that the third-party 90 spend or burn one or more of the credit tokens 64. The credit token 64 may thus control access to the financial institution's private blockchain 24 and/or the digital contract 20. The inventor envisions that vendors, service providers, individual users, and other third-parties 60 may wish to access the hash values of the private data 36 contained within the financial institution's private blockchain 24. Moreover, the third party may want to access, inspect, execute, or verify the digital contract 20. The financial institution 34 may thus require that the third-party 90 redeem the entity's credit token(s) 50 before granting read, write, or access permission to the digital contract 20. The financial institution 34 may additionally or alternatively require redemption of the entity's credit token(s) 64 for using protocols, rules, and application programming interfaces ("APIs") associated with the private blockchain 24 and/or the digital contract 20. The financial institution 34 may thus establish or issue its own credit tokens 64 and even govern their usage restrictions 92 and value 94, as later paragraphs will explain.

FIG. 8 illustrates the tradeable token 66. The financial institution 34 may establish the tradeable token 66 and also govern its usage restrictions 92 and value 94. The tradeable token 66, in other words, is a cryptocurrency or "coin." Again, while exemplary embodiments may utilize any functional scheme, the tradeable token 66 may be earned. That is, anyone (such as the third party 90) may earn the tradeable token 66 according to the usage restrictions 92. For example, suppose the data layer server 74 earns the entity's tradeable token(s) 52 in exchange for processing and/or managing an execution of the digital contract 20. The data layer server 74 may additionally or alternatively earn the entity's tradeable token(s) 52 in exchange for the validation service 78. That is, a provider of the validation service 78 is paid, or earns, the entity's tradeable token(s) 52 for processing or executing the digital contract 20 and/or for cryptographically hashing the proof 80 of the digital contract 20. The provider of the validation service 78 may also be paid in the entity's tradeable token(s) 52 for publishing the proof 80. The tradeable token 66 may thus be transferred as currency according to the usage restrictions 92 and its value 94.

Figure 9:
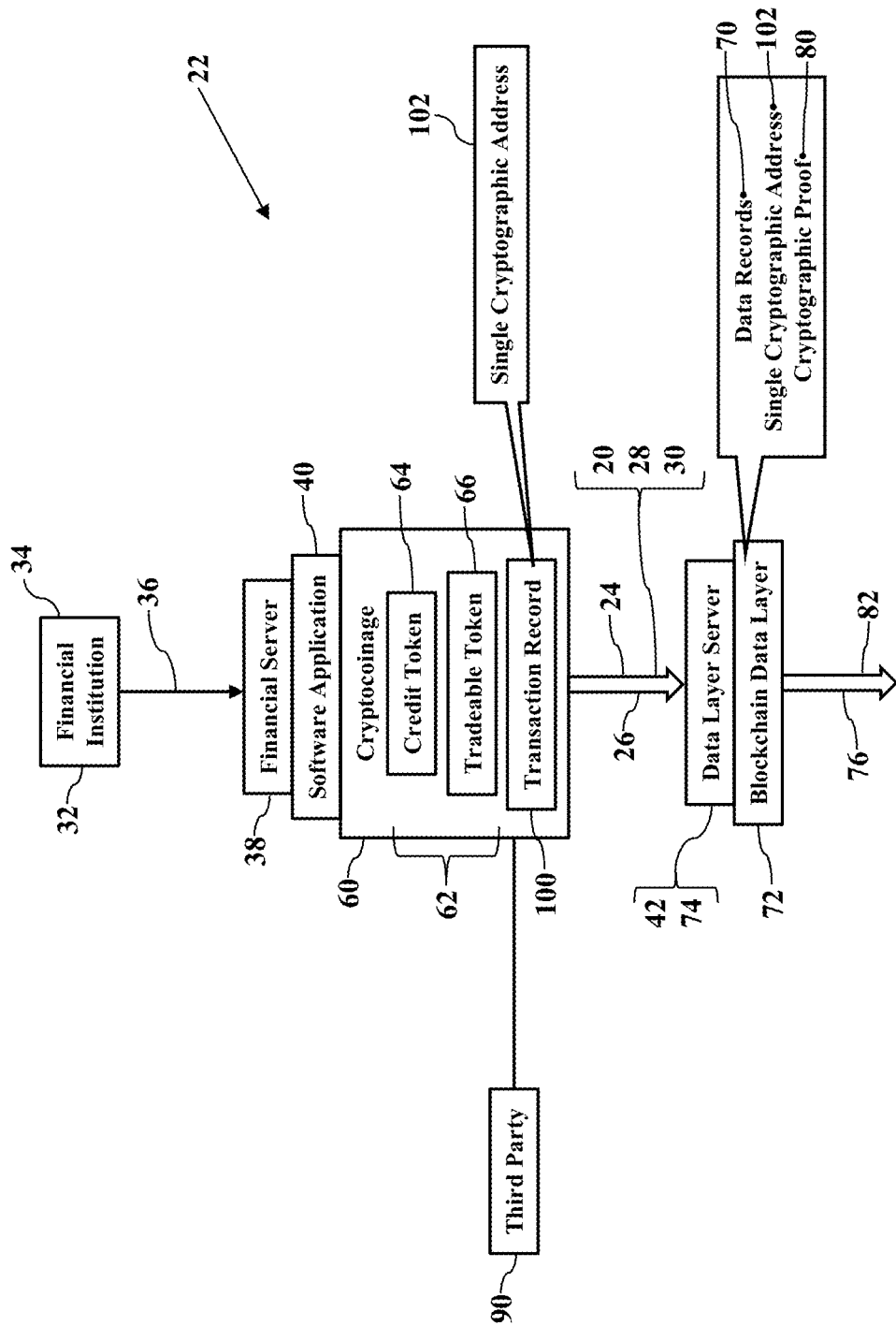

FIG. 9 illustrates transaction records 100. Whenever the entity-specific tokens 62 are created, owned, or transferred, the transaction record 100 may be generated. The transaction record 100 may then be documented in the blockchain environment 22. For example, the entity-specific tokens 62 may be addressable. That is, the credit token 64 and the tradeable token 66 may be uniquely associated with a common, single cryptographic address 102. The cryptographic address 102 may represent an owner or holder (e.g., the entity 32 or the third-party 90). When the entity-specific tokens 62 are created, generated, or assigned, the entity-specific tokens 62 may be assigned or associated with the cryptographic address 102. The cryptographic address 102 may then be received by, and propagated within, the blockchain data layer 72 to identify the corresponding data records 70. The blockchain data layer 72 may even hash the cryptographic address 102 as the cryptographic proof 80 of the transaction records 100. Exemplary embodiments thus publicly document the transaction records 100 involving the entity-specific tokens 62, based on the single cryptographic address 102. In simple words, the blockchain data layer 72 publishes ownership and transfer proofs 80 of the credit token 64 and the tradeable token 66 based on the transaction records 100 associated with the single cryptographic address 102.

The transaction records 100 may also document the digital contract 20. Whenever the digital contract 20 is specified, generated, processed, or even executed, the transaction record 100 may be generated. The transaction record 100 may then be documented in the blockchain environment 22. For example, the entity-specific tokens 62 may be earned as payment according to the executable terms of the digital contract 20. The entity-specific tokens 62 may additionally or alternatively be earned or awarded for processing or executing a portion of, or entirely, the digital contract 20. The entity-specific tokens 62 may thus be uniquely associated with a party to the digital contract 20 and/or with a service provider/processor of the digital contract 20. The transaction record 100 may document the parties to the digital contract 20, a transactional description describing a transaction governed by the digital contract 20, and any financial or performance terms. The transaction record 100 may thus document an offer, an acceptance, a consideration, and terms. For simplicity, then, the single cryptographic address 102 may represent a party to the digital contract 20 and/or with a service provider/processor of the digital contract 20. Regardless, when the entity-specific tokens 62 are created, generated, or assigned, the entity-specific tokens 62 may be received by, and propagated within, the blockchain data layer 72 to identify the corresponding data records 70. The blockchain data layer 72 may thus publish the proofs 80 of the digital contract 20 and any entity-specific tokens 62 paid or exchanged, according to the transaction records 100.

Figure 10:
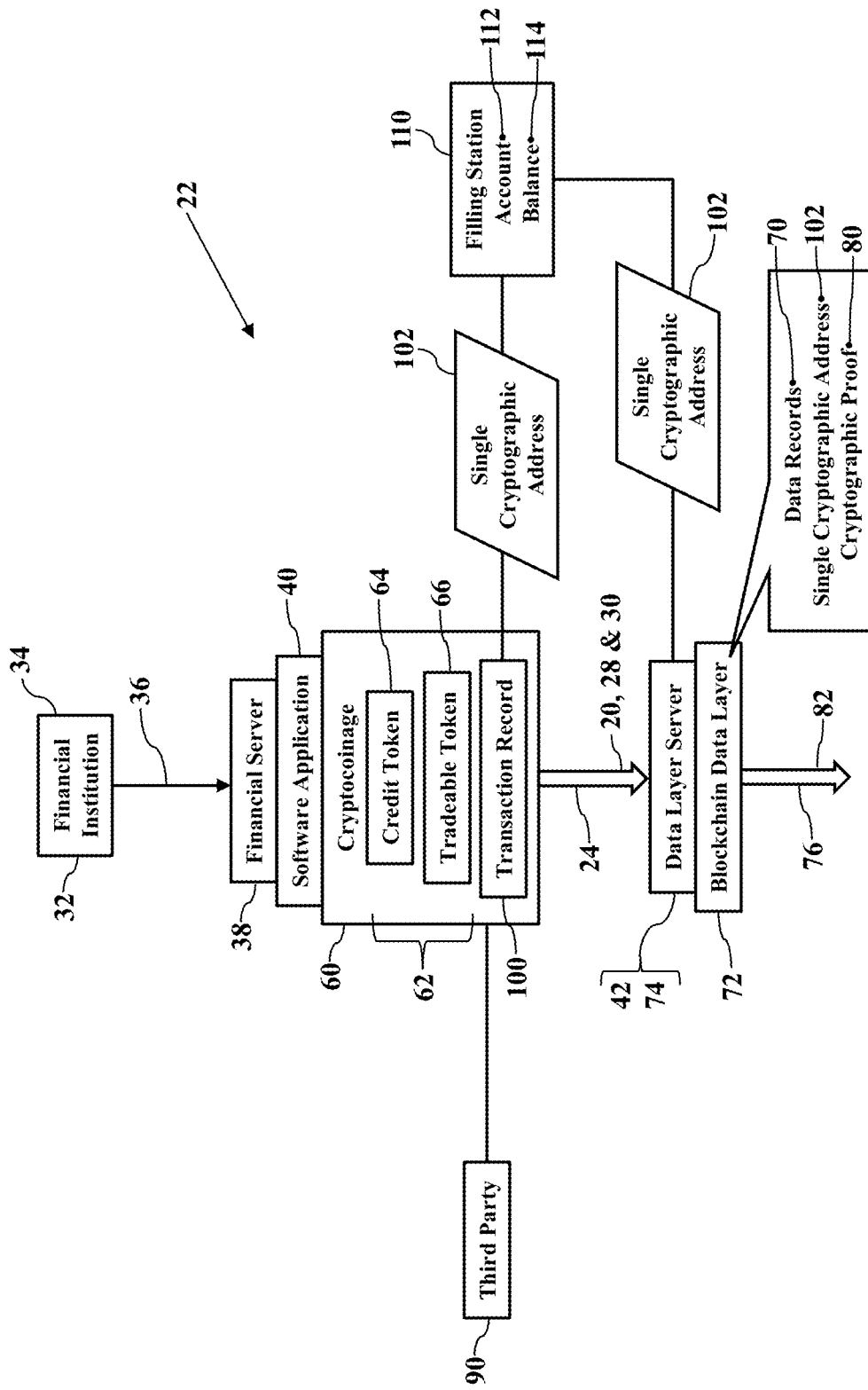

FIG. 10 illustrates a filling station 110 in the blockchain environment 22. Because the tokens 62 may be consumed by users (such as during or after any processing or execution of the digital contract 20), the filling station 110 allows the third party 90 to replenish or fill an account 112. Recall that the third-party entity 32 may be required to spend the tokens 62 to access the financial institution's private blockchain 24 and/or the digital contract 20. Moreover, the tokens 62 may also be earned or transferred according to the terms of the digital contract 20. The account 112 may thus be established, and the account 112 maintains a monetary or numerical balance 114 of the tokens 62. As the tokens 62 are spent, traded, or redeemed, the account 112 may need filling to continue using or accessing the blockchain 24 and/or the digital contract 20.

The filling station 110 may access both the transaction records 100 and the blockchain data layer 72. Because the blockchain data layer 72 may document the data records 70 using the single cryptographic address 102, the single cryptographic address 102 may serve as a common reference or query parameter with the entity's transaction records 100. The filling station 110, in other words, may use the single cryptographic address 102 to identify the transaction records 100 that correspond to the blockchain data layer 72. The filling station 110 may thus present a transaction summary of the account 112 and the balance 114. Because blockchain data layer 72 may track and/or prove the transaction records 100, exemplary embodiments may search the blockchain data layer 72 for the single cryptographic address 102. That is, the filling station 110 may query the blockchain data layer 72 for the single cryptographic address 102, and the blockchain data layer 72 may identify the transaction records 100 that match the single cryptographic address 102. Similarly, exemplary embodiments may query the blockchain data layer 72 for the contract identifier 28 and/or the contractual parameters 30, and the blockchain data layer 72 may identify the transaction records 100 that match the contract identifier 28 and/or the contractual parameters 30. The filling station 110 may then process the transaction records 100 to provide the transaction summary of the account 112, the balance 114, and any other transactional data. The filling station 110 may also allow the user to replenish an amount or value of the tokens 62, thus allowing the user to continue exchanging the tokens 62 for access to the private blockchain 24, the blockchain data layer 72, and/or the digital contract 20. The filling station 110 may thus be an access mechanism to the blockchain data layer 72.

Figure 11:
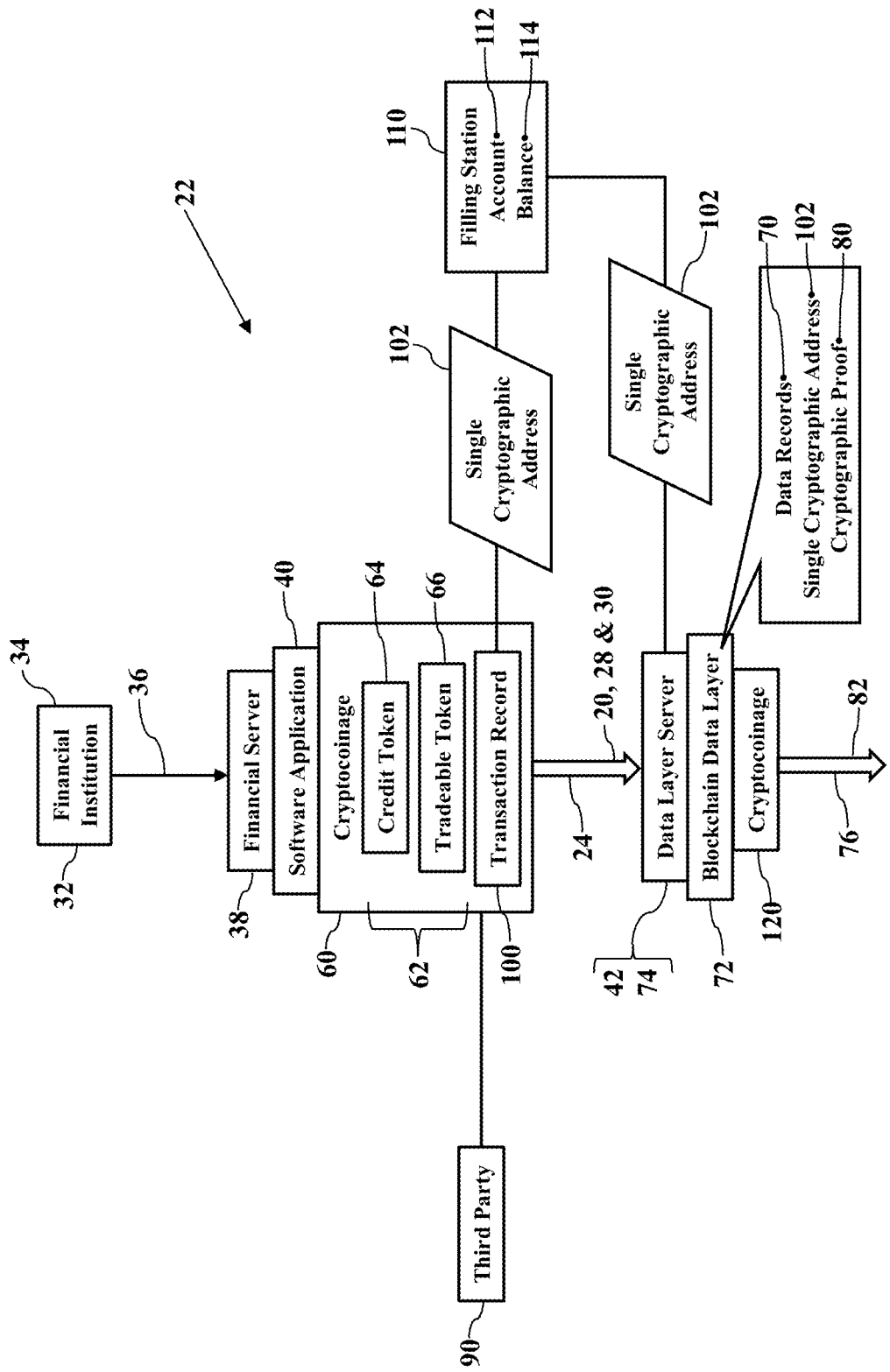

FIG. 11 further illustrates the filling station 110. Here the blockchain data layer 72 may have its own cryptocoinage 120. That is, a provider of the blockchain data layer 72 may establish its cryptocoinage 120 for accessing and/or using the validation service 78. The cryptocoinage 120 may thus include a credit token and a tradeable token (not shown for simplicity). The credit token may be required to enter or access the blockchain data layer 72 to receive the validation service 78, and the tradeable token may be earned for participating in the validation service 78. Regardless, the filling station 110 may use the single cryptographic address 102. The third party 90 may use the single cryptographic address 102 to access the entity's cryptocoinage 60 and the blockchain data layer's cryptocoinage 120. Exemplary embodiments may thus identify and track the transaction records 100 and the blockchain data layer's cryptocoinage 120 using the same, single cryptographic address 102.

Exemplary embodiments thus present elegant solutions. Any entity 32 may create its own private blockchain 24 and offer or present the digital contract 20 for self-execution. The entity 32 may then establish or create the tokens 62 for using, accessing, or processing the entity's private blockchain 24 and/or the digital contract 20. The tokens 62 may have the value 94, thus fostering a market for entity-specific tradeable assets in the blockchain environment 22. The tradable value 94 of the tokens 62 may thus drive demand to use the digital contracts 20. Exemplary embodiments may thus provide a two-token system that isolates any use of the entity's private blockchain 24 from the entity's tradeable token 66. Moreover, the credit token 64 may be associated with the third party 90 (perhaps via the single cryptographic address 102), thus allowing the third party 90 to retrieve the account balance 114 from the filling station 110 and sign entries or other transactions. Moreover, the third party 90 may also use the single cryptographic address 102 to access the blockchain data layer 72 via the filling station 110. The filling station 110 is a single resource or destination (such as a secure website) for managing a user's cryptographic coinage 60 and defining payments according to the digital contract 20.

Figure 12:
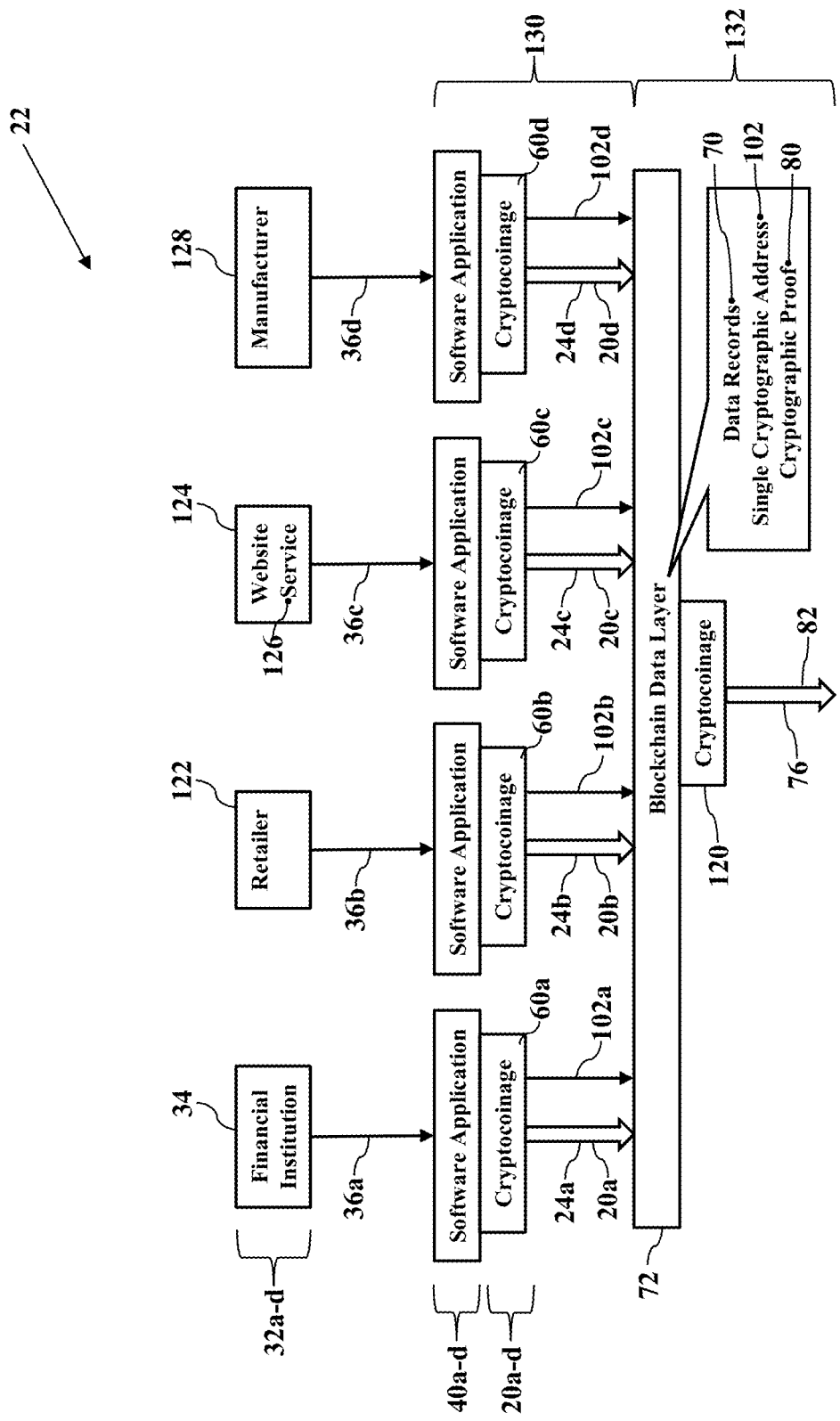

FIG. 12 expands the entity concept. Here multiple, different entities 32a-d provide their respective software applications 40a-d that encrypt their respective private data 36a-d as their individual, private blockchains 24a-d. While exemplary embodiments may be applied to any number of industries or services, FIG. 12 illustrates a simple example of four (4) different entities 32a-d. First entity 32a, for example, again represents the bank, lender, or other financial institution 34 that encrypts its private data 36a as its private blockchain 24a. Second entity 32b represents any retailer 122 (such as HOME DEPOT®, KOHL'S®, or WAL-MART®) that encrypts its private data 36b as its private blockchain 24b. Third entity 32c represents a website 124 offering a service 126 (such as AMAZON®, NETFLIX®, or GOOGLE®) that encrypts its private data 36c as the private blockchain 24c. Fourth entity 32d represents an automotive or other manufacturer or supplier 128 (such as FORD®, TOYOTA®, or DELPHI®) that encrypts its private data 36d as the private blockchain 24d. The entities 32a-d thus use their respective software applications 40a-d to provide a first layer 130 of cryptographic hashing. The entities 32a-d may also use their respective software applications 40a-d to issue their own private and entity-specific cryptocoinage 60a-d. Each entity 32a-d may then send their respective private blockchains 24a-d to the blockchain data layer 72, and the blockchain data layer 72 may add a second layer 132 of cryptographic hashing. The blockchain data layer 72 thus generates the public blockchain 76 as a public resource or utility for record keeping. Any entity 32 that subscribes to the blockchain data layer 72 (such as by acquiring and/or spending the cryptocoinage 120) may thus access, read, and/or store the proofs 80 of its private data 36 to the public blockchain 76. The blockchain data layer 72, in other words, acts as the public ledger 82 that establishes chain of blocks of immutable evidence.

As FIG. 12 also illustrates, each entity 32a-d may establish its own private cryptocoinage 60a-d. Each entity's private software application 40a-d may create and/or issue its cryptocoinage 60a-d (such as respective entity-specific tokens 62 above explained). Each entity 32a-d may also establish its own usage restrictions and value (illustrated as reference numerals 92 and 94 in FIGS. 7-8) according to rules governing ownership, trade, and other policies. Each entity 32a-d may generate and sends its respective transaction records 100a-d which reference each entity's single cryptographic address 102a-d to the blockchain data layer 72 for documentation.

As FIG. 12 further illustrates, each entity 32a-d may also specify their respective digital contract 20a-d. When any of the private blockchains 24a-d is received, the blockchain data layer 72 may coordinate execution of any digital contract 20a-d. The blockchain data layer 72, for example, may inspect any private blockchain 24a-d and identify any information associated with the digital contract 20a-d. The blockchain data layer 72 may then execute the digital contract 20a-d, and/or the blockchain data layer 72 may identify a service provider that executes the digital contract 20a-d. The blockchain data layer 72, in other words, may manage the execution of the digital contracts 20a-d according to a subcontractor relationship. A provider of the blockchain data layer 72 may then be compensated via any entity's cryptocoinage 60a-d and/or the blockchain data layer's cryptocoinage 120.

Figure 13:
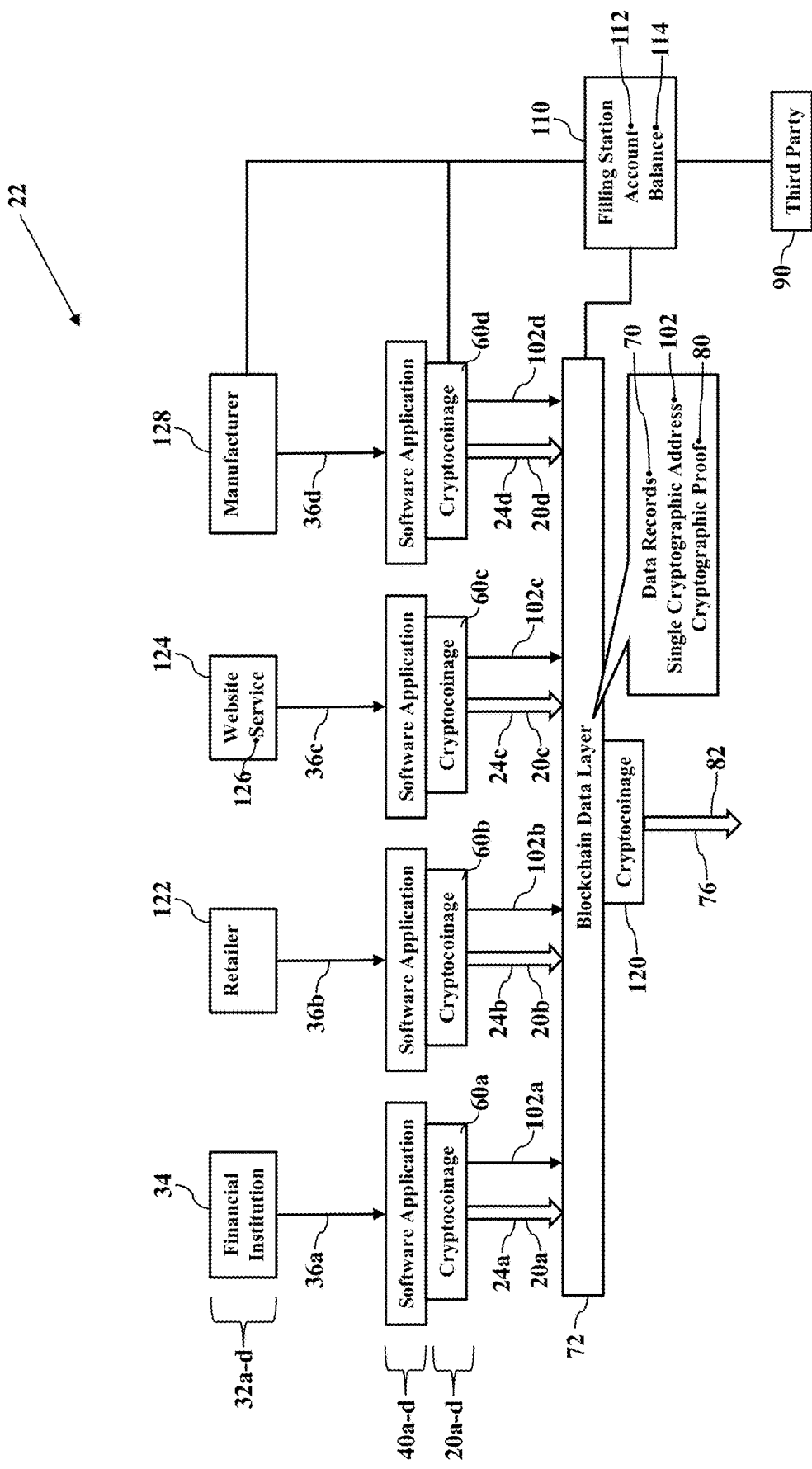

As FIG. 13 illustrates, the filling station 110 may be agnostic. Any user (such as the entity 32a-d or the third party 90) may authenticate to the filling station 110. Once authenticated, the user need only enter or provide the correct single cryptographic address 102a-d to access the entity's private cryptocoinage 60a-d, the blockchain data layer's cryptocoinage 120, and/or the entity's digital contract 20a-d. The single cryptographic address 102a-d, in other words, allows the user to access her account 112 and balance 114 for the entity's private cryptocoinage 60a-d, the blockchain data layer's cryptocoinage 120, and/or the entity's digital contract 20a-d. The user may thus easily conduct transactions between the entity's private cryptocoinage 60a-d and the blockchain data layer's cryptocoinage 120. The entity 32a-d, for example, may fuel or replenish its supply of the blockchain data layer's cryptocoinage 120, perhaps by redeeming or exchanging the entity's private cryptocoinage 60a-d (perhaps according to an exchange rate or other value). Similarly, the provider of the blockchain data layer 72 may fuel or replenish its supply of the entity's private cryptocoinage 60a-d by purchasing or exchanging the blockchain data layer's cryptocoinage 120. The provider of the blockchain data layer 72 may also earn the entity's private cryptocoinage 60a-d by processing any portion of, or by executing, the entity's digital contract 20a-d. Moreover, the respective private blockchains 24a-d and the blockchain data layer 72 would contain the data records 70 confirming the processing and/or execution of the digital contract 20a-d, so the transaction records 100a-d thus propagate into the blockchain data layer 72 for public disclosure via the public blockchain 76. Any user that successfully authenticates to the filling station 110 may access a full accounting of his or her digital cryptocoinages 60a-d and/or 120 and any digital contracts 20, perhaps according to the respective single cryptographic address 102a-d. The user may thus buy, sell, trade, and/or redeem any entity-specific cryptocoinages 20a-d and/or 90, all by accessing the filling station 110. The user may buy or sell any entity's coins or replenish credits, all by accessing the filling station 110. The user may also track performance or obligations defined by the digital contracts 20a-d and any payments or consideration received or paid.

Exemplary embodiments thus present another elegant solution. The filling station 110 is another service offered by the blockchain data layer 72. Because all the transaction records 100 in the blockchain data layer 72 are identifiable (perhaps via the single cryptographic address 102), the filling station 110 can present the summary of the user's credit tokens and tradeable tokens. The filling station 110 may thus provide a single or universal electronic wallet for all of a user's digital coinage and credits, regardless of the issuing entity 32a-d. The user may thus only perform a single authentication to the blockchain data layer 72 and access all her cryptofunds.

Figure 14:
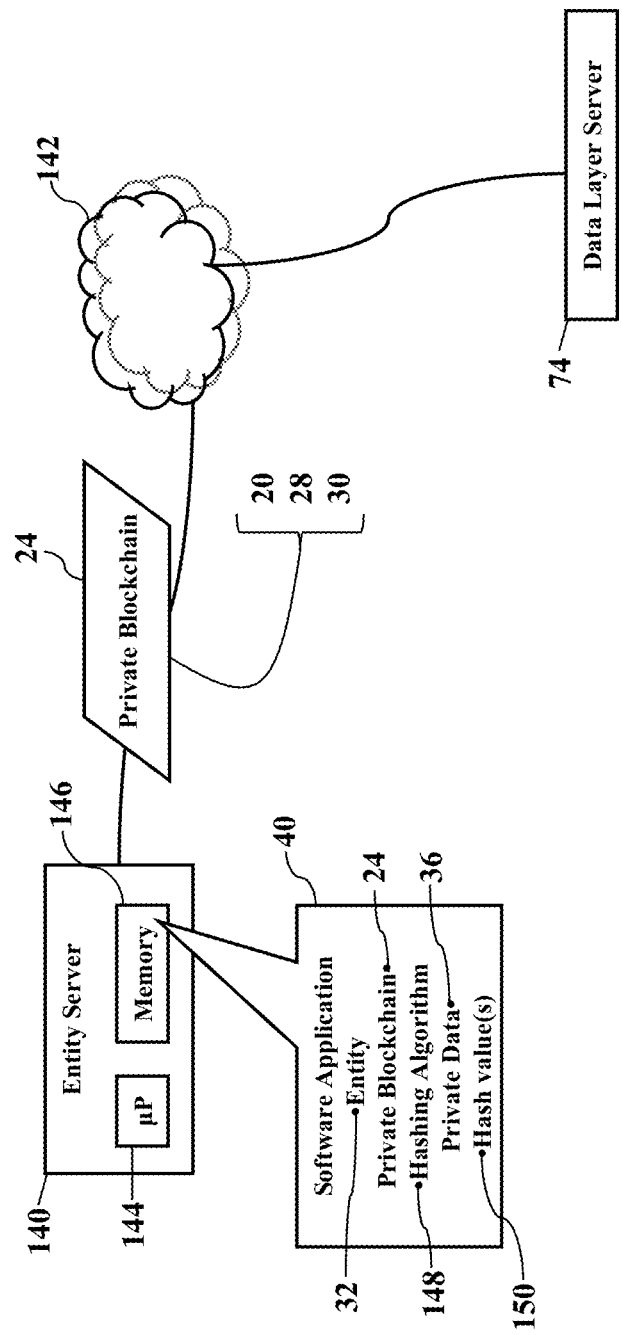
FIGS. 14-16 are more detailed illustrations of an operating environment, according to exemplary embodiments.
Figure 15:
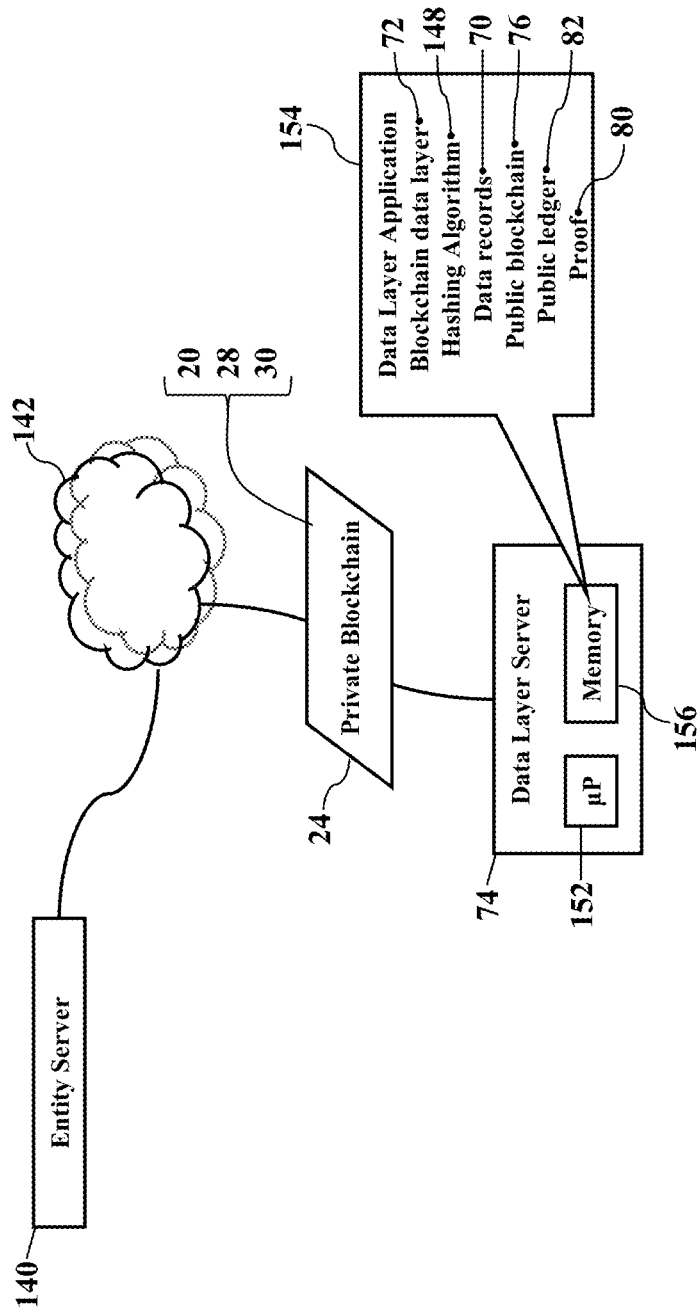
Figure 16:
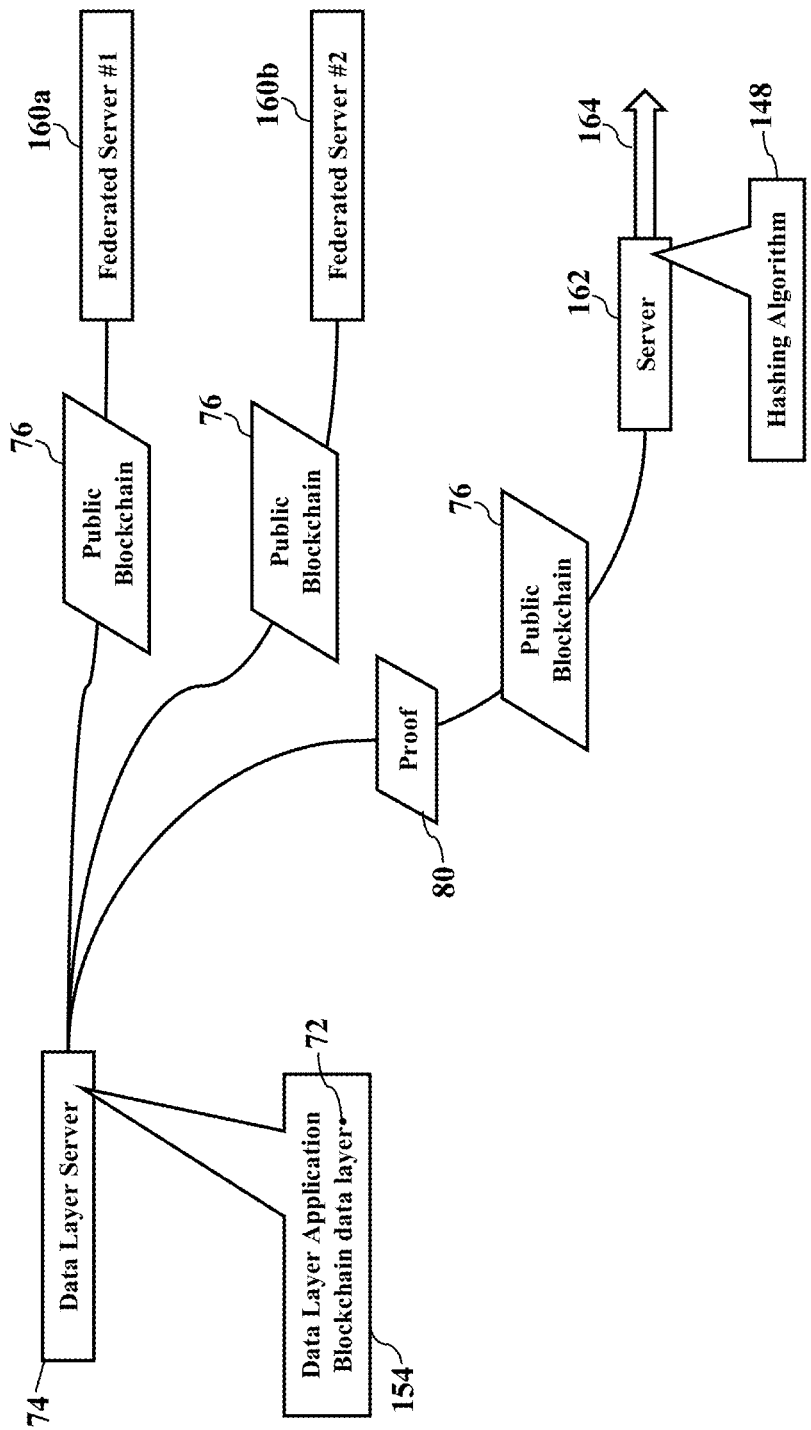

FIGS. 14-16 are more detailed illustrations of an operating environment, according to exemplary embodiments. FIG. 14 illustrates an entity server 140 communicating with the data layer server 74 via a communications network 142. The entity server 140 operates on behalf of the entity 32 and generates the entity's private blockchain 24 (such as the financial server 38 explained with reference to FIGS. 2-11). The entity server 140, in other words, has a processor 144 (e.g., "µP"), application specific integrated circuit (ASIC), or other component that executes the entity's software application 40 stored in a local memory device 146. The entity server 140 has a network interface to the communications network 142, thus allowing two-way, bidirectional communication with the data layer server 74. The entity's software application 40 includes instructions, code, and/or programs that cause the entity server 140 to perform operations, such as calling, invoking, and/or applying an electronic representation of a hashing algorithm 148 to the entity's private data 36. The hashing algorithm 148 thus generates one or more hash values 150, which are incorporated into the entity's private blockchain 24. The entity's software application 40 then instructs the entity server 140 to send the private blockchain 24 via the communications network 142 to a network address (e.g., Internet protocol address) associated with the data layer server 74.

The digital contract 20 may also be identified. The entity's software application 40 may also instruct the entity server 140 to specify the digital contract 20 as informational content in the private blockchain 24. For example, the digital contract 20 may be identified by the contract identifier 28 and contractual parameters 30. The contract identifier 28 is any digital identifying information that uniquely identifies or references the digital contract 20. The contract identifier 28 may be an alphanumeric combination that uniquely identifies a vendor and/or version of the digital contract 20 and/or a processor or executioner of the digital contract 20. The contract identifier 28 may also be one of the unique hash values 150 (perhaps generated by the hashing algorithm 148) that is included within, or specified by, the private blockchain 24. Similarly, the contractual parameters 30 may identify the parties to the digital contract 20, their respective performance obligations and terms, and consideration.

FIG. 15 illustrates the blockchain data layer 72. The data layer server 74 has a processor 152 (e.g., "µP"), application specific integrated circuit (ASIC), or other component that executes a data layer application 154 stored in a local memory device 156. The data layer server 74 has a network interface to the communications network 142. The data layer application 154 includes instructions, code, and/or programs that cause the data layer server 74 to perform operations, such as receiving the entity's private blockchain 24, the digital contract 20, the contract identifier 28, and/or the contractual parameters 30. The data layer application 154 then causes the data layer server 74 to generate the blockchain data layer 72. The data layer application 154 may optionally call, invoke, and/or apply the hashing algorithm 148 to the data records 70 contained within the blockchain data layer 72. The data layer application 154 may also generate the public blockchain 76. The data layer application 154 may thus generate the public ledger 82 that publishes, records, or documents the digital contract 20, the contract identifier 28, and/or the contractual parameters 30. Indeed, if the data layer application 154 processes and/or manages the digital contract 20, the data records 70 may document any processing or execution, and the data layer application 154 may optionally apply the hashing algorithm 148 to the data records 70 to generate the cryptographic proof 80 of the digital contract 20.

FIG. 16 illustrates additional publication mechanisms. Once the blockchain data layer 72 is generated, the blockchain data layer 72 may be published in a decentralized manner to any destination. The data layer server 74, for example, may generate and distribute the public blockchain 76 (via the communications network 142 illustrated in FIGS. 14-15) to one or more federated servers 160. While there may be many federated servers 160, for simplicity FIG. 16 only illustrates two (2) federated servers 160a and 160b. The federated servers 160a and 160b provide a service and, in return, they are compensated according to a compensation or services agreement or scheme.

Exemplary embodiments include still more publication mechanisms. For example, the cryptographic proof 80 and/or the public blockchain 76 may be sent (via the communications network 142 illustrated in FIGS. 14-15) to a server 162. The server 162 may then add another, third layer of cryptographic hashing (perhaps using the hashing algorithm 148) and generate another or second public blockchain 164. While the server 162 and/or the public blockchain 164 may be operated by, or generated for, any entity, exemplary embodiments may integrate another cryptographic coin mechanism. That is, the server 162 and/or the public blockchain 164 may be associated with BITCOIN®, ETHEREUM®, RIPPLE®, or other cryptographic coin mechanism. The cryptographic proof 80 and/or the public blockchain 76 may be publicly distributed and/or documented as evidentiary validation. The cryptographic proof 80 and/or the public blockchain 76 may thus be historically and publicly anchored for public inspection and review.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When the entity server 140 and the data layer server 74 communicate via the communications network 142, the entity server 140 and the data layer server 74 may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 17:
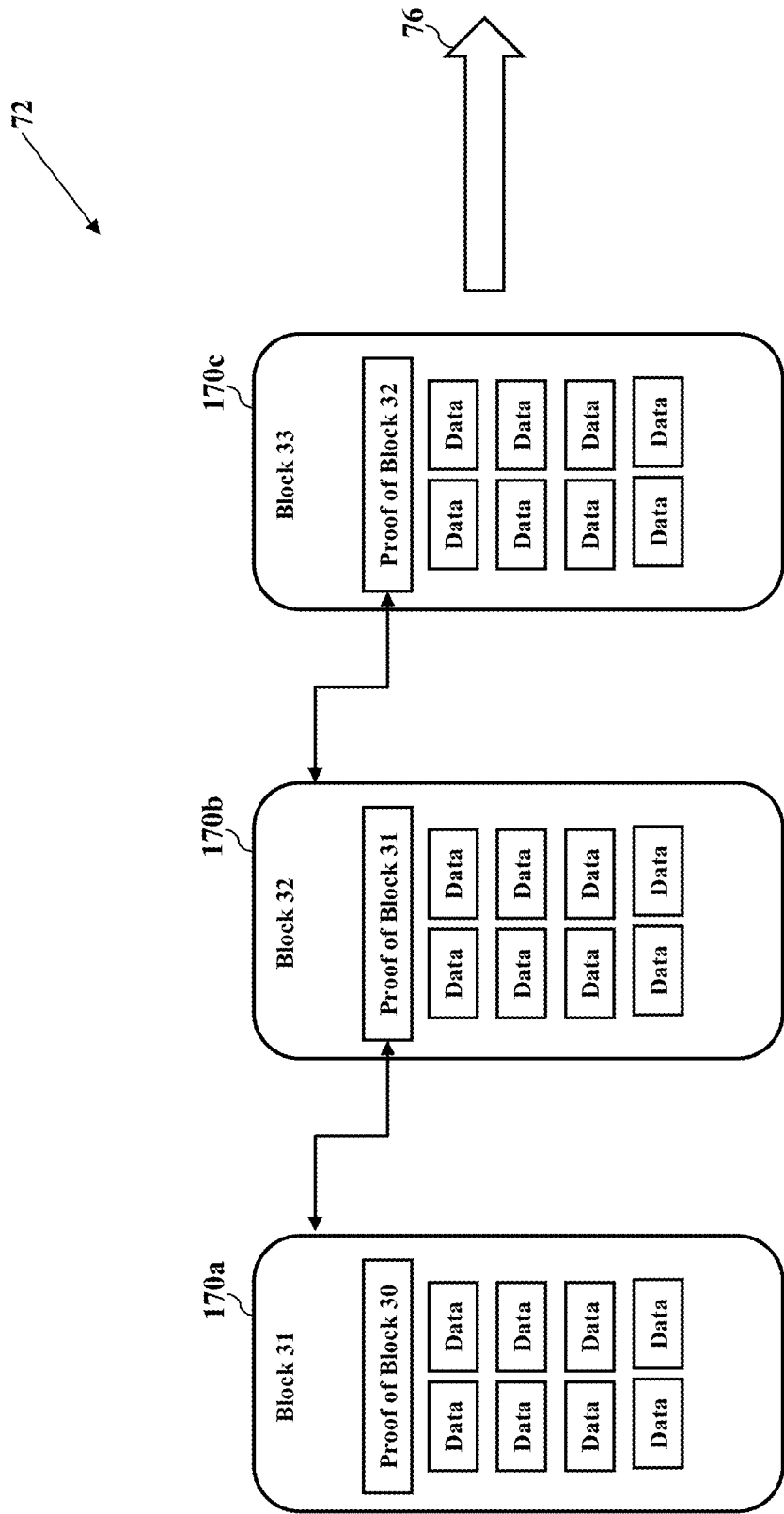
FIGS. 17-21 illustrate a blockchain data layer, according to exemplary embodiments.

FIGS. 17-21 further illustrate the blockchain data layer 72, according to exemplary embodiments. The blockchain data layer 72 chains hashed directory blocks 170 of data into the public blockchain 76. For example, the blockchain data layer 72 accepts input data (such as the entity's private blockchain 24 illustrated in FIGS. 1-13) within a window of time. While the window of time may be configurable from fractions of seconds to hours, exemplary embodiments use ten (10) minute intervals. FIG. 17 illustrates a simple example of only three (3) directory blocks 170a-c of data, but in practice there may be millions or billions of different blocks. Each directory block 184 of data is linked to the preceding blocks in front and the following or trailing blocks behind. The links are created by hashing all the data within a single directory block 184 and then publishing that hash value within the next directory block.

Figure 18:
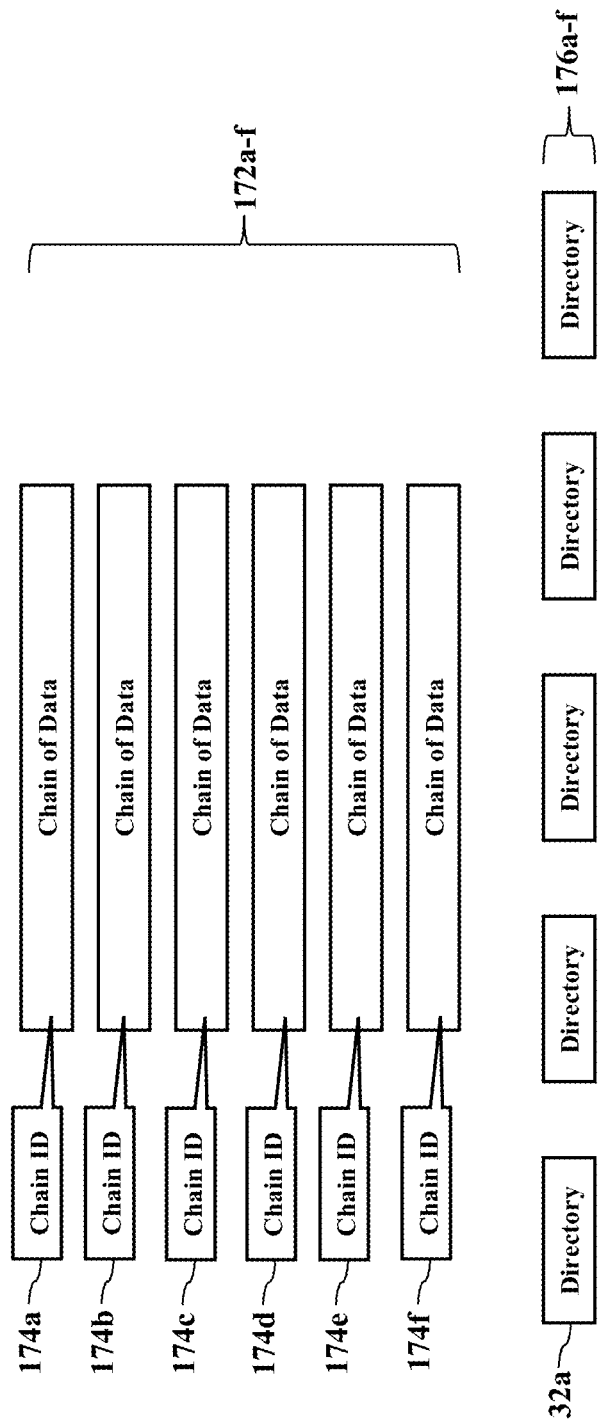

As FIG. 18 illustrates, published data may be organized within chains 172. Each chain 172 is created with an entry that associates a corresponding chain identifier 174. Each entity 32a-f, in other words, may have its corresponding chain identifier 174a-d. The blockchain data layer 72 may thus track any data associated with the entity 32a-f with its corresponding chain identifier 174a-d. New and old data in time may be associated with, linked to, identified by, and/or retrieved using the chain identifier 174a-d. Each chain identifier 174a-d thus functionally resembles a directory 176a-d (e.g., files and folders) for organized data entries according to the entity 32a-f.

Figure 19:
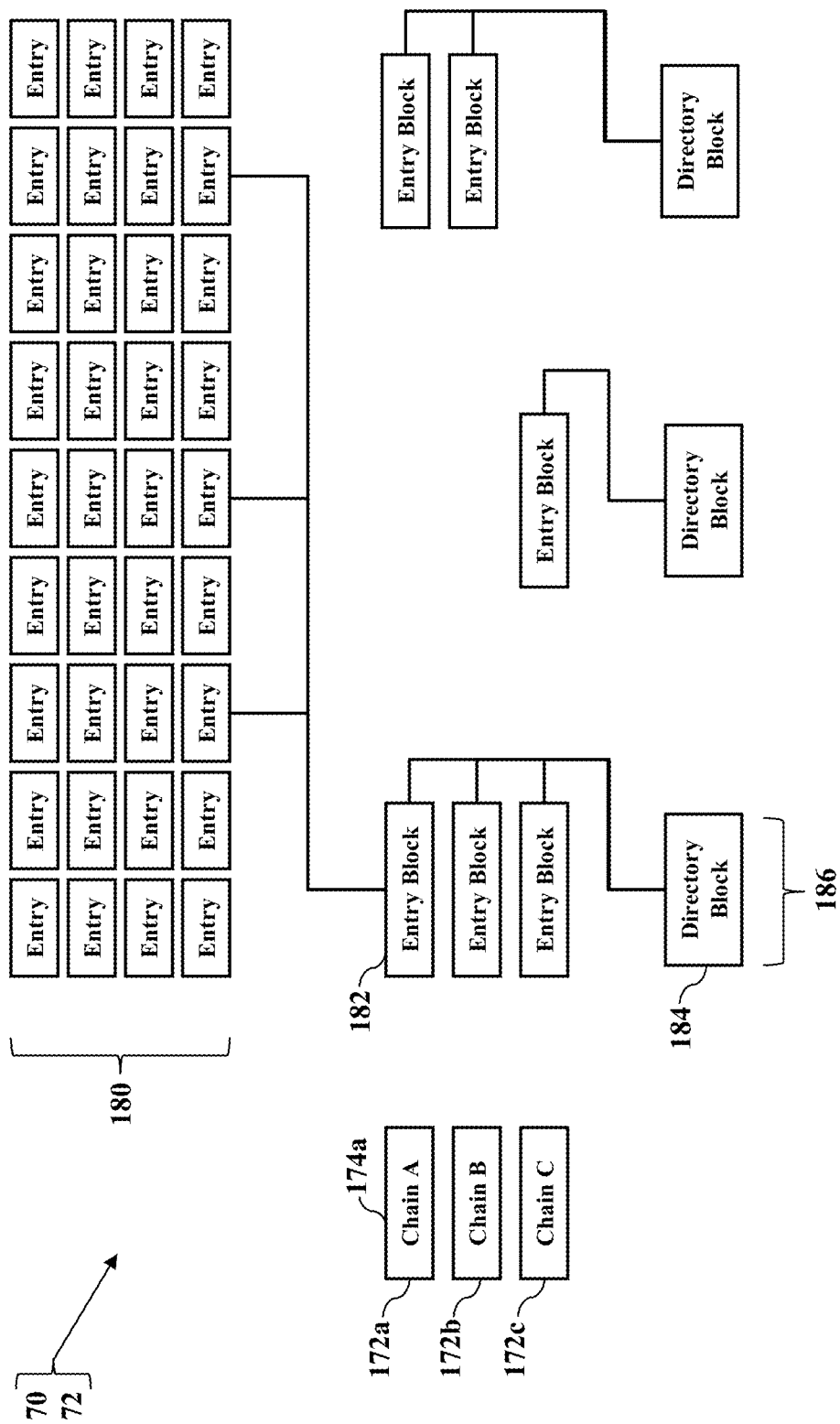

FIG. 19 illustrates the data records 70 in the blockchain data layer 72. As data is received as an input (such as the private blockchain 24 and/or the digital contract 20 illustrated in FIGS. 1-13), data is recorded within the blockchain data layer 72 as an entry 180. While the data may have any size, small chunks (such as 10 KB) may be pieced together to create larger file sizes. One or more of the entries 180 may be arranged into entry blocks 182 representing each chain 172 according to the corresponding chain identifier 174. New entries for each chain 172 are added to their respective entry block 182 (again perhaps according to the corresponding chain identifier 174). After the entries 180 have been made within the proper entry blocks 182, all the entry blocks 182 are then placed within in the directory block 184 generated within or occurring within a window 186 of time. While the window 186 of time may be chosen within any range from seconds to hours, exemplary embodiments may use ten (10) minute intervals. That is, all the entry blocks 182 generated every ten minutes are placed within in the directory block 184.

Figure 20:
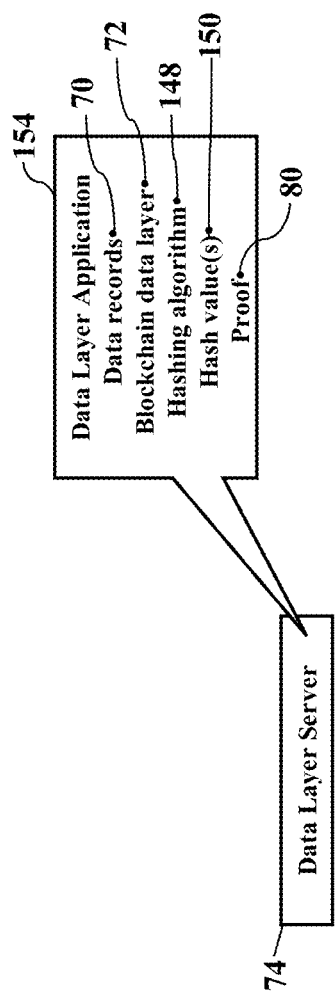

FIG. 20 illustrates cryptographic hashing. The data layer server 74 executes the data layer application 154 to generate the data records 70 in the blockchain data layer 72. The data layer application 154 may then instruct the data layer server 74 to execute the hashing algorithm 148 on the data records 70 (such as the directory block 184 illustrated in FIGS. 17-19). The hashing algorithm 148 thus generates one or more hash values 150 as a result, and the hash values 150 represent the hashed data records 70. As one example, the blockchain data layer 72 may apply a Merkle tree analysis to generate a Merkle root (representing a Merkle proof 80) representing each directory block 184. The blockchain data layer 72 may then publish the Merkle proof 80 (as this disclosure explains).

Figure 21:
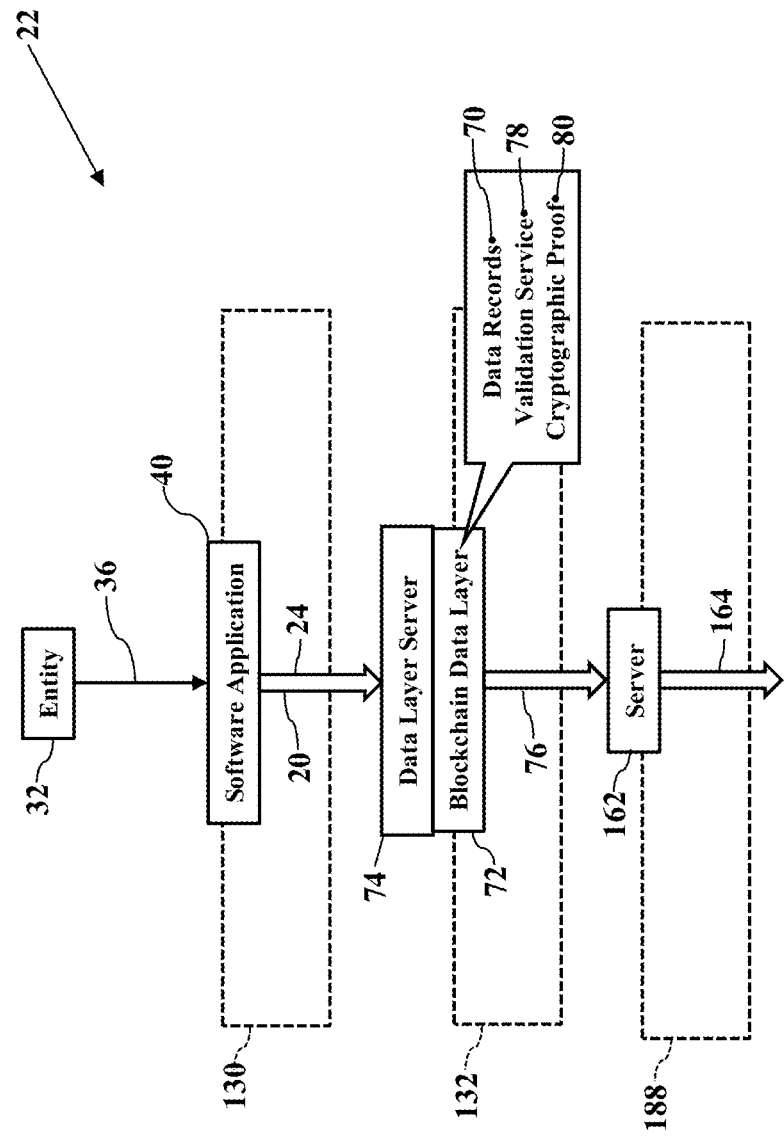

FIG. 21 illustrates hierarchical hashing. The entity's private software application 40 provides the first layer 130 of cryptographic hashing and generates the private blockchain 24. The entity 32 then sends its private blockchain 24 (perhaps referencing or specifying the digital contract 20) to the data layer server 74. The data layer server 74, executing the data layer application 154, generates the blockchain data layer 72. The data layer application 154 may optionally provide the second or intermediate layer 132 of cryptographic hashing to generate the cryptographic proof 80. The data layer application 154 may also publish any of the data records 70 as the public blockchain 76, and the cryptographic proof 80 may or may not also be published via the public blockchain 76. The public blockchain 76 and/or the cryptographic proof 80 may be optionally sent to the server 162 as an input to yet another public blockchain 164 (again, such as BITCOIN®, ETHEREUM®, or RIPPLE®) for a third layer 188 of cryptographic hashing and public publication. The first layer 130 and the second layer 132 thus ride or sit atop a conventional public blockchain 164 (again, such as BITCOIN®, ETHEREUM®, or RIPPLE®) and provide additional public and/or private cryptographic proofs 80.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

Figure 22:
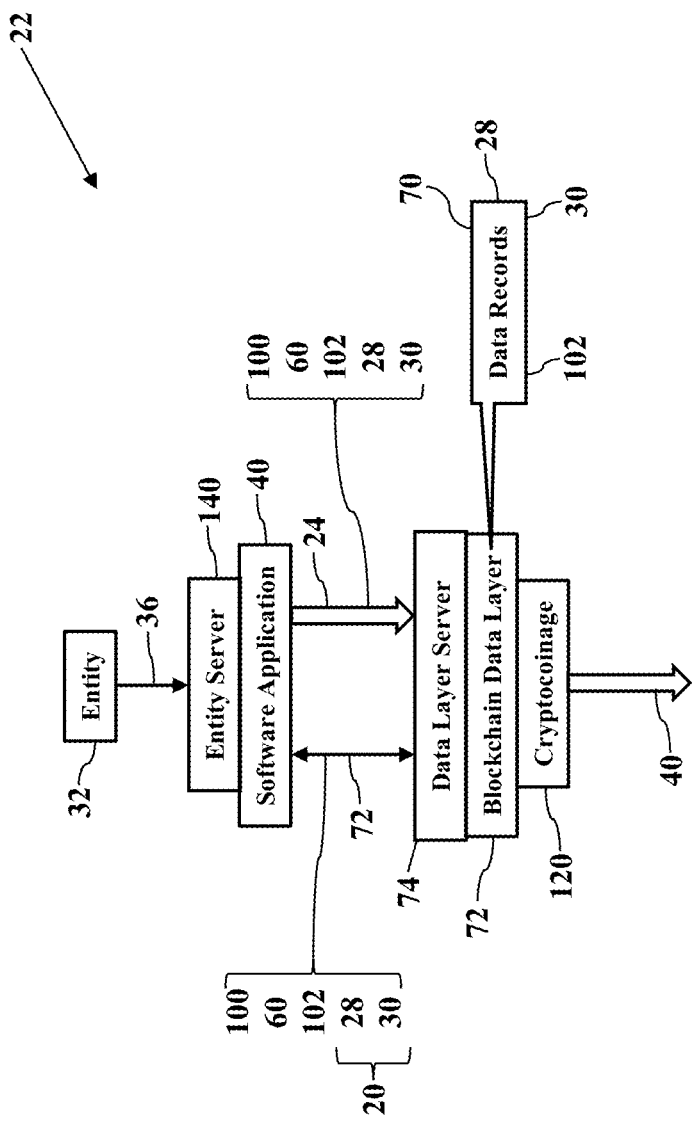
FIGS. 22-24 further illustrate the digital contract, according to exemplary embodiments.
Figure 23:
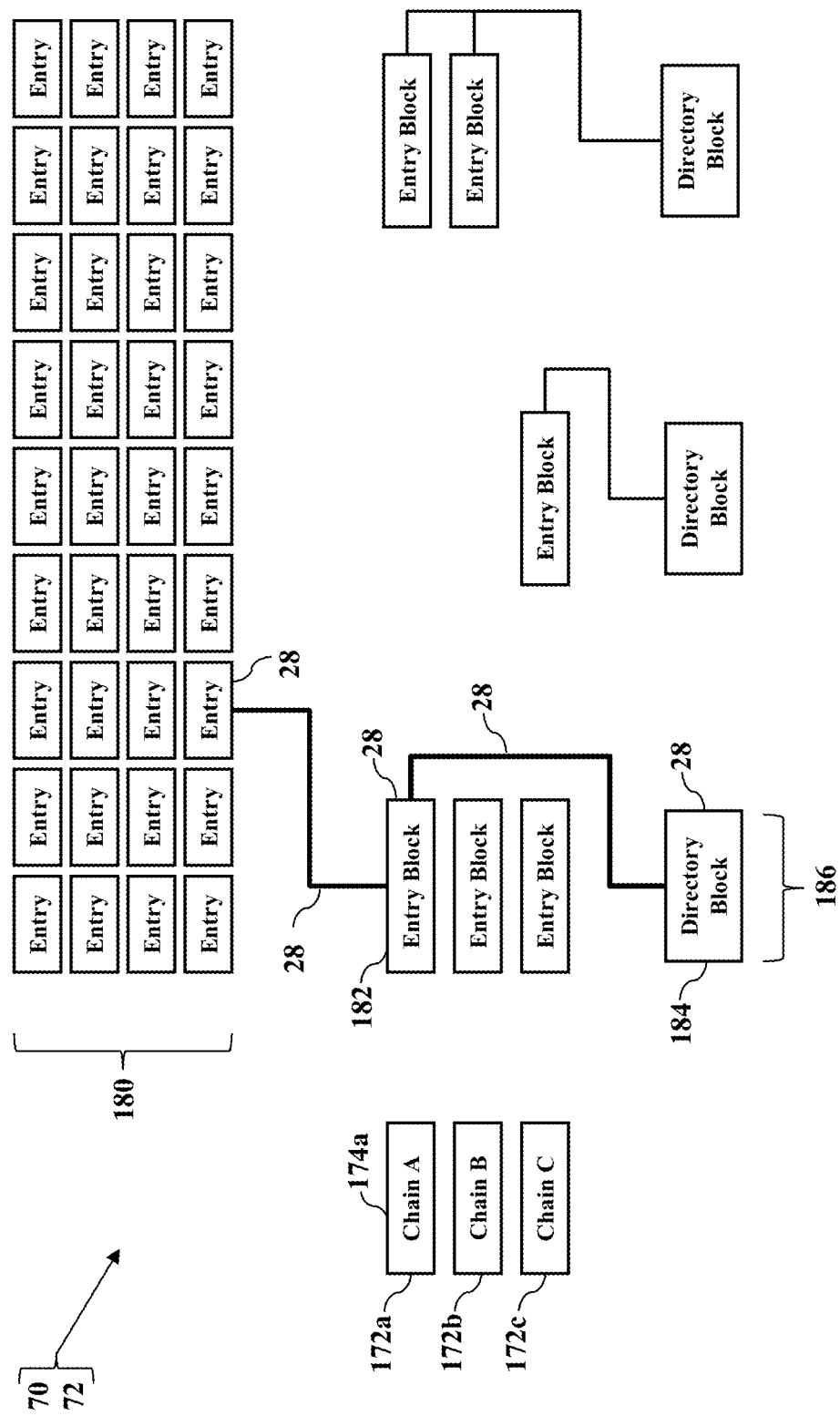
Figure 24:
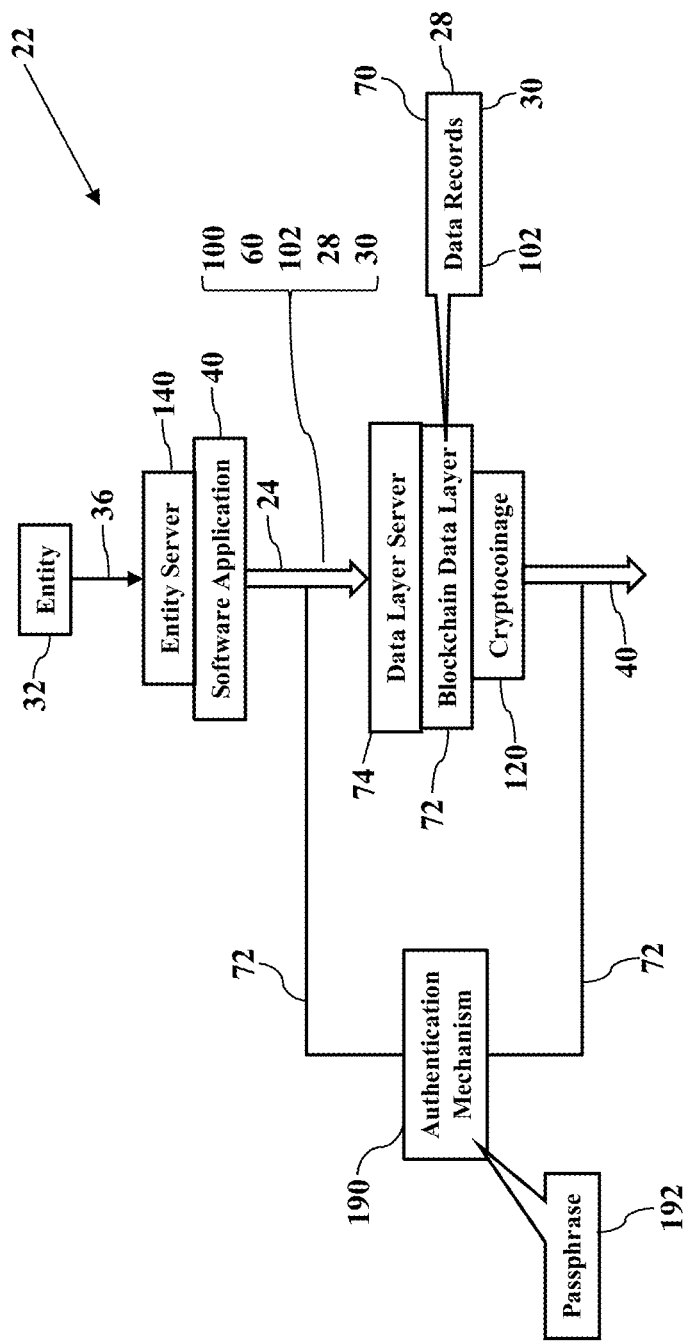

FIGS. 22-24 are more detailed illustrations of the digital contract 20, according to exemplary embodiments. The private entity 32 sends its private blockchain 24 to the network address associated with the data layer server 74 that generates the blockchain data layer 72. The private blockchain 24 may contain information representing the transaction records 100 associated with the entity's private cryptocoinage 60 (perhaps as one or more privately hashed blocks of data). The private blockchain 24 may also specify, or incorporate, information or data representing the single cryptographic address 102 and/or the digital contract 20 (e.g., the contract identifier 28 and the contractual parameters 30). The single cryptographic address 102 and/or the digital contract 20 (e.g., the contract identifier 28 and the contractual parameters 30) may additionally or alternatively be separately sent from the entity server 140 to the data layer server 74 (perhaps via the communications network 142 illustrated by FIGS. 14-15). Regardless, the entity's private cryptocoinage 60 may be associated with the digital contract 20 (e.g., the contract identifier 28 and the contractual parameters 30) and/or the single cryptographic address 102. The transaction records 100 and/or their privately hashed blocks of data may thus specify, include, reference, and/or be associated with, and/or identified by, the single cryptographic address 102, the digital contract 20, the contract identifier 28, and/or the contractual parameters 30. Because the contract identifier 28 (and/or its corresponding hash value) is an identifiable input to the data layer server 74 generating the blockchain data layer 72, the data records 70 may also carry or reference the contract identifier 28 and/or the contractual parameters 30. So, should the blockchain data layer 72 create or issue its own cryptocoinage 120, the cryptocoinage 120 may also reference, be identified by, or be associated with the single cryptographic address 102 and/or the contract identifier 28 and/or the contractual parameters 30. The single cryptographic address 102, the contract identifier 28, and/or the contractual parameters 30 may thus common indicators or reference data for tracking both the entity's private cryptocoinage 60 and the cryptocoinage 120 issued by the blockchain data layer 72, according to the terms of the digital contract 20. The transaction records 100 (representing entity's private cryptocoinage 60) may thus be commonly mapped or identified to the cryptocoinage 120 issued by the blockchain data layer 72 and to the digital contract 20.

FIG. 23 illustrates a simple illustration. Once the contract identifier 28 (and/or its corresponding hash value) is received, the contract identifier 28 may propagate and be recorded within the blockchain data layer 72. The contract identifier 28, for example, may be recorded in any of the entries 180. The entry 180, and thus the contract identifier 28, may then be recorded and/or arranged as the entry block 182 and placed within the directory block 184. The entry 180, the entry block 182, and the directory block 184 may thus reference, specify, or be associated with, the contract identifier 28. The contract identifier 28 has thus propagated as informational content from the private blockchain 24 and into and through the blockchain data layer 72. The contract identifier 28 thus hierarchically moves through the multiple layers of cryptographic hashing for public publication. The blockchain data layer 72 thus tracks the transaction records 100 involving the contract identifier 28. In simple words, the blockchain data layer 72 may track contractual performance of the digital contract 20 via the transaction records 100 that reference or contain the contract identifier 28. Moreover, the blockchain data layer 72 may also track ownership and transfer of the entity's private cryptocoinage 60 and the cryptocoinage 120 issued by the blockchain data layer 72, all via the common single cryptographic address 102 and/or the contract identifier 28.

FIG. 24 illustrates more details. While the single cryptographic address 102 and/or the contract identifier 28 may be any alphanumeric entry or biometric input, FIG. 24 illustrates a common authentication mechanism 190. Here the same or similar authentication mechanism 190 is used to access both the entity's private cryptocoinage 60 and the cryptocoinage 120 issued by the blockchain data layer 72. If a user of the blockchain data layer 72 satisfies the authentication mechanism 190, then exemplary embodiments may access both the private cryptocoinage 60, the cryptocoinage 120, and/or the data records 70 associated with the contract identifier 28. As a simple example, suppose the user of the authentication mechanism 190 supplies information or data representing the single cryptographic address 102 and/or the contract identifier 28. The single cryptographic address 102 and/or the contract identifier 28 may be any unique alphanumeric entry, biometric input, user identifier, or other authentication credential. For example, most readers are likely familiar with an alphanumeric username and password, which is a common authentication mechanism 190. FIG. 24, though, illustrates a passphrase 192 (such as a multi-word mnemonic). When the entity's private cryptocoinage 60 is/are created, generated, or assigned, the entity's private cryptocoinage 60 may be assigned or associated with the passphrase 192. The passphrase 192 is unique to the registered owner, possessor, or user of the entity's private cryptocoinage 60. The passphrase 192 may even be hashed as a hash value and supplied to the blockchain data layer 72 (as above explained). The passphrase 192, in other words, may be hashed as the single cryptographic address 102 and propagated within the blockchain environment 22 to document the transaction records 100 involving the entity's private cryptocoinage 60.

The passphrase 192 may also authenticate to the cryptocoinage 120. If the user correctly supplies the passphrase 192, then the same user may conduct transactions involving the cryptocoinage 120 issued by the blockchain data layer 72 and/or involving the contract identifier 28 associated with the digital contract 20. Exemplary embodiments thus allow the user to order transactions and exchanges involving the entity's private cryptocoinage 60, the cryptocoinage 120 issued by the blockchain data layer 72, and/or the digital contract 20.

Figure 25:
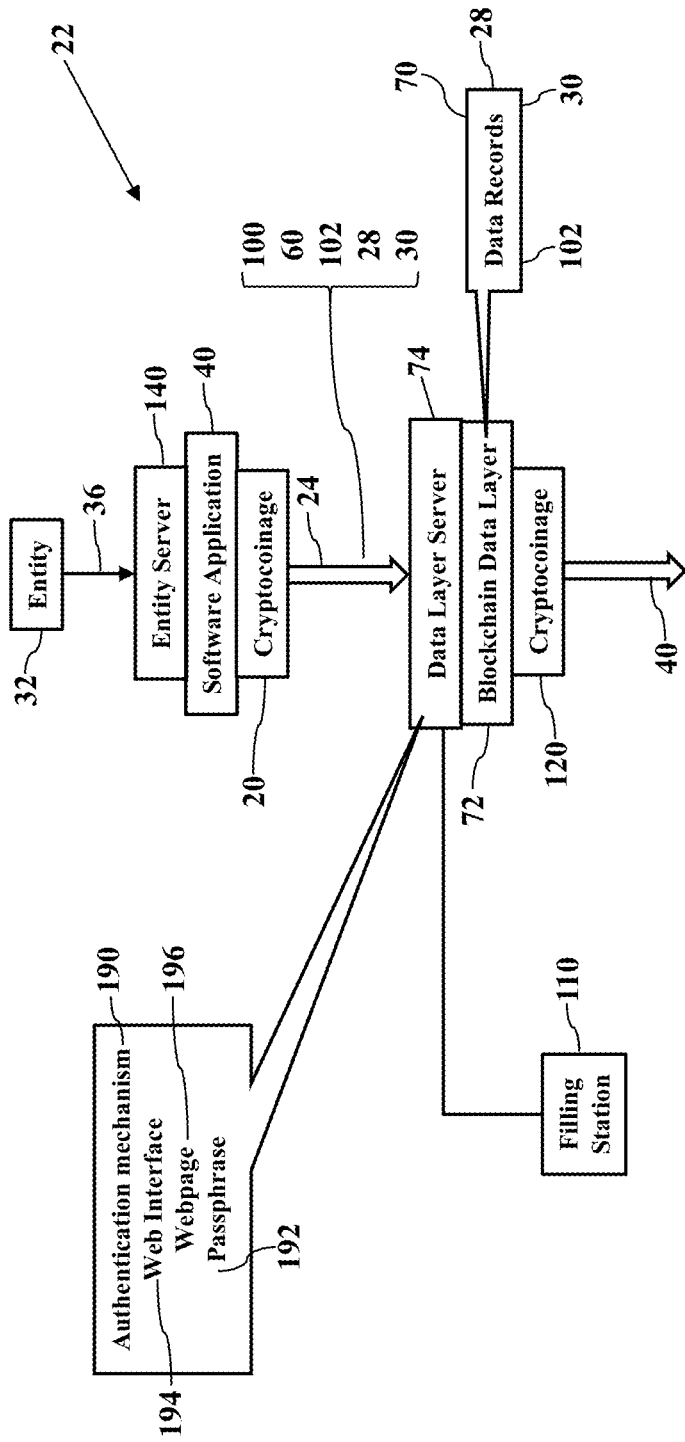
FIGS. 25-27 illustrate an access mechanism, according to exemplary embodiments.
Figure 26:
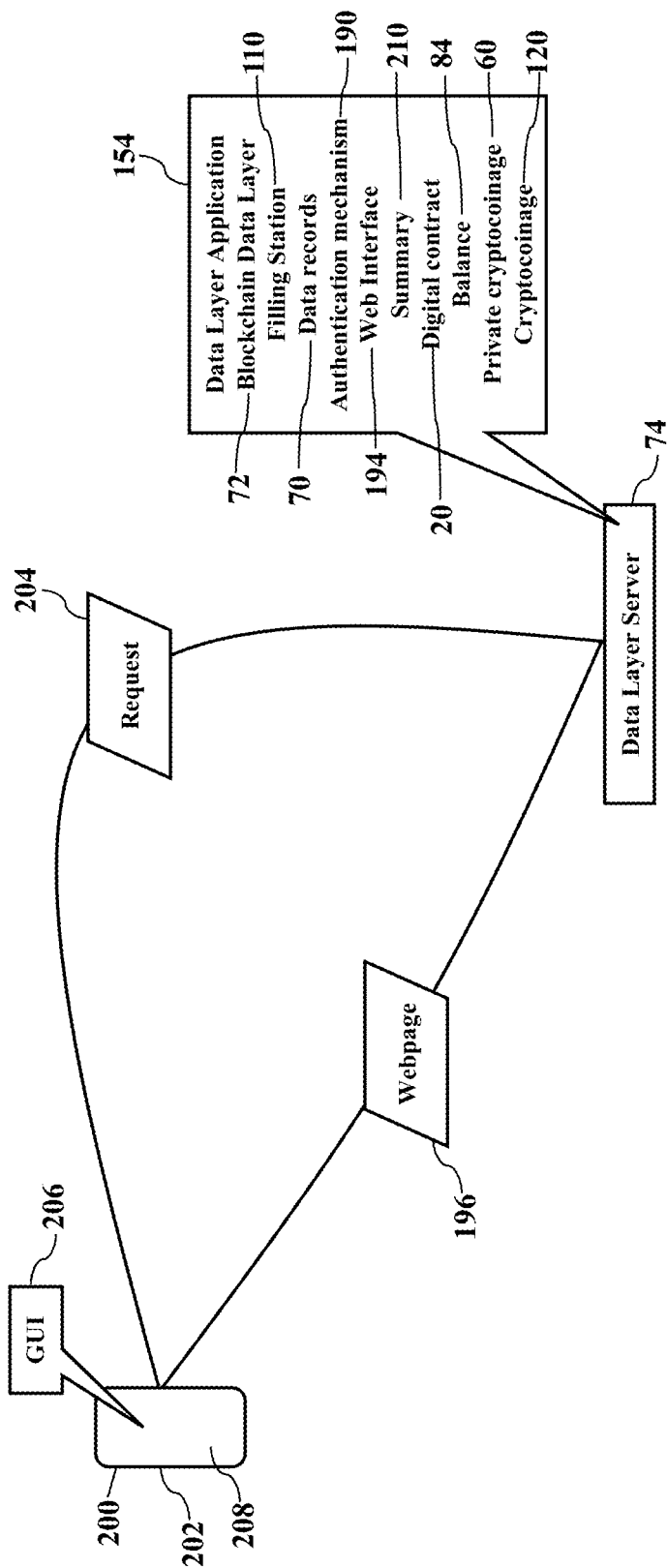
Figure 27:
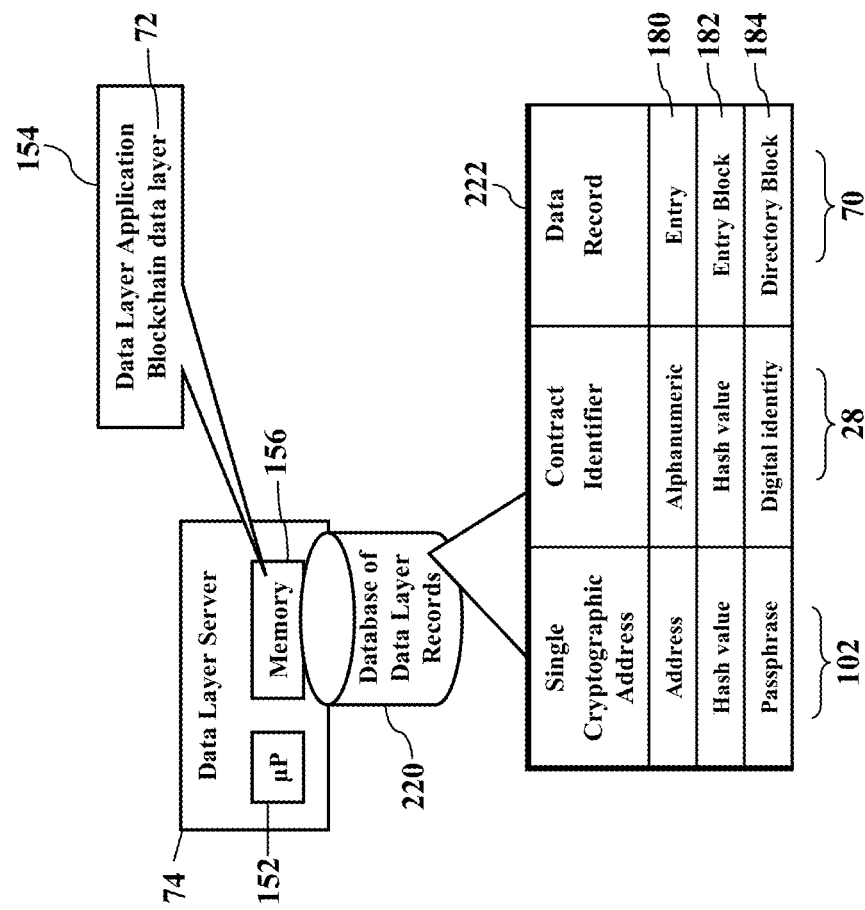

FIGS. 25-27 further illustrate the access mechanism, according to exemplary embodiments. The filling station 110 may be a public and/or private service for financial transactions involving the entity's private cryptocoinage 60, the cryptocoinage 120 issued by the blockchain data layer 72, and/or the digital contract 20. FIG. 25 illustrates the filling station 110 as a software-as-a-service offered by the secure data layer server 74 for accessing the blockchain data layer 72. The filling station 110, for example, may be a module within, or called by, the data layer application 154. A user accesses the filling station 110 to conduct transactions involving her private cryptocoinage 60, the cryptocoinage 120 (issued by the blockchain data layer 72), and/or the digital contract 20. While the filling station 110 may have any user interface, FIG. 25 illustrates a web interface 194. That is, the filling station 110 may be accessed via a webpage 196. The webpage 196 prompts the user to input her authentication credentials according to the authentication mechanism 190 (such as typing the passphrase 192 into a data field or audibly speaking the passphrase 192).

FIG. 26 further illustrates the web interface 194. The user accesses the filling station 110 using a user device 200. While the user device 200 may be any processor-controlled device, most readers are familiar with a smartphone 202. If the smartphone 202 correctly sends authentication credentials (such as the single cryptographic address 102 and/or passphrase 192, as above explained), then the smartphone 202 may utilize the web interface 194 to the data layer server 74 and/or the blockchain data layer 72. The smartphone 202 executes a web browser and/or a mobile application to send a request 204 specifying an address or domain name associated with or representing the filling station 110. The web interface 194 to the data layer server 74 thus sends the webpage 196 as a response, and the user's smartphone 202 downloads the webpage 196. The smartphone 202 has a processor and memory device (not shown for simplicity) that causes a display of the webpage 196 as a graphical user interface (or "GUI") 206 on its display device 208. The GUI 206 may generate one or more prompts or fields for specifying the authentication mechanism 190 and transactional options. For example, the user preferably enters, speaks, or otherwise provides the passphrase 192. Exemplary embodiments may or may not hash the authentication passphrase (using the hashing algorithm 148 above explained) to produce or generate a hashed passphrase. Exemplary embodiments may then search the blockchain data layer 72 for the data records 70. That is, exemplary embodiments may query the blockchain data layer 72 for a query parameter (such as the contract identifier 28 and/or its hashed value) and the blockchain data layer 72 identifies the data records 70 that match or reference the query parameter. The filling station 110 may then process the data records 70 to provide a transactional summary 210 of the digital contract 20. The filling station 110 may also allow the user to replenish an amount or value of the private cryptocoinage 60 and/or the cryptocoinage 120, even allowing the user to continue exchanging the cryptocoinage 60 for access to the blockchain data layer 72.

Exemplary embodiments may thus share the common authentication mechanism 190. If the entity's private software application 40 requires the same passphrase 192 to establish any terms of the digital contract 20, then the passphrase 192 may have been hashed and recorded within the blockchain data layer 72. The single cryptographic address 102, the contract identifier 28, and/or the passphrase 192 may be associated with the data records 70 representing the digital contract 20, the private cryptocoinage 60 (issued by the entity 32), and the cryptocoinage 120 (issued by the blockchain data layer 72). The filling station 110 may thus identify any of the data records 70 that are commonly associated with the contract identifier 28, the private cryptocoinage 60 (issued by the entity 32), and/or the cryptocoinage 120. The filling station 110 thus allows the user to exchange cryptocoinage 60 and 90 for access to the private blockchain 24 and/or the blockchain data layer 72.

FIG. 27 illustrates a query mechanism. Here the data layer server 74 may access a database 220 of data layer records. The database 220 of data layer records provides a referential record of the informational content contained within the blockchain data layer 72. FIG. 27 illustrates the data layer server 74 locally storing the database 220 of data layer records in its local memory device 156, but the database 220 of data layer records may be remotely stored and accessed via the communications network 142. Regardless, the data layer server 74 may query the database 220 of data layer records for the single cryptographic address 102 and/or the contract identifier 28 and identify and/or retrieve any corresponding data records 70. While the database 220 of data layer records may have any logical structure, FIG. 27 illustrates the database 220 of data layer records as a table 222 that maps, converts, or translates the single cryptographic address 102 and/or the contract identifier 28 to its corresponding entry 180, entry block 182, and/or directory block 184 within the blockchain data layer 72. Whenever the data layer server 74 generates the entry 180, entry block 182, and/or directory block 184, the data layer server 74 may add an entry to the database 220 of data layer records. Over time, then, the database 220 of data layer tracks a comprehensive historical repository of information that is electronically associated with its corresponding contract identifier 28. The data layer server 74 may then read or retrieve the entry 180, entry block 182, and/or directory block 184 containing or corresponding to the contract identifier 28.

Exemplary embodiments thus present the entity-specific cryptocoinage 60. Any entity 32 may create its own private blockchain 24, establish its entity-specific tokens 62, and define or offer digital contracts 20. The entity-specific tokens 62 may or may not have the value 94. The tradeable token 66, for example, may have a market value based on supply and/or demand, thus allowing or causing the value 94 of the tradeable token 66 to rise/fall or to increase/decrease, based on market forces. The credit token 64, however, may have a constant price or value, perhaps set by the entity 32. The entity-specific tokens 62 may be associated with the contract identifier 28, thus allowing a faster and simpler accounting scheme for machine executable contractual terms.

Exemplary embodiments may thus create coinage on top of coinage. The hierarchical scheme (explained with reference to FIG. 21) allows the private entity 32 to establish its private cryptocoinage 60 hierarchically above the traditional BITCOIN®, ETHEREUM®, or RIPPLE® coinage. The entity's private data 36 remains private, but the transaction records 100 may be publicly documented or proved via the traditional BITCOIN®, ETHEREUM®, or RIPPLE® environment. The private entity 32, in other words, need to worry about or concern itself with public publication. The private entity 32 need only subscribe (e.g., pay for write access) to the blockchain data layer 72. The digital contract 20 may also be offered, executed, and documented by the transaction records 100.

Figure 28:
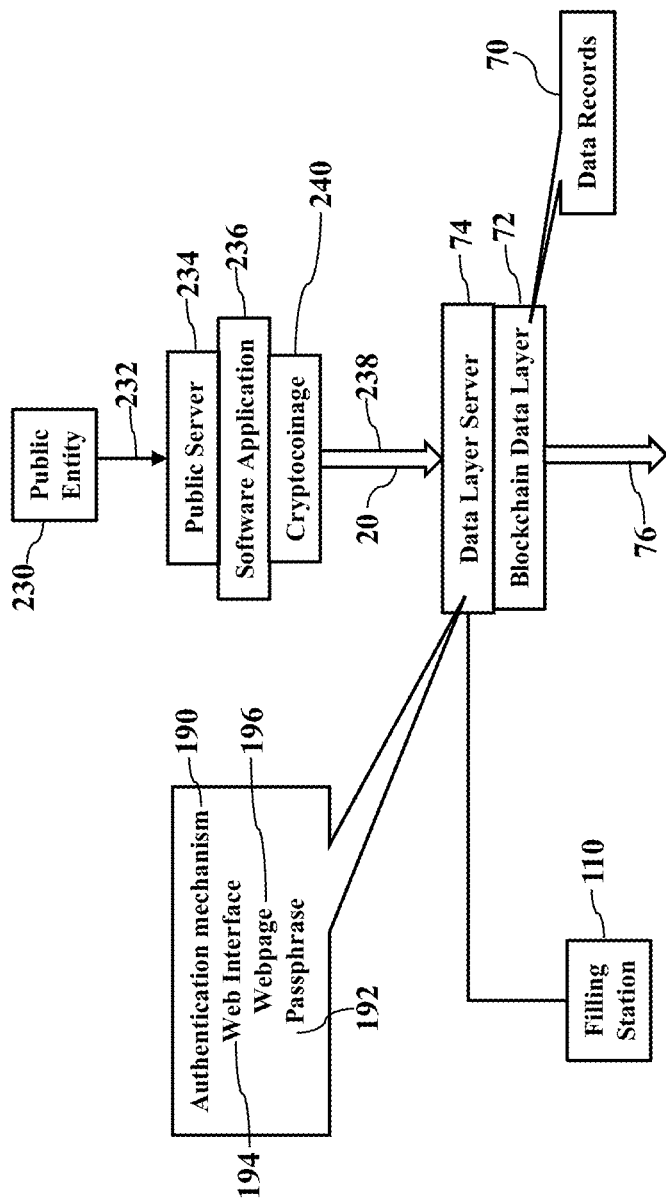
FIG. 28 illustrates a public entity, according to exemplary embodiments.
Figure 29:
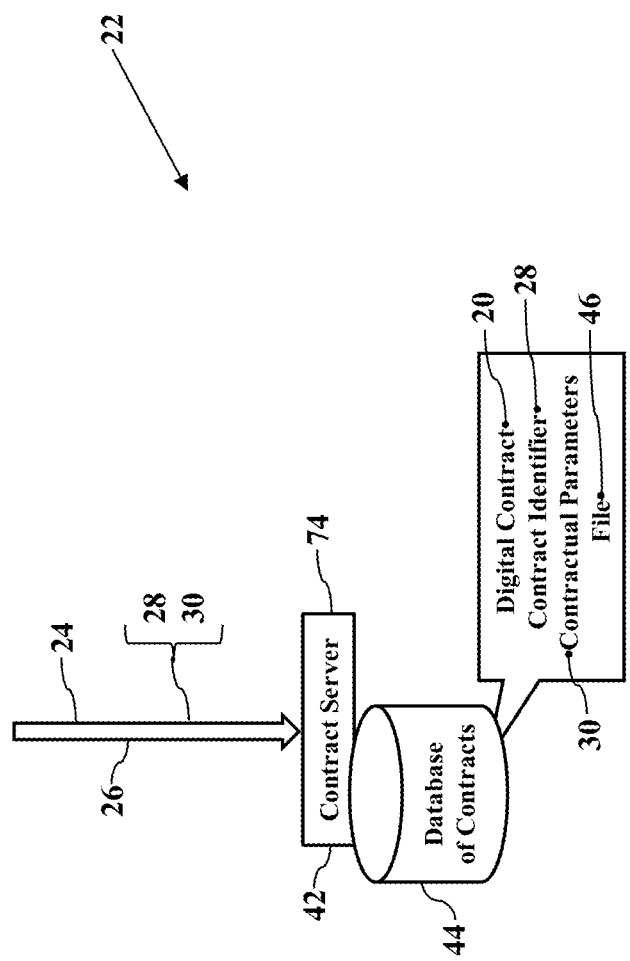
FIGS. 29-32 illustrate contractual execution, according to exemplary embodiments.

FIG. 28 illustrates a public entity 230, according to exemplary embodiments. Here exemplary embodiments may be applied to public data 232 generated by the public entity 230. The public entity 230 may be a city, state, or federal governmental agency, but the public entity 230 may also be a contractor, non-governmental organization, or other actor that acts on behalf of the governmental agency. The public entity 230 operates a public server 234 and applies its software application 236 to its public data 232 to generate its governmental blockchain 238. The public entity 230 may further generate/issue its cryptocoinage 240 and offer digital contracts 20 for governmental, public services. The data layer server 74 receives the governmental blockchain 238 and generates the blockchain data layer 72. The data layer server 74 may then generate the public blockchain 76 representing any data records 70 representing the public data 232 and/or the cryptocoinage 240.

FIGS. 29-32 further illustrate contractual execution, according to exemplary embodiments. When the contract server 42 (such as the data layer server 74) receives the blockchain 24, exemplary embodiments inspect the blockchain 24 to identify the contract identifier 28 and/or the contractual parameters 30. The contract identifier 28 and/or the contractual parameters 30 may be contained within the block 26 of data within the blockchain 24. The contract identifier 28 and/or the contractual parameters 30 may be additionally or alternatively be metadata contained within the block 26 of data, and/or the contract identifier 28 and/or the contractual parameters 30 may be a data, data field, and/or a file attachment. The contract identifier 28 and/or the contractual parameters 30 may be information or data specified by the blockchain 24 and/or by a packet header or body. Regardless, once the contract identifier 28 and/or the contractual parameters 30 are determined, exemplary embodiments may consult the electronic database 44 of contracts.

Figure 30:
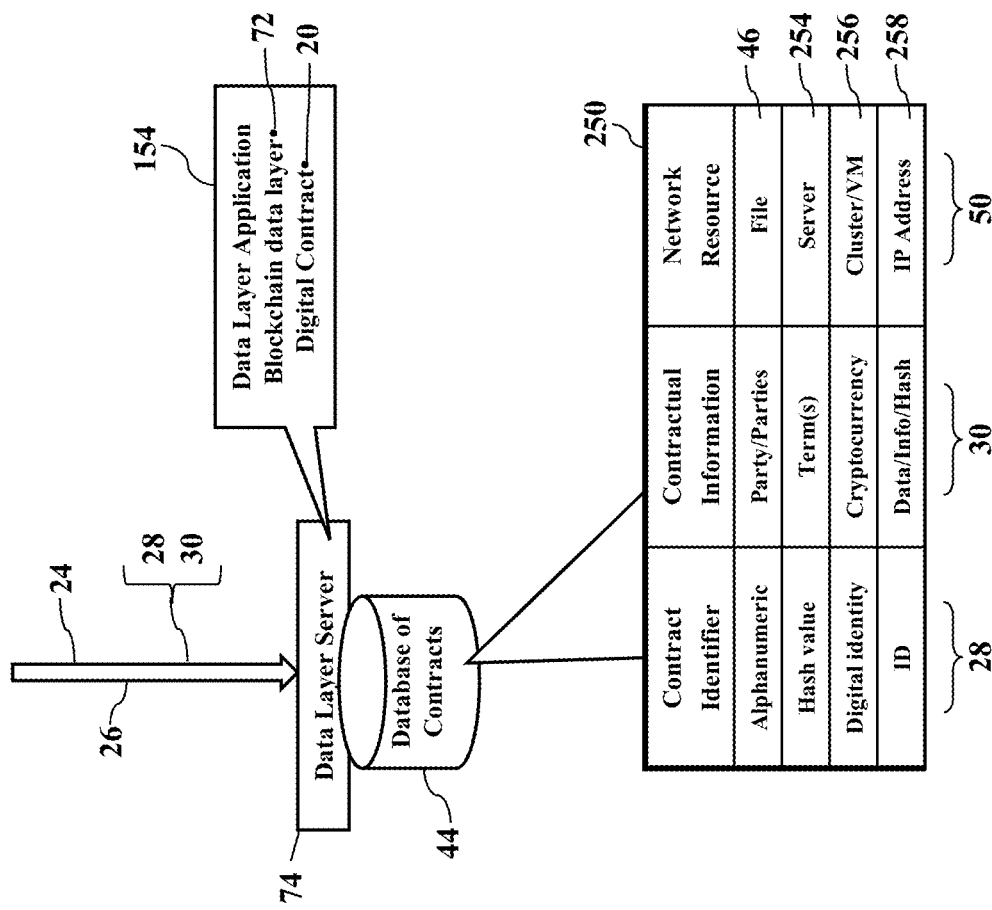

FIG. 30 illustrates the database 44 of contracts. While the database 44 of contracts may have any logical structure, a relational database is perhaps easiest to understand. FIG. 30 thus illustrates the database 44 of contracts as an electronic table 250 that maps, converts, or translates the contract identifier 28 and/or the contractual parameters 30 to their corresponding network resource(s) 50. The database 44 of contracts may thus be preconfigured or preloaded with entries that assign or associate different contract identifiers 28 and/or contractual parameters 30 to their corresponding network resource 50 that provides, processes, and/or executes the corresponding digital contract 20. As the data layer server 74 receives any blockchain 24, the data layer server 74 may inspect the blockchain 24 for the contract identifier 28 and/or the contractual parameters 30. The data layer server 74 may then query the database 44 of contracts for the contract identifier 28 and/or the contractual parameters 30 to identify the computer file 46, server 254, virtual machine 256, Internet protocol address 258, or other network resource 50 that is responsible for executing the digital contract 20. The database 44 of contracts may optionally contain entries that relate hashed values of the contract identifier 28 and/or the contractual parameters 30. Regardless, once the network resource 50 is identified, the data layer server 74 may direct, assign, or outsource the contractual information 30 to the network resource 50 for processing.

Figure 31:
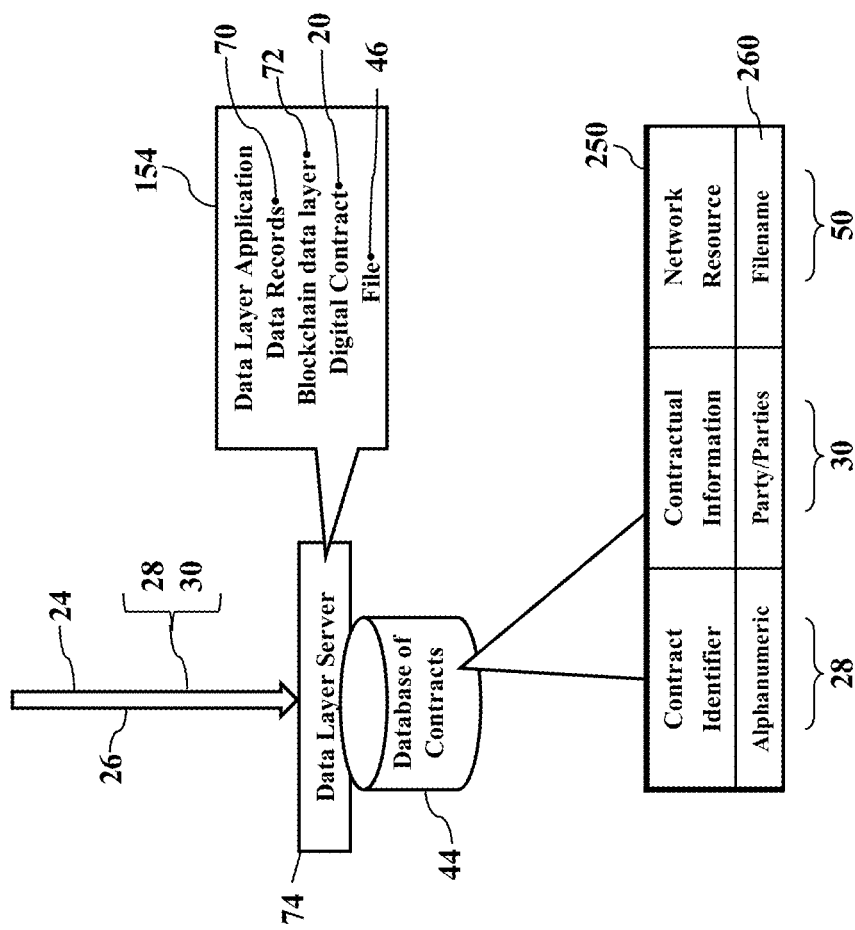

FIG. 31 illustrates a simple example. Here the contract identifier 28 maps to a filename 260 that is associated with, or that represents, the computer file 46 that contains the programming language representing the digital contract 20. So, once the filename 260 is determined, the data layer server 74 may locally retrieve and execute the computer file 46 that corresponds to, or is associated with, the filename 260. The data layer server 74 may then execute the computer file 46, perhaps based on parameters defined or described by the contractual parameters 30 (such as party names, parameters associated with their respective performance obligations and terms, and consideration). Optionally, the data layer server 74 may retrieve the computer file 46 (perhaps via the communications network 146 illustrated by FIGS. 14-15) from a remote server, database, or other device. Regardless, as the computer file 46 is executed, the data layer server 74 may generate the data records 70 in the blockchain data layer 72 describing the execution of the computer file 46. For example, the data records 70 may sequentially and/or serially track the execution of the computer file 46, perhaps logging or documenting periodic or random updates as the computer file 46 executes, perhaps along with timestamps toward completion. The data records 70 may also log or document a final step or outcome of the programming language representing the digital contract 20. Again, then, the blockchain 24 only referenced the digital contract 20 (using the contract identifier 28 and/or the contractual parameters 30). The actual execution of the digital contract 20 may be offloaded or outsourced to the data layer server 74.

Figure 32:
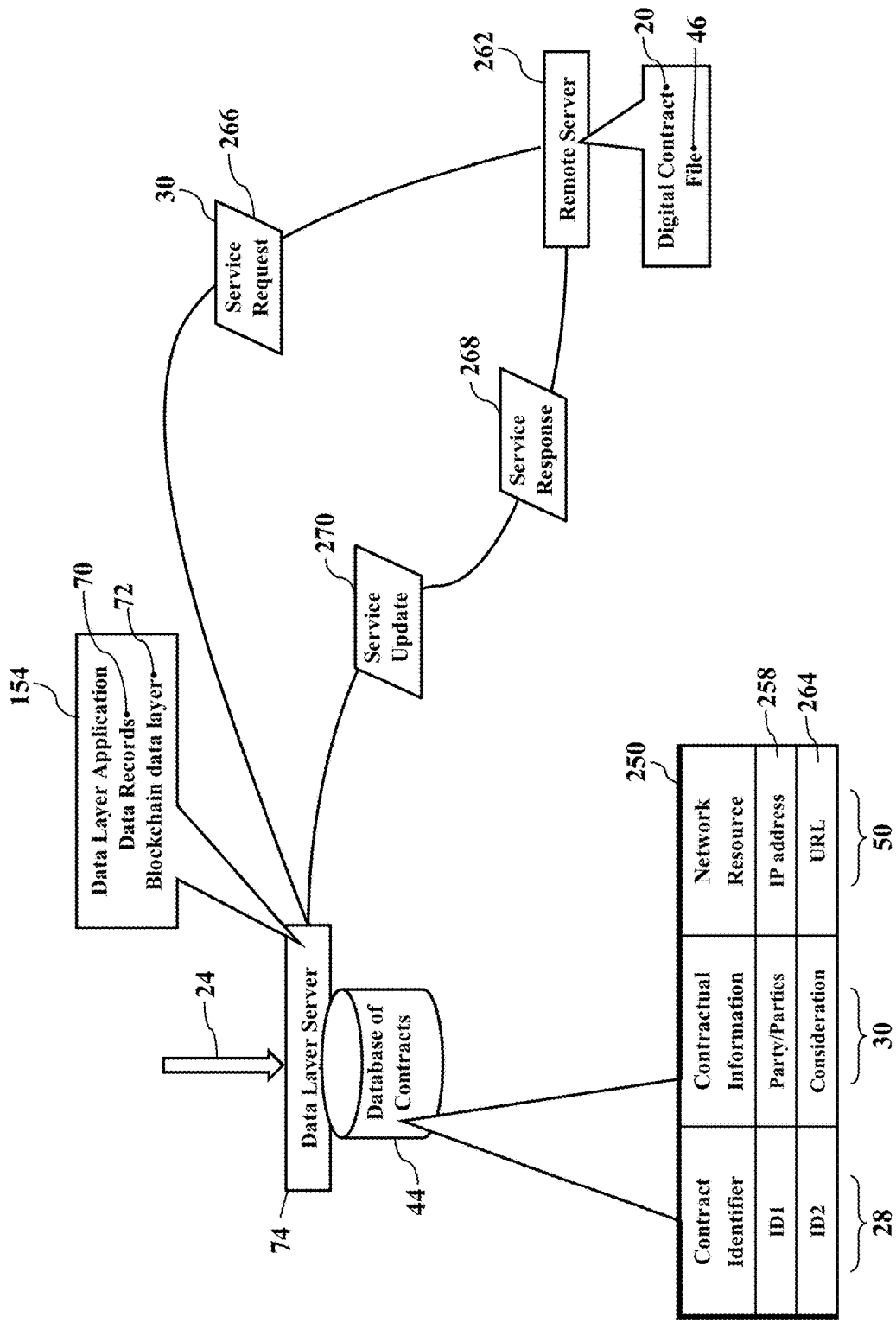

FIG. 32 illustrates another example. Here the data layer server 74 may only manage the execution of the digital contract 20 referenced by the contract identifier 28 and/or the contractual parameters 30. That is, the data layer server 74 may outsource the execution of the digital contract 20 to a vendor or supplier as a subcontractor process. Again, when the data layer server 74 receives the blockchain 24, the data layer server 74 inspects the blockchain 24 to identify the contract identifier 28 and/or the contractual parameters 30. The data layer server 74 may then consult the database 44 of contracts. Here, though, the database 44 of contracts has entries that map or relate the contract identifier 28 to a remote server 262 that executes the digital contract 20 as a cloud-based service (perhaps as a software-as-a-service or SAAS). The database 44 of contracts may thus associate the contract identifier 28 to the Internet protocol address 258 representing the remote server 262 that executes the digital contract 20. The database 44 of contracts may additionally or alternatively associate the contract identifier 28 to a uniform resource locator (or "URL") 264 representing the remote server 262 that executes the digital contract 20. Regardless, once the remote server 262 is determined, the data layer server 74 may retrieve and send a service request 266 to the remote server 262 (via the Internet protocol address 258 and/or the URL 264 representing the remote server 262). The service request 266 specifies the contract identifier 28 and requests an execution of the corresponding digital contract 20. The service request 266 may also specify the contractual parameters 30. When the remote server 262 (perhaps operated on behalf of a third party) receives the service request 266, the remote server 262 applies the parameters defined or described by the contractual parameters 30 to the programming code (such as the computer file 46) representing the digital contract 20. Once the digital contract 20 is executed, the remote server 262 may then send a service response 268 back to the data layer server 74, and the service response 268 comprises data or information describing an outcome of the digital contract 20 (such as consideration, payment, or performance terms).

The data layer server 74 may generate the data records 70 in the blockchain data layer 72. For example, the data records 70 may document the date and time that the service request 266 was sent to the remote server 262. Moreover, as the remote server 262 provides the digital contract 20 as a service, the remote server 262 may send periodic or random service updates 270 as the service is provided along with timestamps toward completion. The data layer server 74 may thus generate the data records 70 describing the service updates 270 received from the remote server 262. The data layer server 74 may also generate the data records 70 describing the service response 268 sent from the remote server 262 describing an outcome of the digital contract 20.

Figure 33:
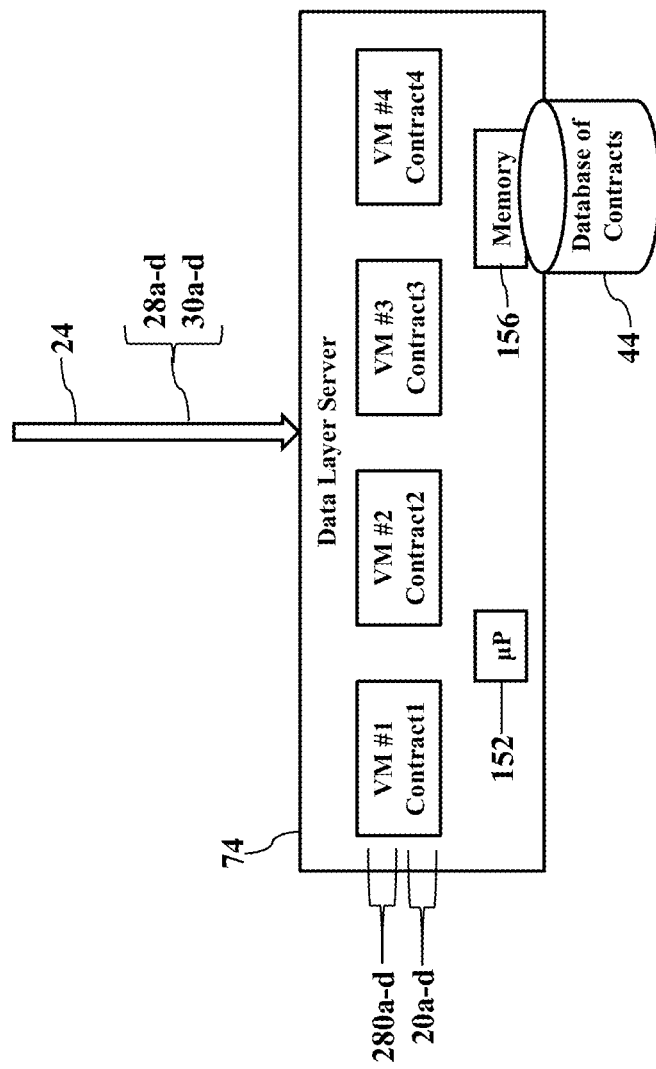
FIGS. 33-34 illustrate virtual execution, according to exemplary embodiments.
Figure 34:
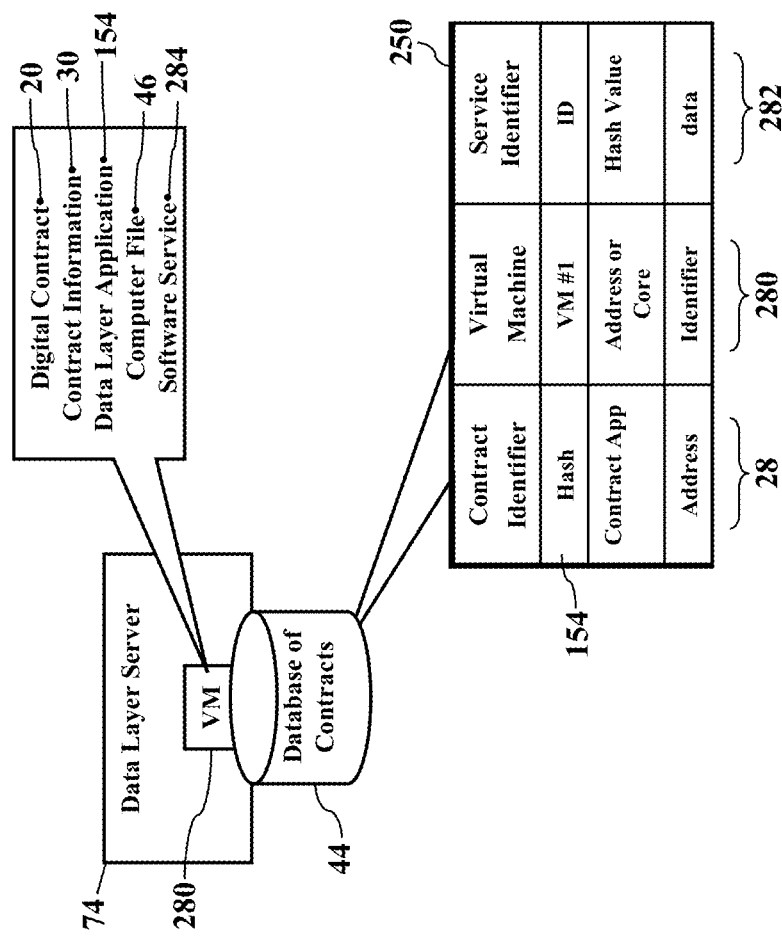

FIGS. 33-34 illustrate virtual execution, according to exemplary embodiments. Here the data layer server 74 may outsource or subcontract the execution of the digital contract 20 to a virtual machine (or "VM") 280. For example, the data layer server 74 may implement different virtual machines 190, with each virtual machine 190 processing and/or executing a particular digital contract 20, perhaps as a software service. The data layer server 74 may provide virtual computing and/or virtual hardware resources to client devices, thus lending or sharing its hardware, computing, and programming resources. The data layer server 74 may thus operate or function as a virtual, remote resource for providing contractual execution as software services. Suppose, for example, that the data layer server 74 implements four (4) virtual machines 280*a-d*. In practice, though, the data layer server 74 may implement any number or instantiations of different virtual machines 280 and/or digital contracts 20, depending on complexity and resources. Moreover, as a further simplification, assume that each virtual machine 280*a-d* executes a different corresponding digital contract 20*a-d*. So, when the data layer server 74 receives the blockchain 24, the data layer server 74 may inspect the blockchain 24 for each contract identifier 28*a-d* and/or the corresponding contractual information 28*a-d* and consult the database 44 of contracts.

FIG. 34 further illustrates the database 44 of contracts. Here the database 44 of contracts may include entries that map the contract identifier 28 to the corresponding virtual machine 280. The database 44 of contracts may thus be preconfigured or preloaded with entries that assign or associate each virtual machine 280 to its corresponding contract identifier 28. Once the virtual machine 280 is identified, the data layer server 74 may then coordinate and/or manage the execution of the corresponding digital contract 20, perhaps based on the contract information 30. Suppose, for example, that the data layer application 154 has programming or code that functions or performs as a query handler. The data layer application 154 inspects the blockchain 24 for the contract identifier 28 and queries the database 44 of contracts (as above explained). The data layer application 154 thus identifies and/or retrieves the corresponding virtual machine 280. Exemplary embodiments may thus determine whether contract identifier 28 matches or satisfies any of the entries specified by the database 44 of contracts. FIG. 34 illustrates entries that map the contract identifier 28 to its corresponding virtual machine 280 (e.g., an address, processor core, identifier, or other indicator).

The digital contract 20 may then be executed. For example, once the contract identifier 28 and the virtual machine 280 are determined, the virtual machine 280 may then call, retrieve, and/or execute the computer file 46 that provides the digital contract 20 as a virtual service or process. FIG. 34 illustrates the computer file 46 locally stored and executed by the data layer server 74, but the computer file 46 may be remotely stored, retrieved, and/or executed. Regardless, the virtual machine 280 may be instructed to retrieve, execute, and/or apply the computer file 46, perhaps based on the contractual information 30.

FIG. 34 also illustrates software services. Here the database 44 of contracts may include entries that map the contract identifier 28 to a corresponding software service provided by the virtual machine 280. Exemplary embodiments, in other words, may relate the contract identifier 28 to a service identifier 282. The service identifier 282 is any alphanumeric combination, data, or hash value that uniquely identifies a software service 284 provided by the virtual machine 280. Once the contract identifier 28, the software service 284, and/or the virtual machine 280 are determined, the virtual machine 280 may then provide the software service 284. The software service 284 may execute the digital contract 20, perhaps based on the contractual information 30.

Figure 35:
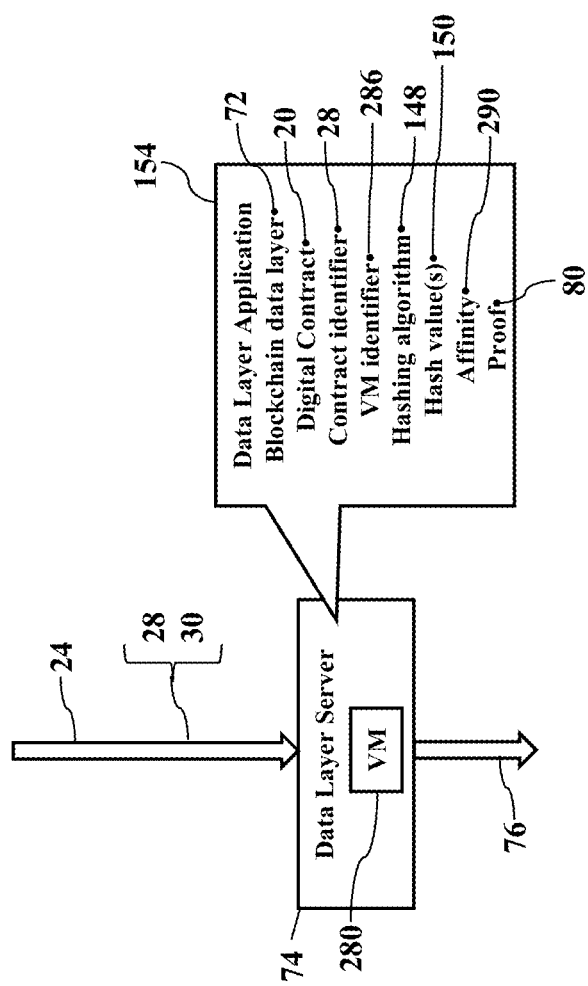
FIG. 35 illustrates cryptographic affinities, according to exemplary embodiments.

FIG. 35 illustrates cryptographic affinities, according to exemplary embodiments. Here the data layer server 74 may create or generate a cryptographic affinity 290 describing contractual execution. This disclosure above explained how the data layer server 74 may generate the data records 70 in the blockchain data layer 72. This disclosure also above explained how the data records 70 may document execution of the digital contract 20. Here, then, the cryptographic affinity 290 may uniquely identify the digital contract 20 executed by the virtual machine 280. For example, once the contract identifier 28 and the virtual machine 280 are determined (as above explained), the hashing algorithm 148 may generate a unique hash value 150. That is, the hashing algorithm 148 may hash the contract identifier 28 with a virtual machine ("VM") identifier 292 to generate the cryptographic affinity 290. The virtual machine identifier 292 is any alphanumeric combination, data, or hash value that uniquely identifies the virtual machine 280. The cryptographic affinity 290 may then be documented by the data records 70 in the blockchain data layer 72, thus evidencing the execution of the digital contract 20. Indeed, the cryptographic affinity 290 may be published via the public blockchain 76 as the cryptographic proof 80, thus further publicly evidencing the execution of the digital contract 20.

Figure 36:
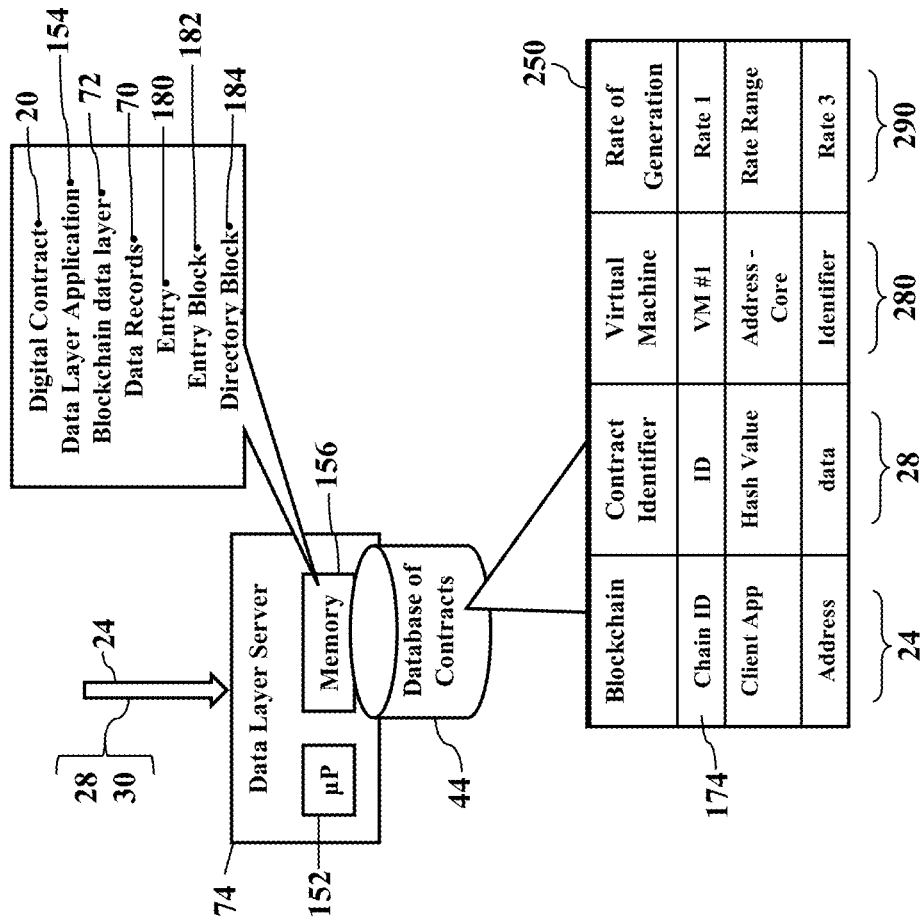
FIG. 36 illustrates virtual assignments based on the blockchain data layer, according to exemplary embodiments.

FIG. 36 illustrates virtual assignments based on the blockchain data layer 72, according to exemplary embodiments. As this disclosure previously explained, exemplary embodiments may generate the data records 70 representing the blockchain data layer 72 (such as the entries 180, the entry blocks 182, and/or the directory blocks 184 explained with reference to FIGS. 17-19). Exemplary embodiments may thus assign the blockchain 24 and/or the virtual machine 280 that executes the digital contract 20, based on the number of the entries 180, the entry blocks 182, and/or the directory blocks 184 generated within the blockchain data layer 72. For example, as the data records 70 are generated, the data layer server 74 may determine a rate 290 of generation. That is, as the data records 70 are generated when or while executing the digital contract 20, exemplary embodiments may sum or count the entries 180, the entry blocks 182, and/or the directory blocks 184 that are generated over time (such as per second, per minute, or other interval). Exemplary embodiments, for example, may call or initialize a counter having an initial value (such as zero). At an initial time (such as when the blockchain 24 is received or when the contract identifier 28 is determined), the counter commences or starts counting or summing the number of the entries 180, the entry blocks 182, and/or the directory blocks 184 (generated within the blockchain data layer 72) that are commonly associated with or reference the blockchain 24 (perhaps according to the chain ID 174) and/or the contract identifier 28. The counter stops counting or incrementing at a final time and exemplary embodiments determine or read the final value or count. Exemplary embodiments may then calculate the rate 290 of generation as the sum or count over time and consult or query the electronic database 44 of contracts for the rate 290 of generation. Exemplary embodiments may thus define entries that map or associate different rates 290 of generation and/or ranges to their corresponding contract identifier 28 and/or virtual machines 280. If the database 44 of contracts has an entry that matches or satisfies the rate 290 of generation, exemplary embodiments identify the corresponding virtual machine 280.

The rate 290 of generation may thus be a feedback mechanism. As the blockchain 24 is received. the data records 70 are requested, and/or the digital contract 20 is executed, the rate 290 of generation of the data records 70 may determine the virtual machine 280 that is assigned adequate capacity or bandwidth. One of the blockchains 24 and/or virtual machines 280, for example, may be reserved for digital contracts 20 having a heavy, disproportionate, or abnormally large rate 290 of generation. Another of the blockchains 24 and/or virtual machines 280 may be reserved for digital contracts 20 having a medium, intermediate, or historically average rate 290 of generation. Still another blockchain 24 and/or virtual machine 280 may be reserved for the digital contracts 20 having a light, low, or historically below average rate 290 of generation. The rate 290 of generation may thus be a gauge or measure of which blockchain 24, digital contract 20, and/or virtual machine 280 is assigned the resources.

Exemplary embodiments thus include a service environment. Exemplary embodiments may manage and/or execute many different digital contracts 20 offered by many different vendors or suppliers. Indeed, the data layer server 74 may manage or even execute the digital contracts 20 while also generating the blockchain data layer 72 as still another service. The data layer server 74 may thus acts as a subcontractor or service provider, perhaps in a subscription or other compensation scheme. Any customer or client (such as the entity server 140 explained with reference to FIGS. 14-15) may thus send or forward its private blockchain 24 (generated from its private data 36) to the data layer server 74 for management or execution of any digital contract 20. The data layer server 74 may generate the data records 70 of the blockchain data layer 72 that document the management or execution of any digital contract 20. Moreover, the data layer server 74 may publicly publish the cryptographic proof 80 within the public blockchain 76, thus further documenting immutable evidence of the management or execution of any digital contract 20. Indeed, the entity server 140 may also generate the blocks 26 of data within the private blockchain 24 that also document the date and time that the management or execution of any digital contract 20 was sent/requested. The entity server 140 may then pay or reward the data layer server 74 in exchange for the digital contract 20 and/or the data records 70 in the blockchain data layer 72 (such as granting its crytpocoinage 60 and 120, as explained with reference to FIG. 11).

The data layer server 74 may thus serve many blockchains 24 requesting many different contractual services. The financial institution 34, for example, may send or forward its private blockchain 36a (as illustrated with reference to FIGS. 12-13) to the data layer server 74 for application or execution of any digital contract 20 (by specifying the contract identifier 20, as above explained). The retailer 122 may similarly send or forward its private blockchain 36b to the data layer server 74 for application or execution of any digital contract 20. The online website 124 may also send or forward its private blockchain 36c to the data layer server 74 for application or execution of any digital contract 20. The data layer server 74 may generate the data records 70 of the blockchain data layer 72 that document the management and/or execution of any digital contract 20, and the data layer server 74 may publicly publish each cryptographic proof 80 within the public blockchain 76, thus further documenting immutable evidence of the management and/or execution of any digital contract 20. The entity 32 may then pay or reward the data layer server 74 via their respective crytpocoinage 60 and 120.

Exemplary embodiments thus only need to identify the digital contract 20. The contract identifier 28 and the contractual parameters 30 need only be informational content in the private blockchain 24. The contract identifier 28 is any digital identifying information that uniquely identifies or references the digital contract 20. The contract identifier 28 may be an alphanumeric combination that uniquely identifies a vendor and/or version of the digital contract 20 and/or a processor or executioner of the digital contract 20. The contract identifier 28 may be expressed as a unique hash value that is included within, or specified by, the private blockchain 24. Similarly, the contractual parameters 30 may identify the parties to the digital contract 20, their respective performance obligations and terms, and consideration.

Figure 37:
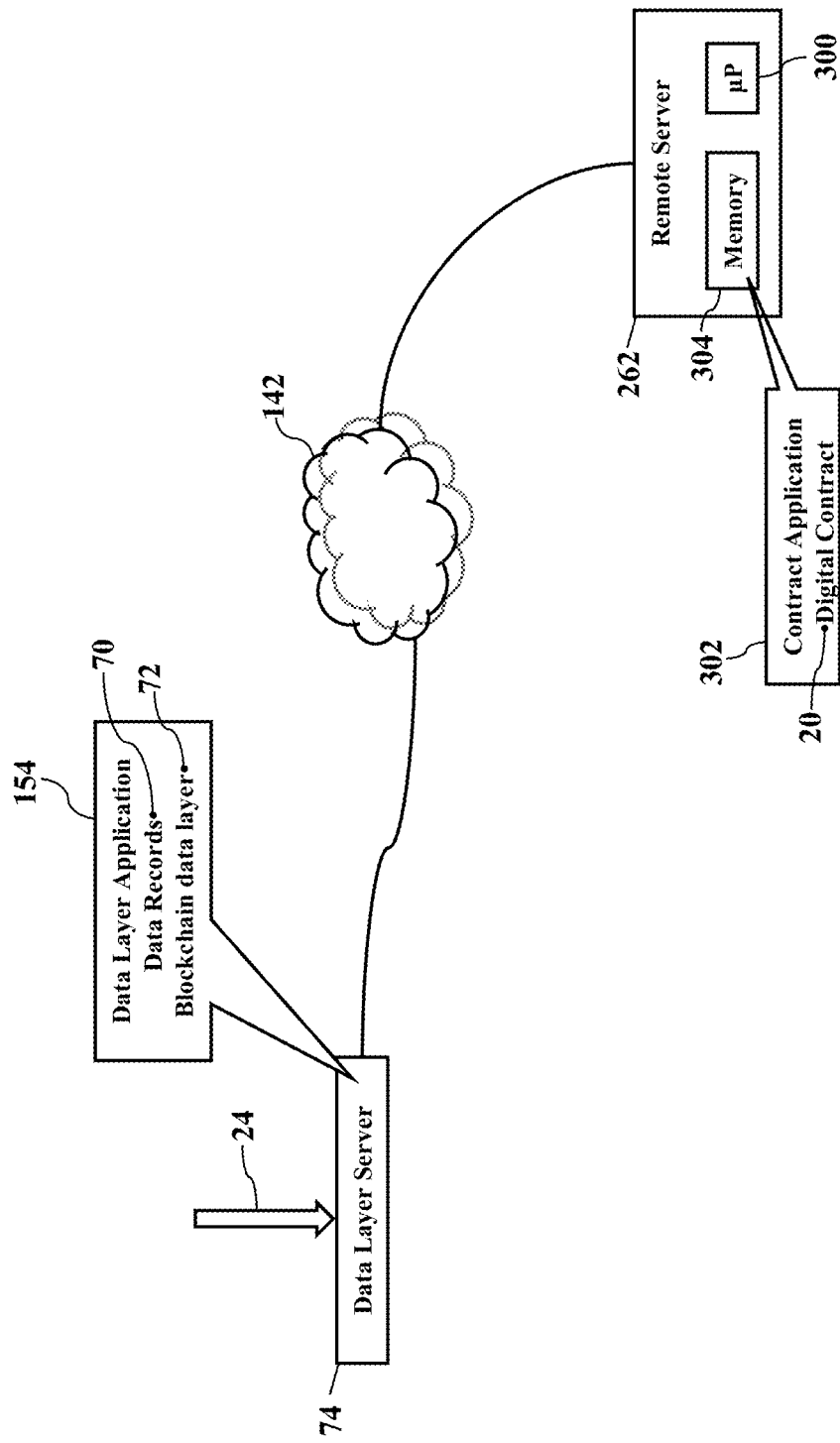
FIGS. 37-43 illustrate an architectural scheme, according to exemplary embodiments.

FIGS. 37-43 illustrate an architectural scheme, according to exemplary embodiments. This disclosure above explained that the data layer server 74 may only manage the execution of the digital contract 20. The implementation and/or actual execution of the digital contract 20 may thus be separate from the data layer server 74 that generates the blockchain data layer 72. FIG. 37, for example, illustrates the data layer server 74 communicating via the communications network 142 with the remote server 262. The data layer server 74 generates the blockchain data layer 72, and the remote server 262 executes at least some portion of the digital contract 20. The remote server 262 may thus have a hardware processor 300 (e.g., "µP"), application specific integrated circuit (ASIC), or other component that executes a contract application 302 stored in a local memory device 304. The remote server 262 has a network interface to the communications network 142, thus allowing two-way, bidirectional communication with the data layer server 74. The contract application 302 includes instructions, code, and/or programs that cause the remote server 262 to perform operations, such as executing at least some portion of the digital contract 20.

Figure 38:
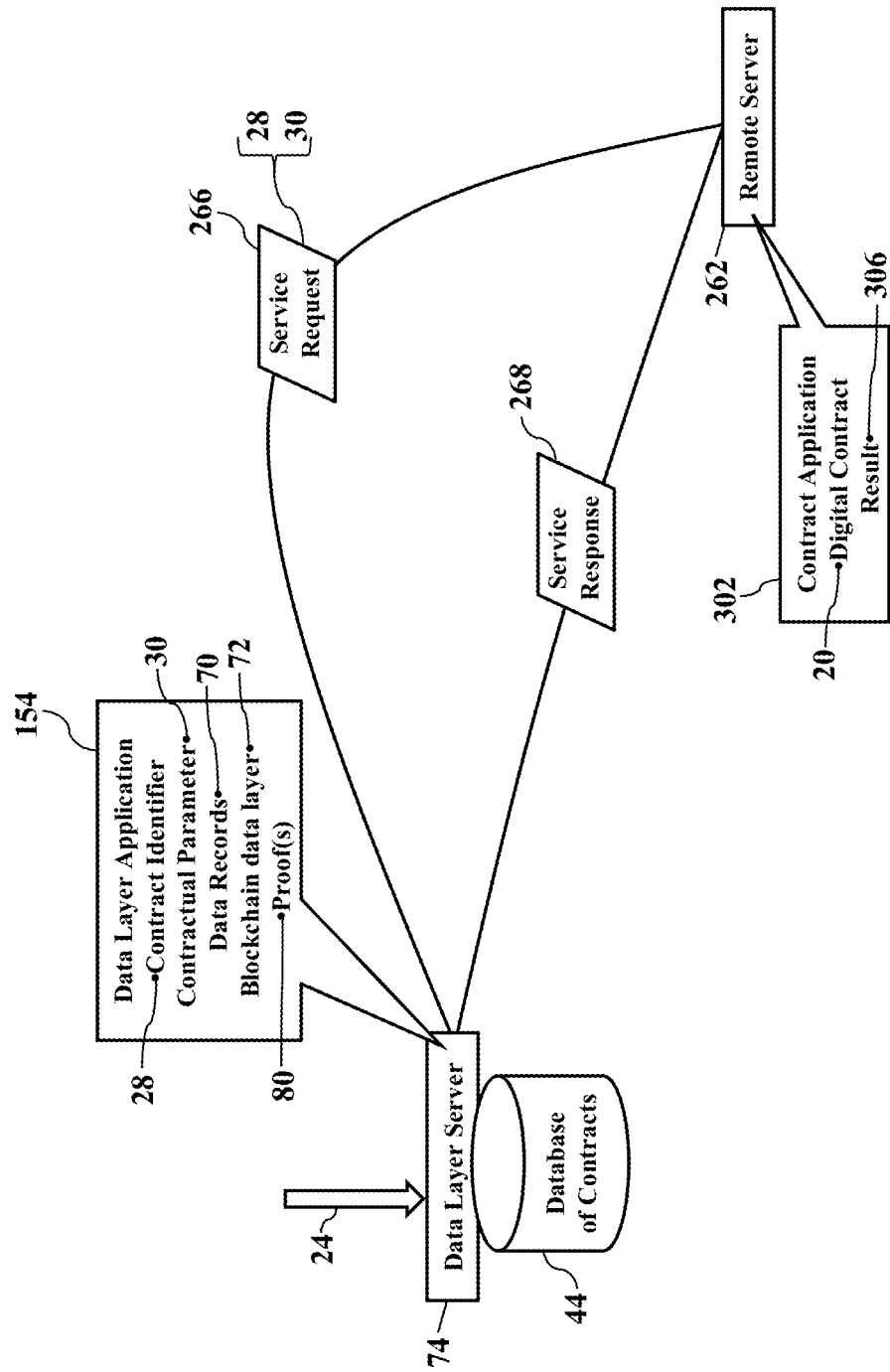

FIG. 38 illustrates a request mechanism. The data layer application 154, for example, identifies the contract identifier(s) 28 and/or the contractual parameters 30 associated with or representing the digital contract 20. The contract identifier(s) 28 and/or the contractual parameters 30 may be sent to the data layer server 74 as an input (such as from the entity server 140, as explained with reference to FIGS. 14-16), or the contract identifiers 28 and/or the contractual parameters 30 may be contained as information in the private blockchain 24. Regardless, the data layer server 74 may then identify the network address, IP address, URL, or other nomenclature representing the remote server 262 that executes at least some portion of the digital contract 20 (perhaps via the database 44 of contracts, as earlier explained). The data layer server 74 sends the service request 266 to the remote server 262, and the service request 266 may include or specify the contract identifier 28 and/or the contractual parameters 30. When the remote server 262 receives the service request 266, the remote server 262 applies the contractual parameters 30 to the portion of the digital contract 20 and generates a contractual result 306. The remote server 262 may then send the service response 268 back to the data layer server 74, and the service response 268 may comprise the contractual result 306.

Exemplary embodiments may thus exchange inputs and outputs. When the data layer server 74 sends the service request 266 to the remote server 262, the service request 266 may include or specify one or more of the contract identifiers 28 and/or the contractual parameters 30. Suppose, for example, that the contract identifiers 28 and/or the contractual parameters 30 are represented as hash values. The hash values may be identified from, or specified by, the private blockchain 24. The hash values may additionally or alternatively be generated by the data layer application 154 (such as by calling, invoking, or executing the hashing algorithm 148, as above explained). Regardless, the service request 266 may thus include or specify the hash values representing the contract identifiers 28 and/or the contractual parameters 30. When the remote server 262 receives the service request 266, the contract application 302 may use or accept the hash values as inputs to generate the contractual result 306 as an output. The contract application 302 may further encrypt the contractual result 306 (such as calling, invoking, or executing the hashing algorithm 148) to generate another hash value representing the contractual result 306.

Exemplary embodiments provide contractual proofs. When the data layer server 74 sends the service request 266 to the remote server 262, the data records 70 may document the service request 266 as one of the cryptographic proofs 80. When the data layer server 74 receives the service response 268, the data records 70 document that receipt and the contractual result 306 as another one of the cryptographic proofs 80. The data records 70 thus prove that at least the portion of the digital contract 20 was outsourced to a vendor or supplier as a subcontractor process or assignment. The data records 70 also prove that at least the portion of the digital contract 20 was executed to provide the contractual result 306. The data layer server 74 may then compare the contractual result 306 (such as its hash value) to a predefined or expect value. If the contractual result 306 matches or equals the predefined or expect value, then the data layer application 154 may be programmed or coded to infer that the contract successfully executed and/or the vendor or supplier performed as obligated. However, if the contractual result 306 fails to match or equal the predefined or expect value, then the data layer application 154 may be programmed or coded to infer that the contract is not satisfied and/or the vendor or supplier failed to perform as obligated.

Figure 39:
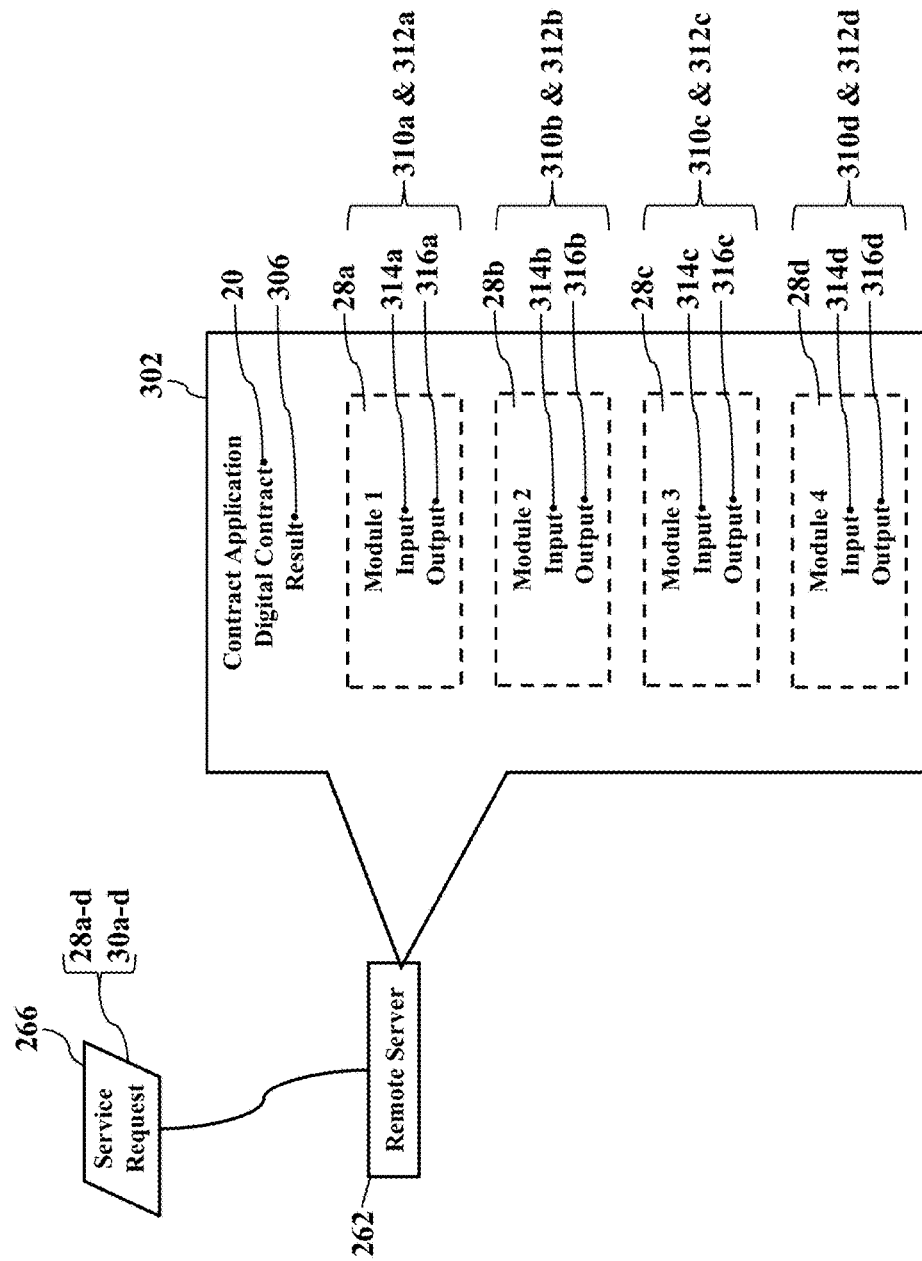

FIG. 39 illustrates a layered contractual process. Here the digital contract 20 may have different or individual components, portions, or sub-parts that cumulatively combine to produce the contractual result 306. The different components, portions, or sub-parts may be software modules 310 that can be separately executed to generate the overall or final contractual result 306. A simple digital contract 20, for example, may only have a few or several software subroutines or modules 310, while a complex or complicated digital contract 20 may have many or hundreds of different software subroutines or modules 310. As the reader likely understands, such a complicated software structure is too difficult to illustrate. For simplicity, then, FIG. 39 illustrates the digital contract 20 having four (4) software modules 310a-d. The entire contract application 302, in other words, may have four (4) different application layers 312a-d. Each componentry module 310a-d or layer 312a-d may have its own corresponding contract identifier 28a-d. When the remote server 262 receives the service request 266, exemplary embodiments may then feed the contractual parameters 30 as inputs 314a-d to the software modules 310a-d. Each different software module 310 may thus generate its respective or corresponding output 316a-d, which may be combined or processed to generate the overall or final contractual result 306.

Figure 40:
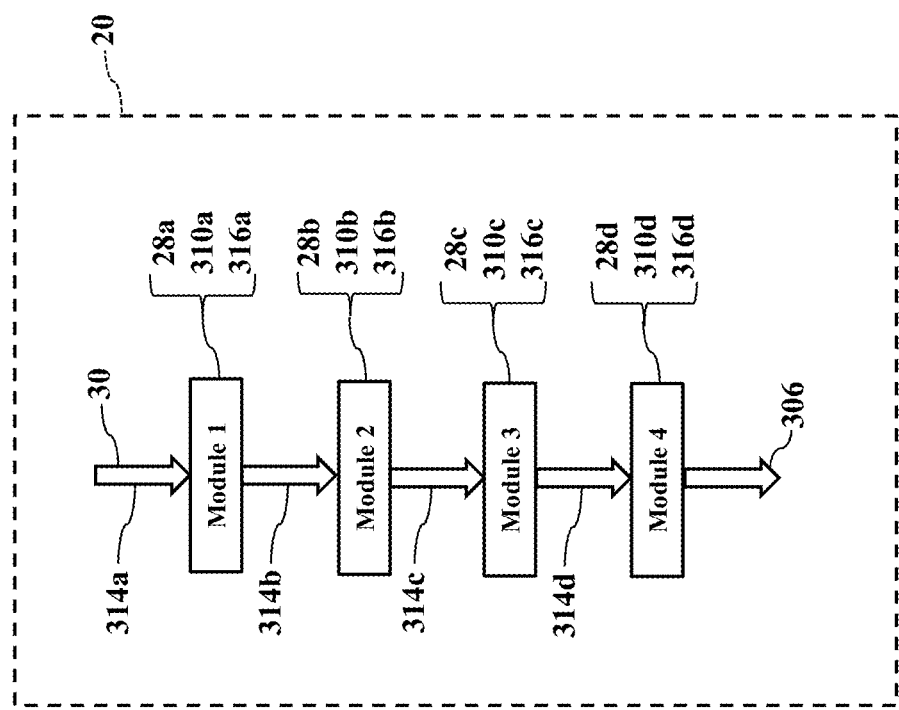

FIG. 40 illustrates hierarchical execution. Here the different software modules 310 may be serially or sequentially executed to generate the overall or final contractual result 306. For example, the software module 310a may accept at least some of the contractual parameters 30 as the input 314a, execute its respective programming code, and generate its corresponding output 316a. Here, though, the output 316a may then be routed or sent to the software module 310b (illustrated as the application layer 312b) as its input 314b. Its respective programming code is then executed to generate its corresponding output 316b, based on the output 316a generated by or received from the software module 310a. Similarly, software module 310c accepts the output 316b and generates output 316c, which is received by software module 310d as input 314d and used to generate the output 316d. While exemplary embodiments may continue processing the outputs 316a-d to generate any desired outcome, for simplicity FIG. 40 illustrates the output 316d as the final contractual result 306. Exemplary embodiments may thus use the software modules 310a-d as feedback mechanisms to monitor or even enforce contractual rule-based obligations defined or specified by the digital contract 20.

Figure 41:
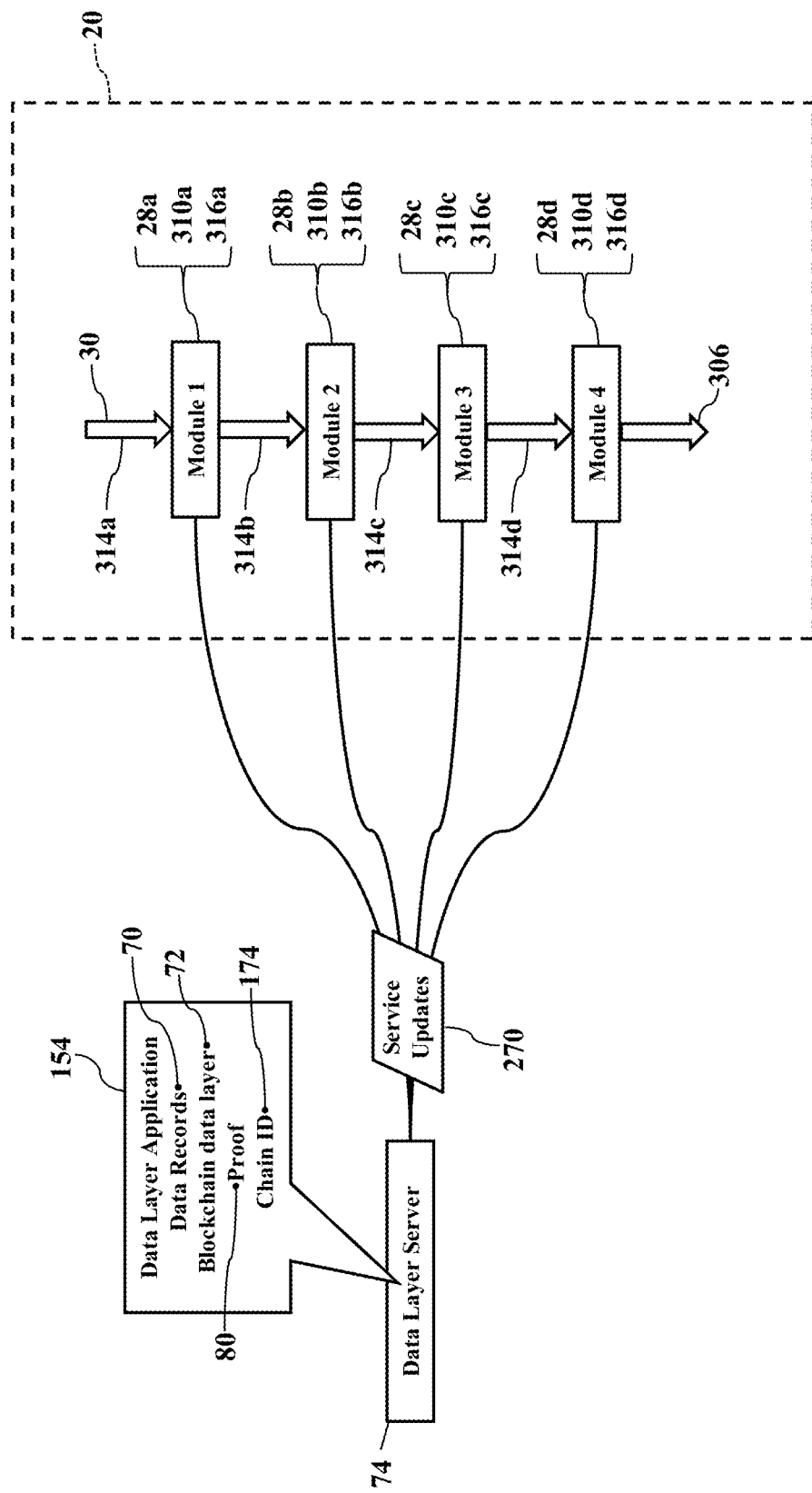

FIG. 41 illustrates the blockchain data layer 72. Here the blockchain data layer 72 may document the processing and/or execution of each software module 310a-d, its respective input(s) 314a-d, its respective output(s) 316a-d, and perhaps a corresponding timestamp (not shown for simplicity). The data records 70 may further document or record the corresponding contract identifier 28a-d and/or the chain identifier 174. The data layer server 74 may thus receive the service updates 270 (via the communications network 142) as each software module 310a-d performs or executes its corresponding contractual service. The data layer server 74 may then generate the data records 70 in the blockchain data layer 72, thus documenting each software component's contribution toward the overall or final contractual result 306. The data records 70 may also be hashed to generate the cryptographic proofs 80, as above explained.

Figure 42:
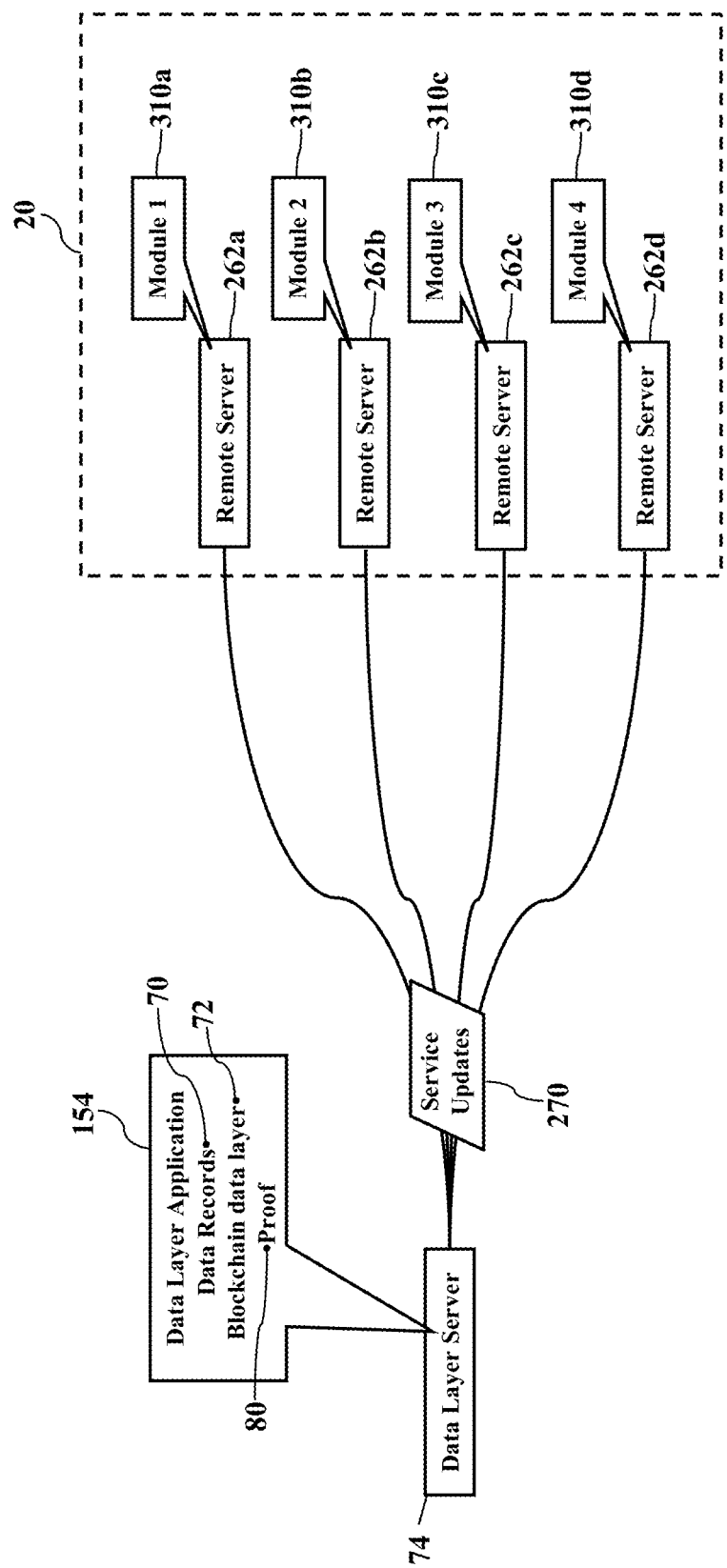

FIG. 42 also illustrates contractual execution. Here, though, the different software modules 310 may be executed by different devices. Suppose, for example, that the remote server 262a locally stores and executes the software module 310a, while the remote server 262b locally stores and executes the software module 310b. Suppose also that the remote server 262c locally stores and executes the software module 310c and the remote server 262d locally stores and executes the software module 310d. Exemplary embodiments may thus source or subcontract the different portions of the digital contract 20 to different machines for execution. The remote server 262a, for example, may specialize in the software module 310a. The remote server 262a may thus accept the service request 266 from clients, execute the software module 310a, and return send the service response 268 (as explained with reference to FIG. 38). The remote server 262a may also send the service update(s) 270 to the data layer server 74, thus allowing the blockchain data layer 72 to document the contractual service provided by the software module 310a. The remote servers 262b-d may similarly specialize in the software modules 310b-d to provide their respective contractual services.

Figure 43:
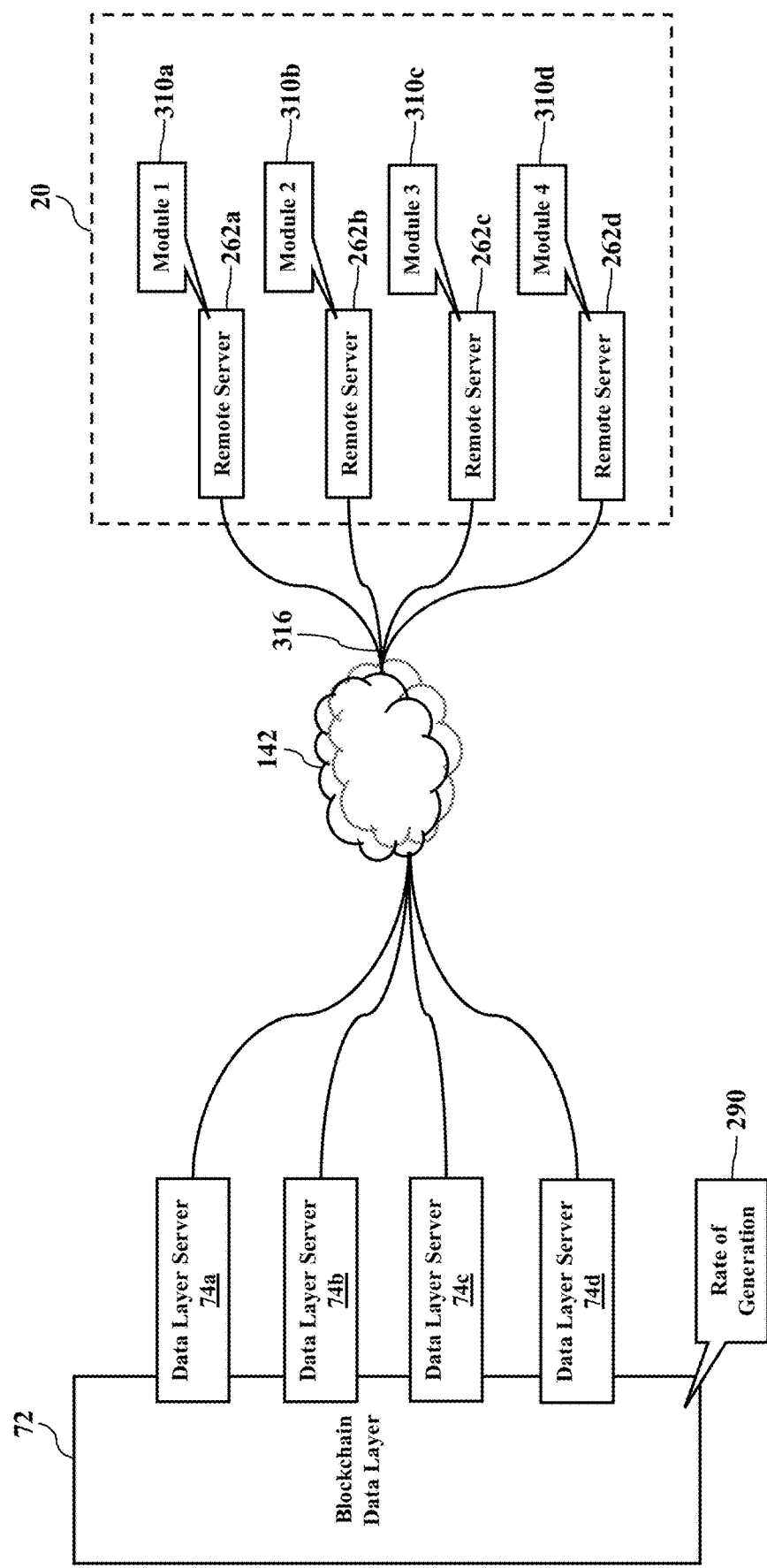

FIG. 43 illustrates an overall architectural scheme. As the reader may envision, there may be hundreds, thousands, millions, or even billions of contractual relationships between many different parties. As smart, digital contracts grow in acceptance and usage, the blockchain data layer 72 is expected to exponentially grow, thus requiring ever-increasing hardware and software resources. In plain words, there may be many data layer servers 74 generating the data records 70 in the blockchain data layer 72. While there may be hundreds or even thousands of data layer servers 74, FIG. 43 simply illustrates four (4) data layer servers 74a-d that cooperate to generate the blockchain data layer 72. As the processing load increases or grows (such as according to the rate 290 of generation, as above explained), the number of data layer servers 74 may also grow.

The blockchain data layer 72 may thus be separate from an implementation and execution of the digital contract 20. The data layer servers 74, in other words, may be separately networked and/or addressed from the remote servers 262 providing the contractual services representing the software modules 310 of the digital contract 20. Any of the data layer servers 74 may send data or information as inputs to any one of the remote servers 262, and the corresponding software module 310 performs its contractual service and sends its output 316 back to the blockchain data layer 72 (perhaps via the service request 266, the service response 268, and the service update 270 as earlier explained and illustrated). Some of the remote servers 262 may provide virtual services, such as a virtual machine (as above explained) that executes any of the software modules 310.

Figure 44:
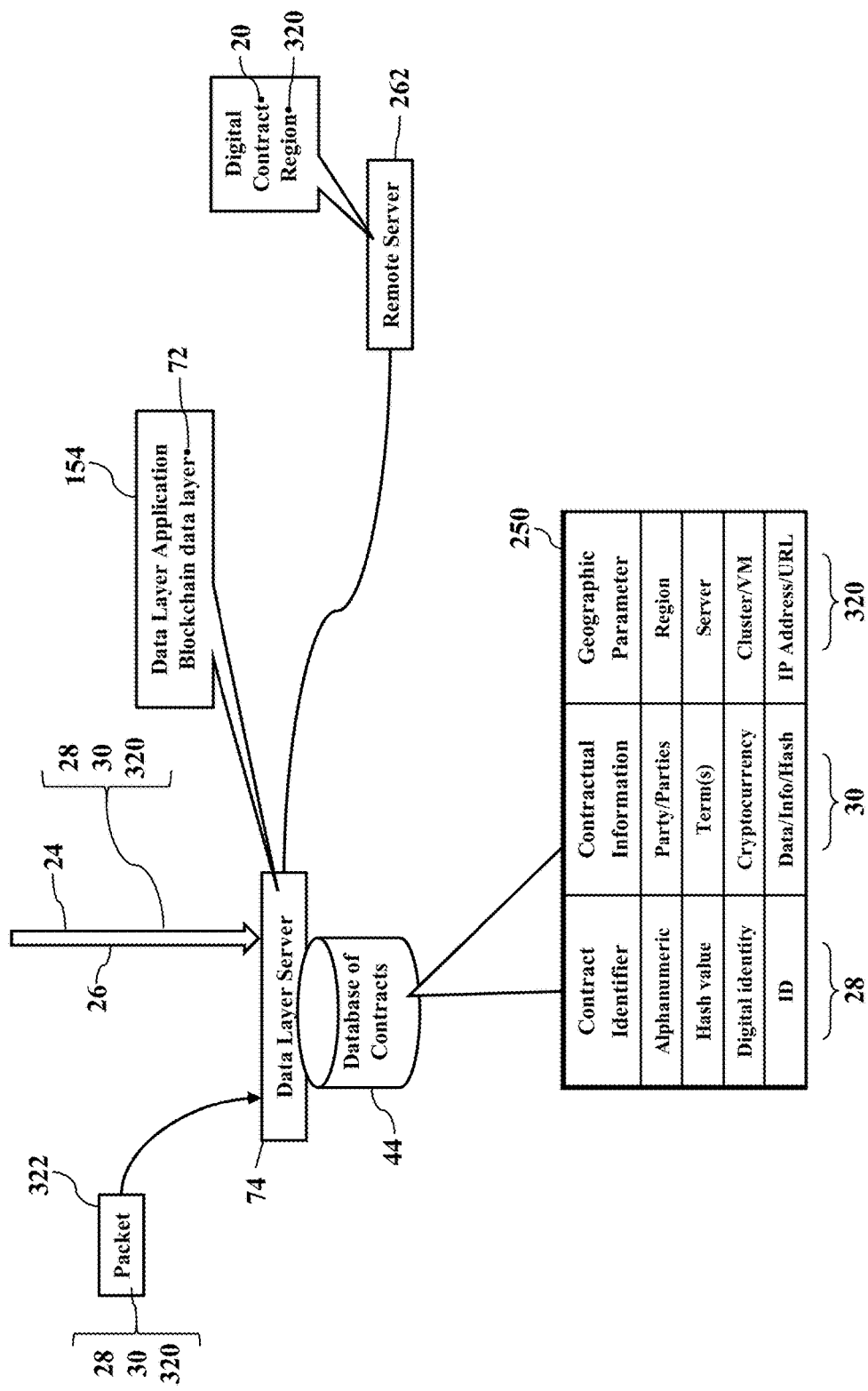
FIG. 44 illustrates compliance scheme, according to exemplary embodiments.

FIG. 44 illustrates compliance scheme, according to exemplary embodiments. As the reader may understand, some smart, digital contracts have jurisdictional requirements. For example, the digital contract 20 may have programming code that requires an execution or processing in a particular region or country. That is, the digital contract 20 may have contractual rules and/or provisions that must be enforced in the United States, the European Union, or the Isle of Man. Components or portions of the digital contract 20 may require execution or location in the Cayman Islands, Idaho, or Hong Kong. The digital contract 20, in other words, may have a geographic parameter 320. The geographic parameter 320 may be a locational requirement, restriction, or preference for at least some portion of the digital contract 20. The geographic parameter 320 can be any data, information, field, metadata, or code for enforcing the locational requirement, restriction, or preference. Indeed, the geographic parameter 320 may even be finely expressed or defined as global positioning system ("GPS") information or coordinates at which at least some portion of the digital contract 20 must be processed or executed.

The geographic parameter 320 may be an input value. As FIG. 44 illustrates, the geographic parameter 320 may be read or received via the private blockchain 24 (perhaps along with the contract identifier 28 and/or the contractual parameter 30). The data layer server 74, in other words, may identify the geographic parameter 320 as data, information, or a hash value contained within the block 26 of data. However, the geographic parameter 320 may additionally or alternatively be received and/or identified within a header of body/payload of a packet 322 of data (packetized according to the Internet Protocol, just as the contract identifier 28 and/or the contractual parameter 30 may be identified).

Regardless, once the geographic parameter 320 is determined, exemplary embodiments may again consult the database 44 of contracts. The database 44 of contracts may have entries that electronically associate the contract identifier(s) 28 and/or the contractual parameter(s) 30 to the geographic parameter 320. The data layer application 154 may instruct the data layer server 74 to query the database 44 of contracts for either, any, or all of the contract identifiers 28, the contractual parameters 30, and/or the geographic parameters 320 to identify and/or retrieve the corresponding database entries. As a simple example, suppose a file component of the digital contract 20 must be processed in a particular geographic region (such as the British Virgin Islands or Canada). The corresponding contract identifier 28, in other words, may be electronically associated with a particular geographic region, as defined by a tabular entry in the database 44 of contracts. Once the region is determined, the data layer server 74 may then route the contract identifier 28, the contractual parameter 30, and/or the geographic parameter 320 to the remote server 262 that is associated with, or even located within, the region. Exemplary embodiments, for example, may implement the service request 266, the service response 268, and the service update 270 (as earlier explained). The remote server 262 may then process or execute the digital contract 20 using the contract identifier 28 and/or the contractual parameter 30 (as this disclosure earlier explained).

Other examples explain the geographic parameter 320. Suppose that the contract identifier 28 and/or the contractual parameter 30 map(s) to a particular server, cluster of servers, and/or a particular virtual machine ("VM"). The data layer server 74 may then route the contract identifier 28, the contractual parameter 30, and/or the geographic parameter 320 to the remote server 262 that is associated with the cluster of servers and/or the virtual machine. The remote server 262 may then process or execute the digital contract 20 using the contract identifier 28 and/or the contractual parameter 30 (as this disclosure earlier explained). More likely, though, the contract identifier 28 and/or the contractual parameter 30 will relate to a particular IP address or uniform resource locator ("URL"). The data layer server 74 may then route the contract identifier 28, the contractual parameter 30, and/or the geographic parameter 320 to the remote server 262 that is associated with the IP address or URL for processing (again, as this disclosure earlier explained).

Exemplary embodiments may thus implement contractual provisions. Some digital contracts 20 may require a particular server, perhaps implementing or hosting a particular website, network, authentication scheme, programming, or other geographic parameter 320. Some parties to the digital contract 20 may also require a particular server, perhaps as specified by the geographic parameter 320. Some digital contracts 20 may have compliance obligations, perhaps defined by a particular jurisdiction and expressed as the geographic parameter 320. Servers, webpages, networks and other resources may be dedicated to specific jurisdictions, as expressed by the geographic parameter 320.

Exemplary embodiments may thus create factored decision tables driven by a table engine. Smart, digital contracts are notoriously dangerous. Decision tables are significantly easier to verify and validate. However, decision tables may be large and perhaps cannot be placed on a blockchain. Exemplary embodiments may thus put smaller contractual components of the digital contract 20 on any blockchain (such as the private blockchain 24 or the public blockchain 76), validate the contractual components (perhaps via the cryptographic proof 80), incorporate the cryptographic proof 80 into a larger component of the digital contract 20, and then validate the larger component.

Exemplary embodiments thus may separate the blockchain data layer data 72 from contractual execution. The data layer server 74 (generating the blockchain data layer data 72) may thus accept inputs from the servers (such as the remote server 262) executing any component of the digital contract 20. The servers (such as the remote server 262) executing any component of the digital contract 20 may also send data to the data layer server 74. The data layer server 74 may thus execute the decision table. The remote server 262 may additionally or alternatively execute the decision table when processing the digital contract 20. The decision table may thus be sent and/or received as an input/output. Even a virtual machine may access and use the decision table.

Exemplary embodiments thus establish the digital contract 20 as an identity. Because only the contract identifier 28 is needed, the digital contract 20 may be separated into various smaller components (such as the software modules 310 and/or layers 312, as above explained). Each software module 310 and/or layer 312 may have its own contract identifier 28. The digital contract 20 is thus transformed to an identity, which may be easily updated after software bugs are found and consensus is documented by stake holders. Exemplary embodiments thus provide an ability to repair bugs and to claw back or backup spurious results. The separation of the blockchain data layer data 72 thus isolates and protects the data records 70.

Exemplary embodiments thus describe a novel smart contract architecture to be run on blockchains. The digital contract 20, and/or its contractual components, may each have its own digital identity defined within the blockchain data layer data 72. The contract identifier 28, in other words, may uniquely identity a version, thus allowing stakeholders (using their digital identities) to approve updates to respond to changes in business, to approve bug resolution, and to accommodate new participants in the digital contract 20, without having to dissolve the original version and without redeploying or requiring the blockchain to be reversed and modified to avoid an incorrect, improper, or unacceptable result by perhaps a majority of users. As the reader may understand, modifying a blockchain to resolve an issue involves many more stakeholders with an interest in the blockchain but having no interest in the smart contract. This has been a problem with conventional blockchain architectures.

Exemplary embodiments may separate the blockchain data layer data 72 from the rules engine architecture that executes the digital contract 20. Exemplary embodiments allow for light weight, secure, and extendible digital identity. Digital identity can be applied to implementation of the virtual machine that runs the digital contract 20. Digital identity can be applied to any smart contract and/or to any stakeholder(s). Stakeholders may thus be paid (perhaps via the cryptocurrencies as explained with reference to FIGS. 5 & 7-13) for who they are, such as to a particular blockchain address, meaning if a stakeholder's address is compromised, then the stakeholder can update the address without having to modify the digital contract 20. This virtual address modification is similar to the real world for when a business moves from one geographic location to another, the business does not invalidate all its contracts. In the real world, the business merely informs parties of its new physical address and contact information. Exemplary embodiments allow management of the digital contract 20 in a flexible fashion, similar to management of contracts in the real world, but with blockchain security and data integrity of the actual digital contract 20, automation of provisions in the digital contract 20, and cryptopayment support.

Exemplary embodiments are also scalable. Layers or modules 310 and 312 can be created in the digital contract 20 and/or in the private blockchain 24 or the public blockchain 76 for improved flexibility and management via hardware computers. The data records 70 in the blockchain data layer data 72 are safely separated from the servers that execute the digital contract 20. Contract servers (e.g., the contractual application layer) may perform a decentralized evaluation of digital contract 20, using the proper virtual machine and proper rules, and manage interests of majority or all stakeholders. Values of cryptotokens may be defined and/or distributed, but allowing greater scalability.

Exemplary embodiments provide numerous advantages. Because the contractual execution is separate from the blockchain data layer data 72, the results of the digital contract 20 are securely documented and may be exported to other contractual components or to other digital contracts. Exemplary embodiments may thus implement and offer multiple modules 310, layers 312, or instances of different contractual components that can exchange inputs and outputs to build a networking effect between different layers, modules, and smart contracts. A first server running a first application layer (and perhaps executing a first smart contract) can be entirely separate a second server running a second smart contract and a third server running a third smart contract. The blockchain data layer 72, though, exchanges and thus documents their respective inputs and outputs. The various servers may thus manage and/or share the same cryptotokens, or different entity tokens may be exchanged within each layer. Regardless, exemplary embodiments may coordinate exchanges of value for services performed. Great flexibility in defining the value of cryptotokens and the value into and out of smart contract.

Exemplary embodiments may also have jurisdictional advantages. Particular servers may be specific to particular jurisdictions and/or particular smart contracts. For example, some application layers may cross jurisdictional servers with different compliances. As another example, suppose that one application layer may require qualified investors with full know your client (or "KYC") compliance. Another application layer may be anonymous and/or allow all comers. Even if the blockchain data layer 72 has a small set of users/clients, large smart contracts may be managed, implemented, and/or documented.

The digital contract 20 may utilize conventional programming languages and/or decision tables. In particular, some programming languages and decision tables, like purely functional languages, may mathematically prove contractual algorithms. These mathematical proofs may yield much more secure smart contracts than conventional languages that run on today's blockchains. Previously, smart contracts were often too big in size to execute on a blockchain. The separate blockchain data layer 72, though, allows scaling and implementing smart contracts "off chain." The proof 80 of the digital contract 20, for example, is a hash value, perhaps in association with the contract identifier 28 and/or the chain identifier 174, as documented by the data records 70 in the blockchain data layer 72. The hash value of the proof 80, in other words, is a very small value (in relation to the size of the smart contract). The digital contract 20 may thus be provided to any or all parties and/or any or all stakeholders for validation of its terms, obligations, and performance. The cryptographic proof 80 thus verifies execution without stuffing large amounts of data onto the private blockchain 24 or the public blockchain 76.

Exemplary embodiments may use decision tables for smart contracts. Decision tables are well understood, perform well, and are verifiable relative to brute-force code writing. Simply put, custom programming code introduces many variables and software bugs are inevitable. Decision tables are also very amenable to domain-specific languages. As the reader may understand, domain-specific languages accept near-English statements as inputs and generate computer code as outputs. Subject matter experts may thus define the functionality of the digital contract 20, perhaps without relying on the skills of computer programmers (who may not fully understand the subject matter). Decision tables are thus approachable to subject matter experts and easily implemented. Decision tables may also be combined with other decision tables, which allows performance proven and validated functions may be incorporated into smart contracts for many objectives and outcomes. Decision tables may thus be mixed and matched as components to a composite digital contract 20, and a collection of decision tables representing the digital contract 20 may still be validated to ensure correct operation. Decision tables define much smaller numbers of programming paths through the software code representing the digital contract 20, which ensures that all contractual combinations may be enumerated and proper results can be expected for a range of values. On blockchains, though, decision tables may be big in size, so some decision tables may not be feasible as a smart contract on a conventional blockchain. But, because the blockchain data layer 74 is separate from the remote servers 262 executing the digital contract 20, the digital identity (e.g., the contract identifier 28) for the digital contract 20 (that allows the smart contract to exist off chain) provides the servers (each perhaps having its own identity) to certify execution of the digital contract 20. Exemplary embodiments may also define the mechanism for cryptotoken-based payments that incentivize the remote server 262 to perform the digital contract 20 and to verify and validate the digital contract 20. Component and composite performance may be tracked, recorded, and proved. For example, if a virtual machine runs the digital contract 20 (as above explained), execution in the virtual environment can be tracked. Virtual machines may often have software bugs that affect an interpretation of the decision tables. The virtual machine may thus have its own digital identity, as defined by the database 44 of contracts (as above explained). Different versions of the virtual machine and/or the decision table may thus be mapped within the database 44 of contracts, thus allowing redirection after software bugs have been resolved. The database 44 of contracts, in other words, may be updated with entries that point to different versions for different parties and/or to corrected or improved versions.

Digital identities extend to engines and decision tables. The database 44 of contracts may map or point to servers, domains, decision tables, and their respective versions. The digital contract 20 (and/or its components, as represented by their respective contract identifiers 28) ensures execution, regardless of the environment. Because the blockchain data layer 72 documents all this component processing, the data records 70 may prove (via the cryptographic proof 80) that the correct contractual component was used, the correct decision table(s) was/were used, the correct virtual machine was used, and the correct input or output data was used. Verification may driven from the contractual components, the data components, and the hardware components at the correct time for the correct time period.

Figure 45:
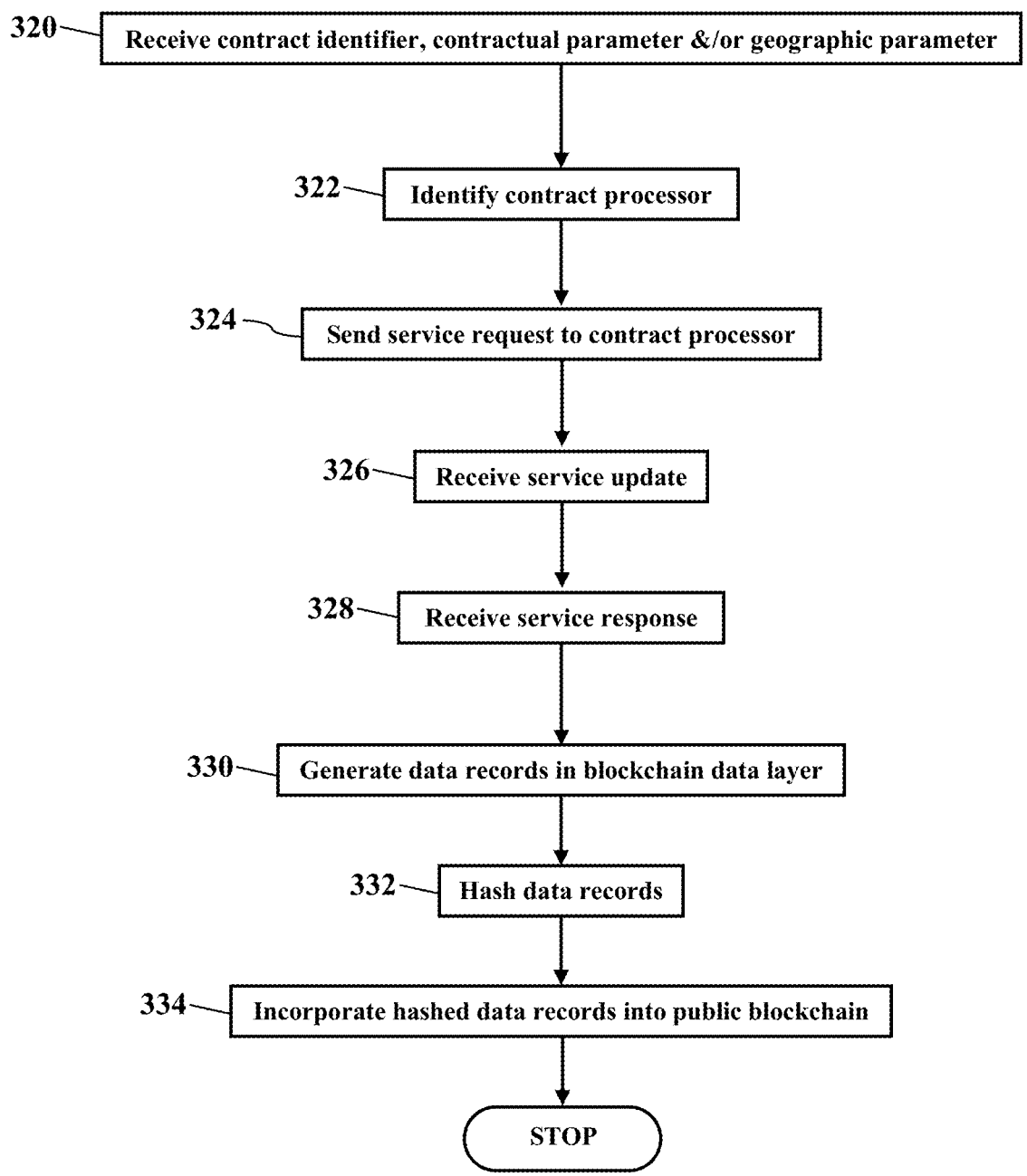
FIG. 45 is a flowchart illustrating a method or algorithm for executing of digital contracts, according to exemplary embodiments.

FIG. 45 is a flowchart illustrating a method or algorithm for processing of the digital contract 20, according to exemplary embodiments. The contract identifier 28, the contractual parameter 30, and/or the geographic parameter 320 is/are received (Block 320). The contract processor is identified (Block 322), and the contract processor may be an IP address, URL, virtual machine, or other network destination representing a vendor, contractor, server, or service that executes the digital contract 20, perhaps according to the geographic parameter 320. The service request 266 is sent (Block 324), the service update 270 is received (Block 326), and the service response 268 is received (Block 328). The data records 70 in the blockchain data layer 72 are generated (Block 330), and the data records 70 describe the execution of the digital contract 20. The data records 70 may be hashed (Block 332) and incorporated into the public blockchain 24 (Block 334).

Figure 46:
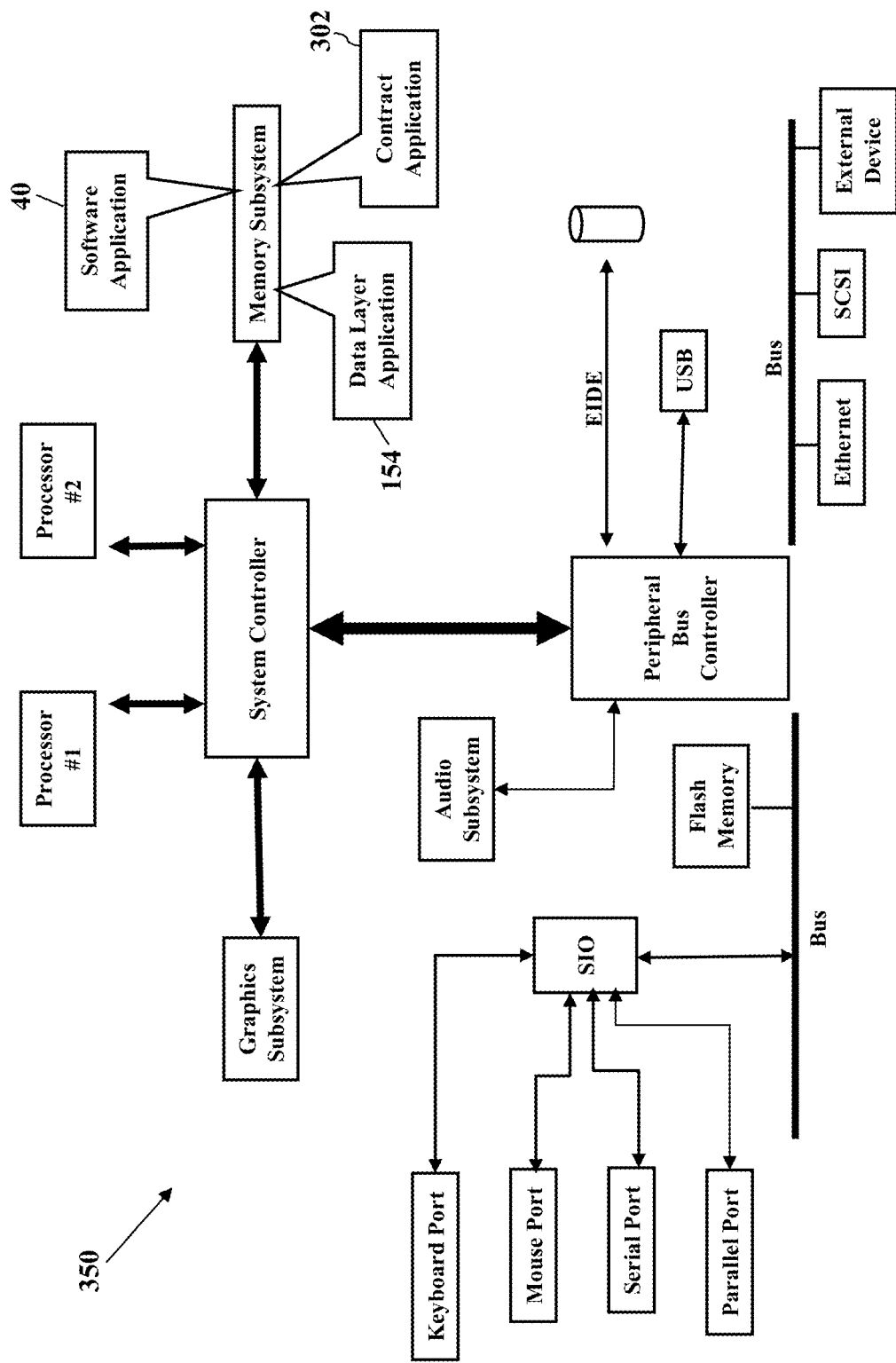
FIGS. 46-47 depict still more operating environments for additional aspects of the exemplary embodiments.

FIG. 46 is a schematic illustrating still more exemplary embodiments. FIG. 46 is a more detailed diagram illustrating a processor-controlled device 350. As earlier paragraphs explained, the entity's private software application 40, the data layer application 154, and/or the contract application 302 may partially or entirely operate in any mobile or stationary processor-controlled device. FIG. 46, then, illustrates the entity's private software application 40, the data layer application 154, and/or the contract application 302 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 47:
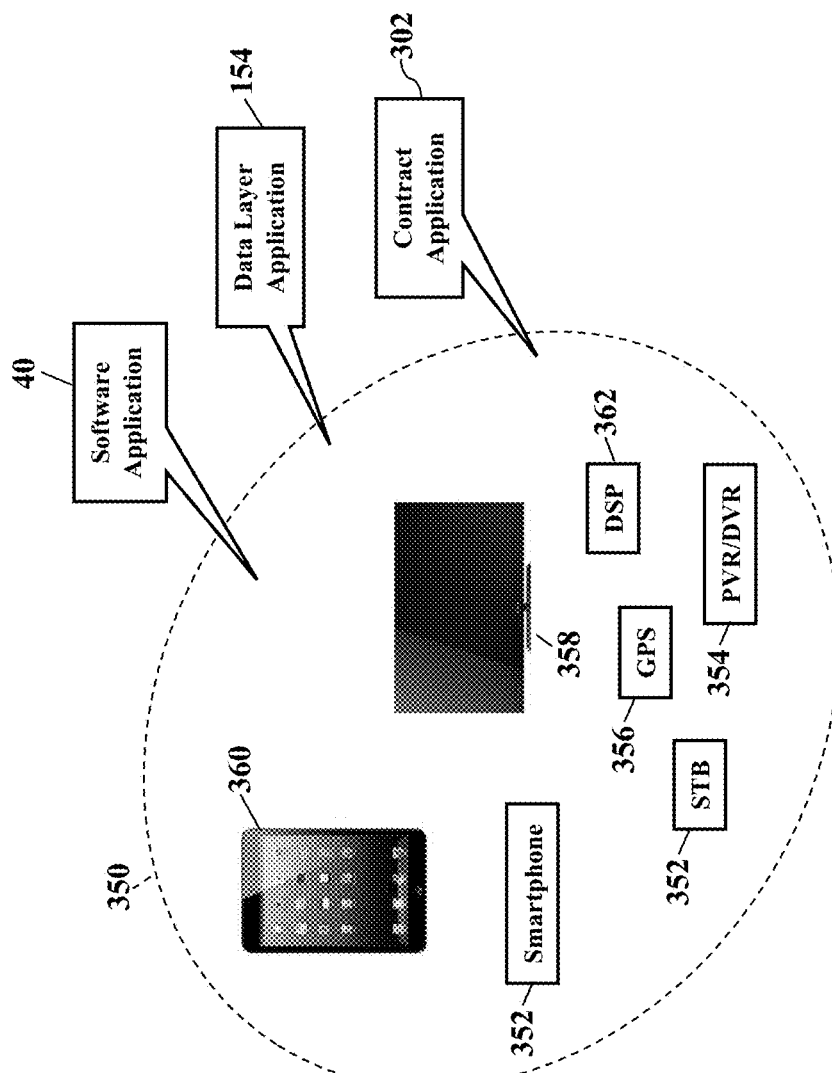

FIG. 47 depicts other possible operating environments for additional aspects of the exemplary embodiments. FIG. 47 illustrates the entity's private software application 40, the data layer application 154, and/or the contract application 302 operating within various other processor-controlled devices 350. FIG. 47, for example, illustrates that the entity's private software application 40, the data layer application 154, and/or the contract application 302 may entirely or partially operate within a set-top box ("STB") (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for execution of digital contracts, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method executed by a server that cryptographically proves a geographical outsourcing of a digital contract, comprising:
  receiving, by the server, a blockchain lacking a machine-executable programming code representing the digital contract;
  determining, by the server, that an off-chain execution of the digital contract is required by identifying a contract identifier specified by the private blockchain in lieu of the machine-executable programming code representing the digital contract;
  determining, by the server, a geographical restriction to the off-chain execution of the digital contract by identifying a geographical parameter specified by the blockchain;
  identifying, by the server, a network address that is associated with the geographical parameter;
  outsourcing, by the server, the off-chain execution of the digital contract by sending a service request to the network address requesting a cloud-based contractual service based on the contract identifier that uniquely identifies the digital contract; and
  in response to the outsourcing of the off-chain execution of the digital contract, generating, by the server, a cryptographic proof of the outsourcing by hashing a cryptographic address associated with the cloud-based contractual service.

2. The method of claim 1, further comprising receiving a service result associated with the cloud-based contractual service.

3. The method of claim 2, further comprising generating another cryptographic proof of the service result by hashing another cryptographic address associated with a provider of the cloud-based contractual service.

4. The method of claim 2, further comprising conducting a cryptocoinage transaction in response to the service result.

5. The method of claim 1, further comprising receiving a service update associated with the cloud-based contractual service.

6. The method of claim 5, further comprising generating another cryptographic proof of the service update by hashing another cryptographic address associated with a provider of the cloud-based contractual service.

7. The method of claim 1, further comprising publicly publishing the cryptographic proof via a public blockchain.

8. The method of claim 1, further comprising conducting a cryptocoinage based on the generating of the data record in the blockchain data layer.

9. The method of claim 1, further comprising transacting a cryptocoinage transaction in response to the sending of the service request.

10. A system that cryptographically proves a geographical outsourcing of a digital contract, comprising:
a hardware processor; and
a memory device storing instructions that, when executed by the hardware processor, cause the hardware processor to perform operations, the operations comprising:
receiving a blockchain lacking a machine-executable programming code representing the digital contract;
read accessing the blockchain by using an application programming interface (API) associated with a read access permission;
determining that an off-chain execution of the digital contract is required by reading, via the API, a contract identifier specified by the private blockchain in lieu of the machine-executable programming code representing the digital contract;
reading, via the API, a contractual parameter specified by the blockchain that is associated with the digital identifier;
reading, via the API, a geographical parameter specified by the blockchain defining a geographical execution restriction associated with the digital contract;
identifying a network address by querying an electronic database having a database entry that associates the geographical parameter defining the geographical execution restriction to the network address;
outsourcing the off-chain execution of the digital contract by sending a service request to the network address requesting a cloud-based contractual service based on the contractual parameter specified by the blockchain; and
in response to the outsourcing of the off-chain execution of the digital contract, generating a cryptographic proof of the outsourcing by hashing a cryptographic address associated with the cloud-based contractual service.

11. The system of claim 10, wherein the operations further comprise receiving a service result of the cloud-based contractual service.

12. The system of claim 11, wherein the operations further comprise generating another cryptographic proof of the service result by hashing another cryptographic address associated with a provider of the cloud-based contractual service.

13. The system of claim 11, wherein the operations further comprise conducting a cryptocoinage transaction in response to the service result.

14. The system of claim 10, wherein the operations further comprise receiving a service update associated with the cloud-based contractual service.

15. The system of claim 14, wherein the operations further comprise generating another cryptographic proof of the service update by hashing another cryptographic address associated with a provider of the cloud-based contractual service.

16. The system of claim 10, wherein the operations further comprise publicly publishing the cryptographic proof via a public blockchain.

17. A non-transitory memory device storing instructions that when executed by a hardware processor perform operations for cryptographically proving a geographical outsourcing of a digital contract, the operations comprising:
receiving a blockchain lacking a machine-executable programming code representing the digital contract;
read accessing the blockchain by using an application programming interface (API) associated with a read access permission;
determining that an off-chain execution of the digital contract is required by reading, via the API, a contract identifier specified by the private blockchain in lieu of the machine-executable programming code representing the digital contract;
reading, via the API, a contractual parameter specified by the blockchain that is associated with the contract identifier;
determining a geographical requirement to the off-chain execution of the digital contract by reading, via the API, a geographical parameter specified by the blockchain;
identifying a network address by querying an electronic database having a database entry associating the geographical parameter to the network address;
geographically outsourcing the off-chain execution of the digital contract by sending a service request to the network address requesting a cloud-based contractual service based on the contractual parameter; and
in response to the geographically outsourcing of the off-chain execution of the digital contract, generating a cryptographic proof of the geographically outsourcing by hashing a cryptographic address associated with the cloud-based contractual service.

18. The non-transitory memory device of claim 17, wherein the operations further comprise:
receiving a service result associated with the cloud-based contractual service; and
generating another cryptographic proof of the service result by hashing another cryptographic address associated with a provider of the cloud-based contractual service.

* * * * *